(12) United States Patent
Grace

(10) Patent No.: US 10,304,126 B2
(45) Date of Patent: May 28, 2019

(54) VISUAL COMMUNICATION SYSTEMS AND METHODS DESIGNING AND BUILDING ENTIRE EXPERIENCES

(71) Applicant: Mark Grace, Alpharetta, GA (US)

(72) Inventor: Mark Grace, Alpharetta, GA (US)

(73) Assignee: Beyondvia Technologies, Atlanta, GA (US)

( * ) Notice: Subject to any disclaimer, the term of this patent is extended or adjusted under 35 U.S.C. 154(b) by 385 days.

(21) Appl. No.: 15/084,679

(22) Filed: Mar. 30, 2016

(65) Prior Publication Data
US 2016/0210687 A1  Jul. 21, 2016

Related U.S. Application Data

(63) Continuation-in-part of application No. 14/021,530, filed on Sep. 9, 2013, now Pat. No. 9,310,980, and a continuation-in-part of application No. 13/746,994, filed on Jan. 22, 2013, now abandoned, and a continuation-in-part of application No. 13/590,550, filed on Aug. 21, 2012, now Pat. No. 9,305,026, and a continuation-in-part of application No. 13/365,477,
(Continued)

(51) Int. Cl.
| | |
|---|---|
| G06Q 30/06 | (2012.01) |
| G06Q 30/02 | (2012.01) |
| G06F 17/30 | (2006.01) |
| G06F 3/0481 | (2013.01) |
| G06Q 10/10 | (2012.01) |
| G06Q 50/00 | (2012.01) |
| G06F 3/0484 | (2013.01) |

(52) U.S. Cl.
CPC ....... *G06Q 30/0643* (2013.01); *G06F 3/0481* (2013.01); *G06F 3/04847* (2013.01); *G06F 17/3089* (2013.01); *G06F 17/30274* (2013.01); *G06Q 10/10* (2013.01); *G06Q 30/02* (2013.01); *G06Q 30/0244* (2013.01); *G06Q 50/01* (2013.01); *G06F 2203/04802* (2013.01)

(58) Field of Classification Search
None
See application file for complete search history.

(56) References Cited

U.S. PATENT DOCUMENTS 5,767,854 A * 6/1998 Anwar ............... G06F 3/0481
345/419
5,819,066 A   10/1998 Bromberg et al.
(Continued)

OTHER PUBLICATIONS

Rich-Media Scenarios for Discovering Requirements, Zachos/Maiden/Tosar, Sep./Oct. 2005, p. 92 and 96.*
(Continued)

*Primary Examiner* — Sam Refai
*Assistant Examiner* — Alexandru Cirnu
(74) *Attorney, Agent, or Firm* — Clements Bernard Walker PLLC; Lawrence A. Baratta, Jr.

(57) ABSTRACT

A computer-implemented method for designing and building a complete customer experience includes receiving a selection of an experience; creating one or more visual templates; receiving selections and mappings of components in the experience; sharing the experience with the components to one or more additional users; causing ordering of one or more products and services associated with the components; and creating tracking comparisons for improving the experience relative to a target.

20 Claims, 55 Drawing Sheets

Related U.S. Application Data filed on Feb. 3, 2012, now Pat. No. 8,769,423, and a continuation-in-part of application No. 12/976,345, filed on Dec. 22, 2010, now Pat. No. 8,806,353, and a continuation-in-part of application No. 12/112,842, filed on Apr. 30, 2008, now Pat. No. 8,074,176.

(56) References Cited

U.S. PATENT DOCUMENTS

| | | | |
|---|---|---|---|
| 5,898,435 | A | 4/1999 | Nagahara et al. |
| 6,141,003 | A | 10/2000 | Chor et al. |
| 6,466,237 | B1 | 10/2002 | Miyao et al. |
| 6,505,212 | B2 | 7/2003 | Nakano et al. |
| 6,941,294 | B2 | 9/2005 | Flank |
| 7,012,963 | B2 | 3/2006 | Zdepski et al. |
| 7,082,573 | B2 | 7/2006 | Apparao et al. |
| 7,092,969 | B2 | 8/2006 | Meek et al. |
| 7,177,879 | B2 | 2/2007 | Flank et al. |
| 7,215,338 | B2 | 5/2007 | Horn et al. |
| 7,403,657 | B2 | 7/2008 | Nagasaka et al. |
| 7,421,470 | B2 | 9/2008 | Ludwig et al. |
| 7,421,660 | B2 | 9/2008 | Charnock et al. |
| 7,421,690 | B2 | 9/2008 | Forstall et al. |
| 7,424,150 | B2 | 9/2008 | Cooper et al. |
| 7,424,671 | B2 | 9/2008 | Elza et al. |
| 7,424,673 | B2 | 9/2008 | Broman et al. |
| 7,493,640 | B1 | 2/2009 | Derrenberger et al. |
| 7,823,144 | B2 | 10/2010 | Pazel et al. |
| 8,290,206 | B1 | 10/2012 | Meyers |
| 8,291,334 | B1 | 10/2012 | Castellanos et al. |
| 8,539,362 | B2 | 9/2013 | Patel et al. |
| 9,026,922 | B2 * | 5/2015 | Dhaliwal ............... G06Q 50/01 715/753 |
| 2001/0047294 | A1 | 11/2001 | Rothschild |
| 2002/0033848 | A1 | 3/2002 | Sciammarella et al. |
| 2002/0120701 | A1 | 8/2002 | Ohba |
| 2003/0069801 | A1 | 4/2003 | Che-Mponda et al. |
| 2003/0110517 | A1 | 6/2003 | Lee |
| 2004/0148573 | A1 | 7/2004 | Buice et al. |
| 2005/0027802 | A1 | 2/2005 | Madsen et al. |
| 2005/0193425 | A1 | 9/2005 | Sull et al. |
| 2006/0253802 | A1 * | 11/2006 | Kim ..................... G06F 3/04815 715/836 |
| 2006/0274060 | A1 * | 12/2006 | Ni ......................... G06F 3/0482 345/419 |
| 2007/0121146 | A1 | 5/2007 | Nesbit et al. |
| 2007/0164989 | A1 | 7/2007 | Rochford et al. |
| 2007/0174425 | A1 | 7/2007 | Gousse et al. |
| 2007/0195338 | A1 | 8/2007 | Brownstein |
| 2007/0198921 | A1 | 8/2007 | Collison et al. |
| 2008/0007625 | A1 | 1/2008 | Reid et al. |
| 2008/0060032 | A1 | 3/2008 | Toutenhoofd |
| 2008/0071895 | A1 | 3/2008 | Johnson et al. |
| 2008/0075395 | A1 | 3/2008 | Wallace et al. |
| 2008/0215964 | A1 * | 9/2008 | Abrams ................. G06F 17/21 715/246 |
| 2008/0216022 | A1 | 9/2008 | Lorch et al. |
| 2009/0068991 | A1 | 3/2009 | Aaltonen et al. |
| 2009/0178079 | A1 | 7/2009 | Derrenberger et al. |
| 2010/0269044 | A1 | 10/2010 | Ivanyi et al. |
| 2011/0047625 | A1 | 2/2011 | Steelberg et al. |
| 2011/0066497 | A1 | 3/2011 | Gopinath et al. |
| 2011/0196871 | A1 | 8/2011 | Kilroy et al. |
| 2012/0017112 | A1 | 1/2012 | Broda et al. |
| 2012/0017165 | A1 | 1/2012 | Gardner et al. |
| 2013/0054779 | A1 | 2/2013 | Cradick et al. |

OTHER PUBLICATIONS

Viegas et al., "Google+ Ripples: A Native Visualization of Information Flow", WWW 2013, May 13-17, 2013, Rio de Janiero, Brazil.

Jing et al., "Google Image Swirl", WWW 2012 Companion, Apr. 16-20, 2012, Lyon, France.

Ziemkiewic et al., "Understanding Visualization by Understanding Individual Users".

* cited by examiner

VISUAL COMMUNICATION SYSTEMS AND METHODS DESIGNING AND BUILDING ENTIRE EXPERIENCES

CROSS-REFERENCE TO RELATED APPLICATION(S)

The present patent application claims priority as a continuation-in-part to the following applications, the contents of each are incorporated by reference herein:

| Filing Date | Ser. No. | Title |
|---|---|---|
| Sep. 9, 2013 | 14/021,530 | SYSTEMS AND METHODS FOR PERFORMANCE COMPARISONS UTILIZING AN INFINITE CYLINDER USER INTERFACE |
| Jan. 22, 2013 | 13/746,994 | SYSTEMS AND METHODS FOR CONTENT AND ADVERTISING INSERTION IN VISUAL COMMUNICATIONS |
| Aug. 21, 2012 | 13/590,550 | SYSTEMS AND METHODS FOR DIGITAL IMAGES UTILIZING AN INFINITE CYLINDER USER INTERFACE |
| Feb. 3, 2012 | 13/365,477 | CONTENT DISTRIBUTION SYSTEMS AND METHODS USING DIGITAL IMAGES |
| Dec. 22, 2010 | 12/976,345 | MOBILE ELECTRONIC COMMUNICATIONS DIALOG USING SEQUENCED DIGITAL IMAGES |
| Apr. 30, 2008 | 12/112,842 | ELECTRONIC COMMUNICATIONS DIALOG USING SEQUENCED DIGITAL IMAGES STORED IN AN IMAGE DICTIONARY |

FIELD OF THE INVENTION

The present disclosure relates generally to electronic communications. More particularly, the present disclosure relates to systems and methods for visual communications to design and build entire experiences at once, using "visual talking" images and the like.

BACKGROUND OF THE INVENTION

The ability for individuals and groups to communicate and carry on a conversation has been dramatically transformed by personal computing/memory devices, easy to use software, the Internet, wireless communications, and the like. For example, consumer communications have evolved over the past twenty years from almost solely using land-based home phone lines for oral communications and discussions to mobile phone devices which enable both oral communications and the use of written words as messages in the form of text messages, electronic mail, video chat, etc. In this interconnected Internet world, oral communication is taking a back seat to software that manipulates words enabling text and email messaging. In this new abbreviated-text, quick-phrase Internet world, meaning can be lost, or the electronic message can be easily misinterpreted.

Since the evolution of written communications, natural language words have dominated communication and dialogue, while descriptive pictures have been used to provide ad hoc insertions to words and stories. Even in the current electronic digital age of the Internet, natural language words dominate dialogue, as witnessed by the almost universal use of email and the more recent explosion of text messaging on computers and cell phones.

The continued investment in (1) advanced computer processor and memory technology with the vast manipulation capabilities they provide, and (2) the electronic communication networks that carry the message from one computer, personal digital assistant (PDA), cell phone, smart phone, tablet, or other electronic device to another computer, PDA, cell phone, smart phone, tablet, or other electronic device is the modern day equivalent to investment in the word printing press. More and more efficient natural language word communication is happening at electron speed to instantly connect one user to another user almost anywhere in the world. Yet, the understandable meaning being conveyed may be confused, as words do not always carry enough information for full meaning. For example, when a user texts "Bring home an apple for me," it is not all that clear what type of apple that the user wants: red/green, small/large, juicy/dry, sweet/sour, etc., so the apple that the user gets may not be the one that the user wanted.

Current word based communication systems operate on a built in conversation control principle of "I talk, you listen, then respond", where a leader starts the conversation (because in speaking only one can talk and everyone else listens) and waits for a response from the listener or audience, and the leader receives feedback and responds, thus continuing the cycle of "I talk, you listen" on and on (or called "post and wait" method in word emails, chats or blogs). Computer email and text messaging systems mimic this approach as they developed from a vocal speech paradigm and imitated how we speak in real life. So, email and text messaging communication systems tend to list initiator-then responses-then initiator response—and so on. Further, once a word sentence is constructed and used (stated), there is little need to save the word sentence and reuse it in another word sentence or word paragraph as is, so the word sentences are used in the one flow they were first, and only designed for. The conversation control paradigm of "I talk, you listen" does not apply to conversations using images sequenced together to send message(s) amongst many (tens to millions) participants simultaneously in real time. Each participant uses their own images and image sentences to communicate at any time in the conversation. New, flexible communication rules (styles) are required to manage the new visual talking not bounded by the conventional paradigm of "I talk, you listen" control. It is desirable to provide a system and method that allows for the selection of a communication style for visual sentences from a palette of styles, for the sequencing of these styles in a desired conversation flow in a community, and for the selection of members in the community, and for the members to participate in the discussions using the various styles.

With respect to content distribution, conventional content distribution systems and methods require selecting on line content (e.g., television, movies, music, videos, etc.) in a tedious manner where individual pieces of content are seen one at a time (as opposed to all in relation to each other) or some limited set to view, with no interaction (i.e., ability to select, edit and redirect, etc.) and only a limited way to view (with limited action). Further, users can create activities and license associated content only for short times, because online communities are like "soaps bubbles", where they rise up and grow, and then pop and disappear, so the selection system must be bigger and more lasting than soap bubbles.

With respect to viewing, displaying, and managing content, i.e. digital images, as visual communicators grow, more efficient systems and methods are needed for viewing, selecting, adding, editing, and reading visual images. Conventional user interfaces include flat spaces in all directions that are too slow, cumbersome, difficult to manage, etc. Such conventional user interfaces are typically constrained to a two dimensional view with modes of movement in the x-y plane only, i.e. scrolling up and down or sideways.

With respect to advertising and content insertion, advertising is moving online where advertisers can communicate directly, one on one to end users. Conventionally, software cookies track user activity on the Internet (i.e., unbeknownst to users), and use spying information to classify users for potential advertisers. The potential advertisers bid on sending user ads when a user navigates to a particular site. This is passive to the user who is unaware. Further, this process takes on the order of milliseconds. For example, assume the user performs an Internet search to buy a boat. The user inputs this data in a search engine which pulls the spying information from the user via the cookies to access the user's history, profile, etc. in a database. As this process unfolds and on the order of milliseconds, real time bidding occurs from the advertisers who determine which ad is ultimately presented to the user. Disadvantageously, this process uses the user's private information and is inefficient for the advertisers as they may not directly link with users for user actions, like buying. Specifically, studies show only 6-12% of banner ads are ever navigated to much less any further action taken. Other studies, in the context of social networks, show only 0.28% of banner ads are navigated to.

Further, data collection is exploding with the confluence of Internet connectivity, ubiquitous computing devices, increasing processing power, decreasing data storage cost and space, etc. The term "big data" has been coined to define large collections of data that are complex and difficult to process and analyze using conventional systems and methods. It is known in the art that data collection systems feed "control systems," "expert" systems, and accounting systems to make sure that a certain precise activity/flow is followed, over and over again. In (most of) these data collection systems the intent is to remove "fallible, error prone, and devious" human intervention from the system to ensure the system operates "as designed," even though it may be operating below optimal and thus subpar performance. The link between system performance and those responsible for it has been severed, with the only connection being that those responsible may receive alerts, alarms, or other event warnings to say the system is deviating from the designed flow. To find out if the system is suboptimum or needs improvement, a special "off-line" analysis or study needs to be performed. To improve this process from the original design is intended to be very difficult.

Most off-line analytics (i.e. big data) that look at the system to improve it take large amounts of raw data and look for trends, and if the trend points to improvement by statistical methods, the system is "upgraded" or a new algorithm is added. But, by and large the system still operates intentionally disconnected from humans and new target comparisons. In the old world of slow technology change, lacking links to social networks, and reduced complexity systems for laypeople, may be that worked, but business and people now demand real-time performance systems that allow them to see all data related to target and thus make changes to get to the best in class.

Further, based on discussions with customer-responsible executives at companies with multiple products and services, a common complaint is sales executives do not sell all of the multiple products and services to customers "all-at-once." There are multiple Business Unit leaders, Brand Managers, Product Managers, General Managers, etc. all selling somewhat independently to garner the same attention for a subset of products and services. Thus, attempts to reach customers with all products gets derailed by this independent focus. Yet, customers want to buy the entire experience with all the products; that is, customers do not want to put the products together themselves, they want assistance. Of course, multi-product sale success can significantly increase revenue. These same executives want and need an approach where all of the products can be offered "all-at-once" to customers. The most pressing multi-product selling challenges include developing the full picture of how a customer uses all of their products; finding the experienced resources to prepare a multi-product customer approach; and creating sales materials to help customers select multiple products.

BRIEF SUMMARY OF THE INVENTION

In an exemplary embodiment, a computer-implemented method for designing and building a complete customer experience includes receiving a selection of an experience; receiving one or more selections from presented visual templates based on the experience; receiving selections and mappings of components in the experience; sharing the experience with the components to one or more additional users; causing ordering of one or more products and services associated with the components; and creating tracking comparisons for improving the experience relative to a target. The experience can include a visualization of a time period and location in a user's life. The one or more visual templates can be utilized to enable a visualization of a time period and location in a user's life based on the selected experience. The one or more visual templates can be presented to a user via an infinite cylinder user interface. The infinite cylinder user interface can include a plurality of images and has infinite movement longitudinally about an x-axis and infinite rotational movement about the x-axis, and a plurality of movement modes comprising drill-down and drill-up movement between a plurality of cylinders, and wherein the drill-down from an image of the plurality of images brings up a second plurality of images correlated with the image. The components each can include the one or more products and services and are visually placed in the experience with the one or more visual templates enabling a user to visualize the one or more products and services. The components each can include the one or more products and services and the ordering is performed automatically based on a selection by a user. The computer-implemented method can further include managing the ordering to schedule details and sequences of deliveries of the one or more products and services. The components and the one or more visual templates can include visual talking images. The sharing can include advertisements embedded in the experience.

In another exemplary embodiment, a system for designing and building a complete customer experience includes a data store for one or more data streams; a network interface communicatively coupled to a network; a processor communicatively coupled to the data store and the network interface; and instructions executable by the processor, and in response to such execution causes the processor to: receive a selection of an experience; receive one or more selections from presented visual templates based on the experience; receive selections and mappings of components in the experience; share the experience with the components to one or more additional users; cause ordering of one or more products and services associated with the components; and create tracking comparisons for improving the experience relative to a target. The experience can include a visualization of a time period and location in a user's life.

The one or more visual templates can be utilized to enable a visualization of a time period and location in a user's life based on the selected experience. The one or more visual templates can be presented to a user via an infinite cylinder user interface. The infinite cylinder user interface can include a plurality of images and has infinite movement longitudinally about an x-axis and infinite rotational movement about the x-axis, and a plurality of movement modes comprising drill-down and drill-up movement between a plurality of cylinders, and wherein the drill-down from an image of the plurality of images brings up a second plurality of images correlated with the image. The components each can include the one or more products and services and are visually placed in the experience with the one or more visual templates enabling a user to visualize the one or more products and services. The components each can include the one or more products and services and the ordering is performed automatically based on a selection by a user. The instructions executable by the processor, and in response to such execution can further cause the processor to manage the ordering to schedule details and sequences of deliveries of the one or more products and services. The sharing can include advertisements embedded in the experience.

In a further exemplary embodiment, software stored in a non-transitory computer readable medium and comprising instructions executable by a processor, and in response to such execution causes the processor to perform operations including receiving a selection of an experience; receiving one or more selections from presented visual templates based on the experience; receiving selections and mappings of components in the experience; sharing the experience with the components to one or more additional users; causing ordering of one or more products and services associated with the components; and creating tracking comparisons for improving the experience relative to a target.

BRIEF DESCRIPTION OF THE DRAWINGS

The present disclosure is illustrated and described herein with reference to the various drawings, in which like reference numbers denote like method steps and/or system components, respectively, and in which:

FIGS. 37A-37C are schematic diagrams illustrate an infinite cylinder user interface.

DETAILED DESCRIPTION OF THE INVENTION

Figure 1A:
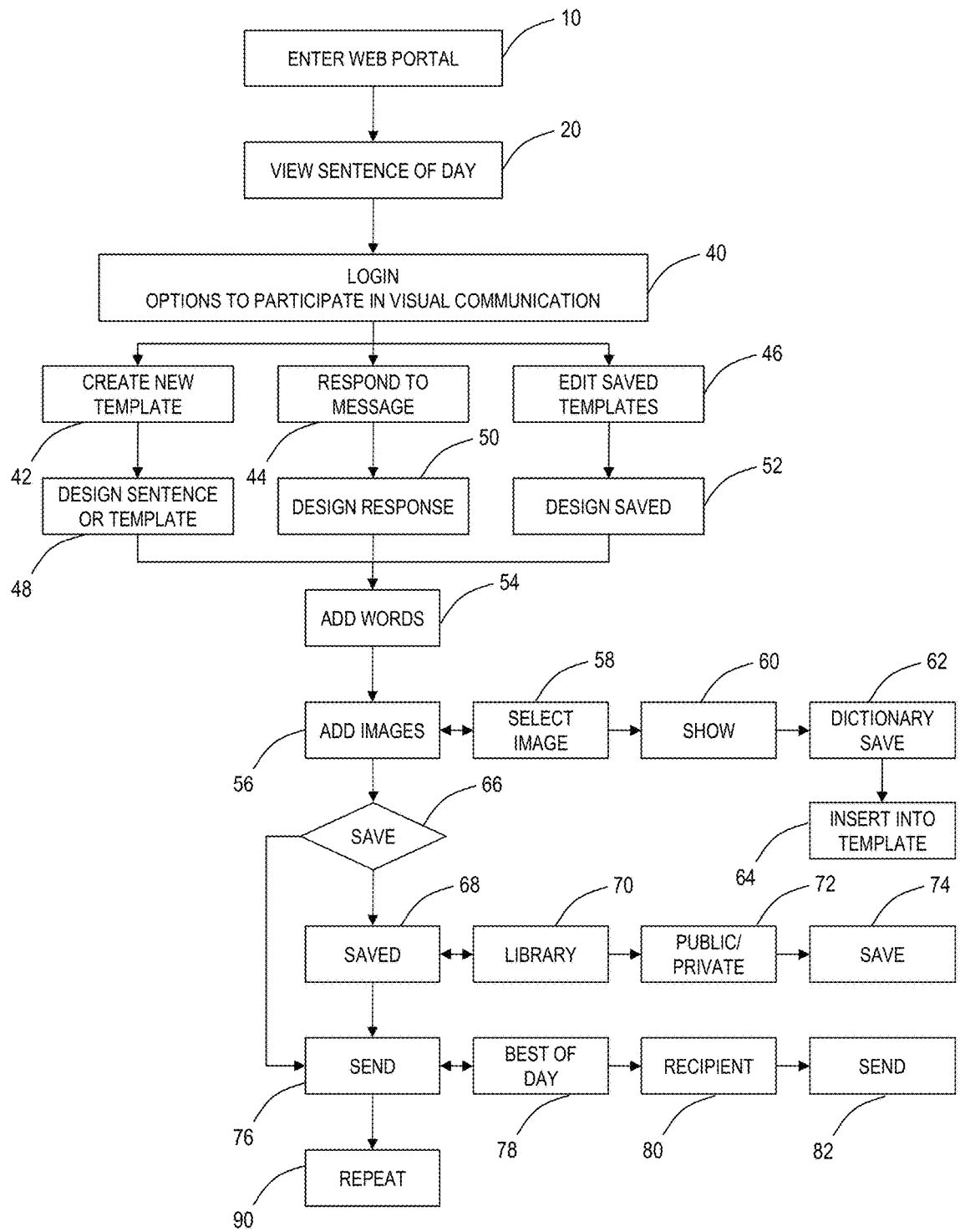
FIG. 1A illustrates an overview of the processing logic to create, save, and send sentences and templates in accordance with an exemplary embodiment of the present disclosure.

Given the rapid increase in memory capacity of computers, mobile devices, and networks, current image/picture practice focuses entirely on manipulating images for the passive purpose of image presentation and broadcasting, and has not been used heretofore for structuring a continuing communication dialogue, with connections to a responding community of people or a lasting relevant image and word dictionary. Current software programs having varying levels of ability to name images, search images, manipulate images as for adding to and changing the image, and rank images. Certain Internet web sites allow for the collection of images produced from various sources (e.g., digital cameras) for the purposes of storage and simple display or even printing. As with the printing press, these image storage systems are similar to individual letters in the printing press drawer waiting to be assembled into a template for distribution to the community. And once distributed to the community, the community can respond in kind and carry the discussion forward, saving any components of the discussion they may like, in any form, such as a paragraph, a book, workflow, a manual, or any manner of conversation.

The current natural language word system of dialogue could be enhanced to deliver clearer meaning by a system and method that adds pictures or primarily uses pictures as a fundamental component to the sentence dialogue structure (and other structure templates that can be used to communicate), e.g., inserting the picture of a green, small, granny smith apple enhances the apple text message and better ensures that the user gets the right apple. Therefore, it is desirable to build a communication system and method that uses pictures as the primary mode of dialogue (and words for enhancement).

Embodiments of the present disclosure provide a system and method for electronic communications dialogue between and among a plurality of users. Embodiments include building image dictionaries defined by words, sequencing the images and associated words into certain communication templates, and publishing the templates to select individuals and communities or groups for response and discussion. To initiate a conversation, a user first selects a preferred communication template and inserts sample words, then sample images are selected from a visual dictionary and inserted into the appropriate location in the template until the template is completed. Alternatively, the images can be selected without sample words. The user selects the method of sending the template, identifies the recipients, and presses send on a user interface. The user may perform this functionality through a web portal, an application operating on a mobile device or the like, etc. As described herein, a portal may include one or more servers, the "cloud", a wireless provider, or the like. Specifically, portal may refer to any device communicatively coupled to a network such as the Internet that is configured to provide the functionality described herein.

In an exemplary embodiment, a visual dictionary is created for each user using a facility which takes images from any electronic source (e.g., photos such as from a mobile device, websites, drawings, etc.), makes an image therefrom, and allows users to apply naming tags to store the image for later retrieval. A visual library is created for each user to save completed and partially completed templates (e.g., visual sentences, paragraphs, etc.) to retrieve them for further editing or use. In one exemplary embodiment, the visual dictionary is stored at the portal. In another exemplary embodiment, the visual dictionary is contained in memory, data storage, etc. associated with a mobile device. Here, the visual dictionary may synchronize or update through the web portal.

The Overall Integrated System

FIG. 1A illustrates an overview of exemplary processing logic to create, save, and send sentences and templates. This exemplary processing logic shows the major activities of sentence/template creation, saving, and sending. Embodiments are directed to a portal system that allows the user to enter the web portal (block 10) and view an example "sentence of the day" (block 20). If the user wants to create his own dialogue, he can log in, and have a number of options to participate in a dialogue (block 40). In a first option, the user could create a new sentence or a new template (block 42). In a second option, the user could respond to a message sent to him from another user (block 44). In a third option, the user could go to his saved templates library (block 46), and select an item to edit. In each case, the user selects a message into which images are added according to the template. To input images, the user either extracts images from sources external to the portal or searches for images in the user's stored visual dictionary. Once an image is selected (block 58), the user can store the image in a "visual dictionary" (block 62) by assigning a word or words to the image, and by assigning a unique random number and other tags that the user defines. Once the user saves the image in a personal visual dictionary (block 62), the user then inserts the image into the template (block 64). The user repeats this image insertion method (blocks 56-64) until the template has been completed, and then moves to save the template in the user's library (blocks 68, 70) or goes directly to send the message (block 76). If the user decides to save the message (block 66), the user defines how to save it in his library (block 70), and can decide to save it as private or public for other users to see (block 72). After saving the message (block 74), the user has the option to send it to someone, or to return to the home portal to insert it into a bigger template, via the send option. Using the send option (block 76), the user can decide to submit the message to the "sentence of the day" (block 78). The user then sends the message to selected individuals and/or groups in the portal (blocks 80, 82), and can send an alert to others outside the portal via electronic means like email. After sending the message (block 76), the user returns to the home portal and can repeat the process (block 90). In an exemplary embodiment, the alert may also be a full visual message, such as with using an app on a mobile device.

Figure 10:
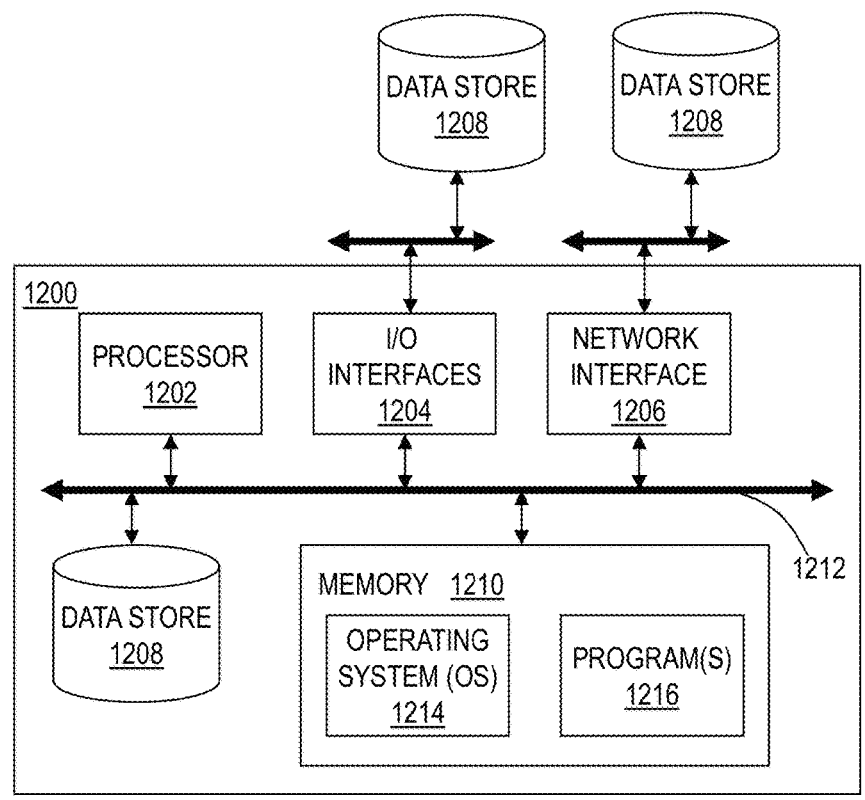
FIG. 10 illustrates an exemplary block diagram of a server which may be utilized in an exemplary implementation of a web portal.

The web portal for electronic communications dialog between a plurality of users using digital images can be accessed via any computing device having a networking capability including, but not limited to, mainframe computers, portable computers, workstations, personal digital assistants, cell phones, and other mobile computing devices. Furthermore, the web portal may be realized in a server, such as depicted in FIG. 10. Those of ordinary skill in the art will appreciate that the present disclosure may also be implemented as an application on a device, e.g. mobile phone, smart phone, computer, etc. Here, the web portal functionality described herein may be performed locally at the device via the application. The web portal functionality may be further implemented in a cloud-based architecture across various servers.

Figure 1B:
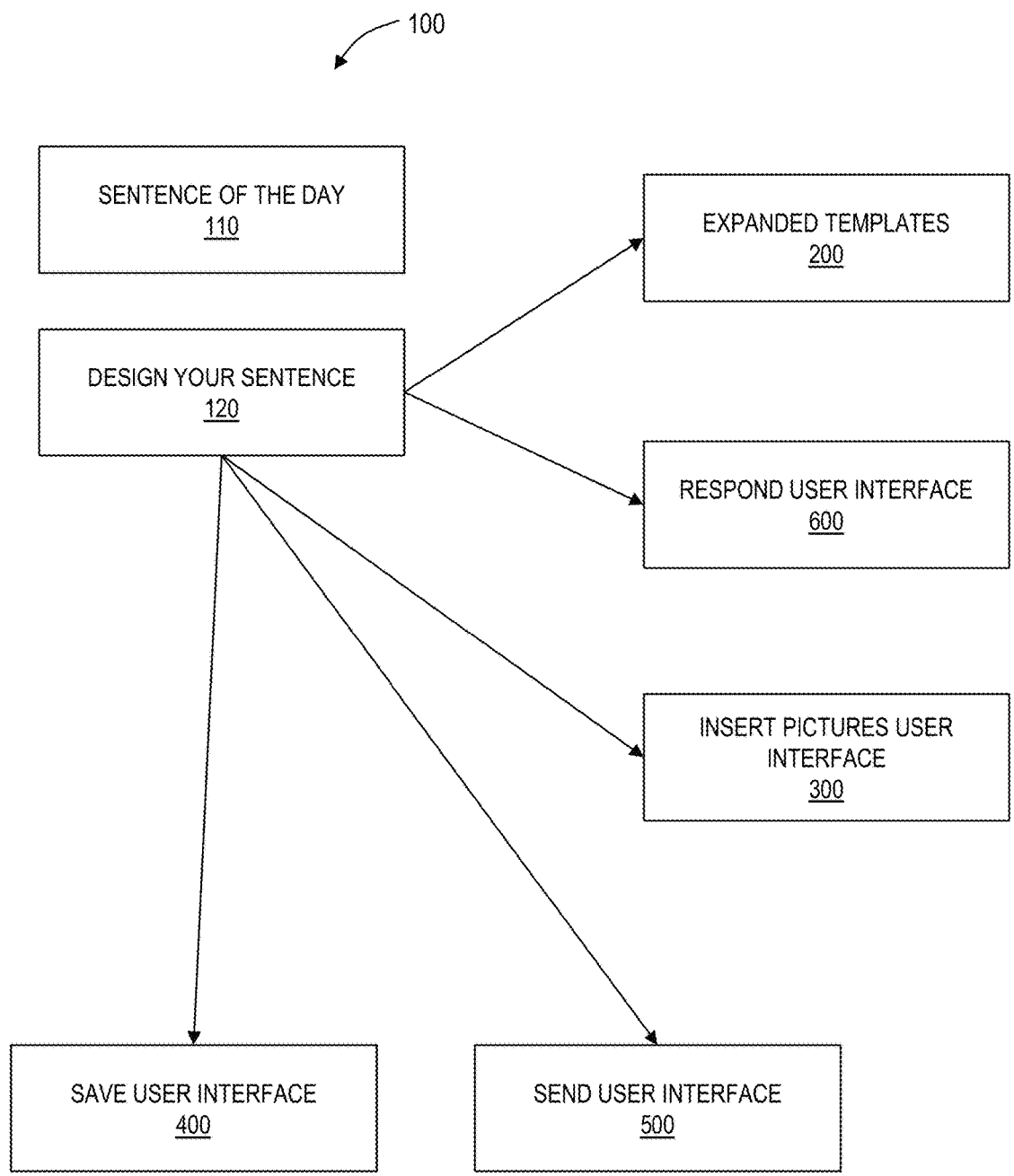
FIG. 1B illustrates an overview of the flow between user interface displays in accordance with an exemplary embodiment of the present disclosure.

FIG. 1B illustrates an overview of the flow between major user interface displays. The various templates including sentences, paragraphs, books, etc. that are used in exemplary embodiments of the disclosure are described more fully below. User interface 100 enables the new user to view pictoral sentences in section 110 as examples to familiarize the new user with preparing pictoral sentences, or other templates, from scratch, and allows the experienced user ("visual talker") to access any template (200) from section 120, or to respond to recently received dialogue via respond user interface (600). If the user wants to create a new simple sentence of six words or less, the user can use the simple "design your sentence" template (120). To input pictures into the simple "design your sentence" template, the user selects a picture via insert pictures user interface (300) from an external source or from the user's own visual dictionary and then submits the picture to be inserted into the sentence (120). Each picture submitted to template (120) has the option to add descriptive words such that when all the words are combined, they create a simple sentence (or another template). Once the simple sentence is fully completed with pictures and words, the user can save the work via save user interface (400). After saving the work in a visual library using save user interface (400), the user can send the work to be communicated to another user by selecting various sending methods and user types available via send user interface (500).

Similar to a new simple sentence described above, a user can create any pictoral communication using any number of templates available in expanded templates (200).

The user can select either to use a respond user interface (600) sending the user to view and highlight messages to respond to, or to view more templates and select which template to use. Once the template is selected, the user inserts pictures via insert pictures user interface (300), saves the completed template via save user interface (400), and sends the template using send user interface (500) similar to the method for a simple sentence.

Accessing the System

Figure 2:
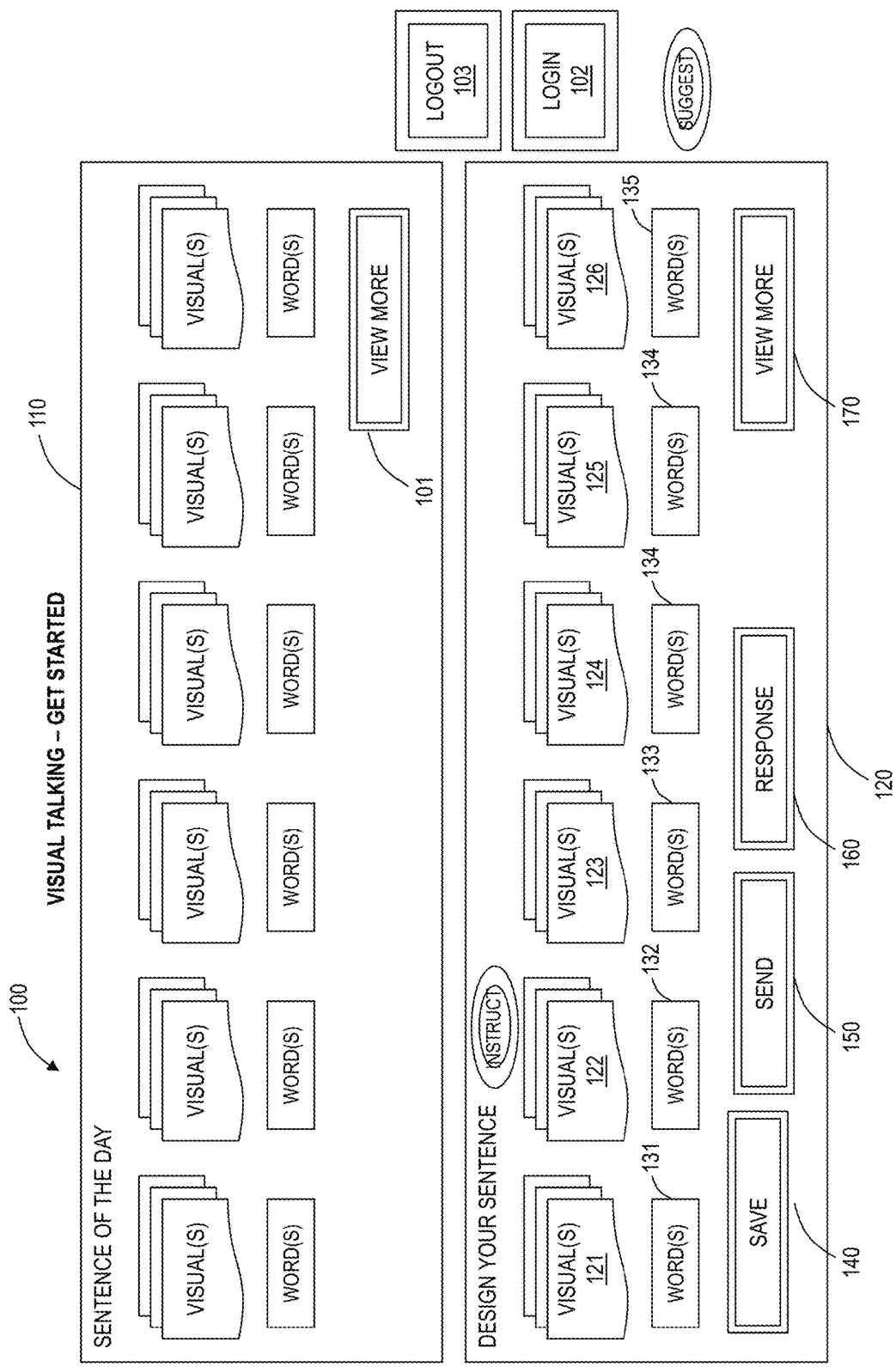
FIG. 2 illustrates an exemplary home portal screen to view a "sentence of the day" and to initiate a user "sentence."

With reference to FIG. 2, the home portal page (100) can be found by the user by typing in the URL of the service provider's website. Once at the home page, the user can view the entire page including sections 110 and 120. Without logging in, the user can view all the examples simply by accessing the list of examples in "View More" (101). A user may login, by pressing the login button (102). If the user presses any other button (121-126, 140, 150, 160, or 170), the user will be prompted automatically to login. Once login occurs, the user has access to all buttons on the user interface 100.

Selecting a New Template

Figure 3:
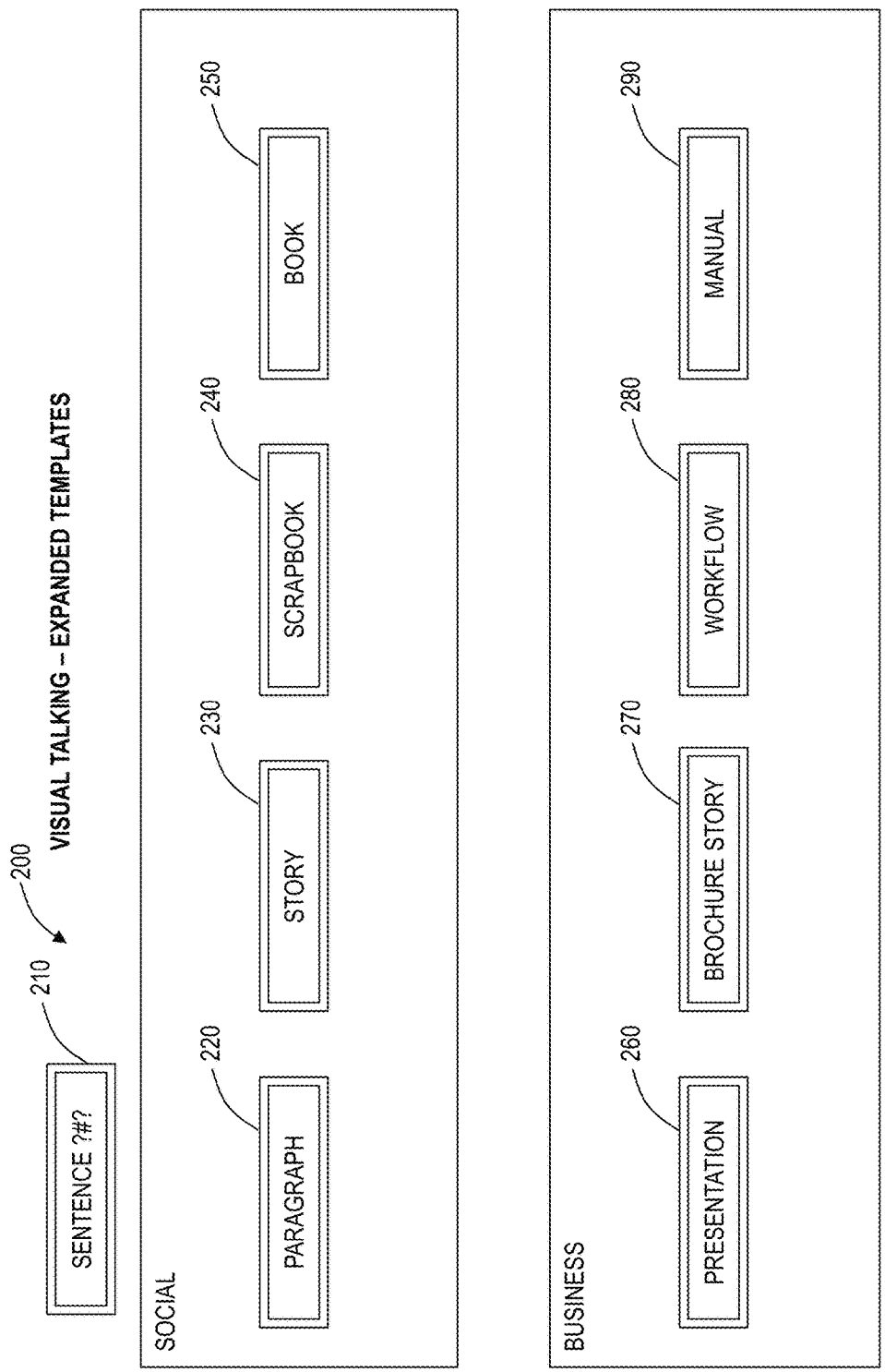
FIG. 3 illustrates an exemplary portal screen for selecting a template.

With reference to FIG. 1, after a user logs in, the user can select only one working template: (1) as a simple sentence (120), (2) as a larger template by pressing "View More" (170), or (3) as a "Respond" (160) using specific response user interface (600). Once the user selects the template, the home page (100) converts to the appropriate user interface, and the user can begin to insert pictures (300) in the appropriate locations. If the user selects "View More" (170), the user will be presented with the user interface illustrated in FIG. 3. With reference to FIG. 3, the user can select a longer sentence (210), a personal (social) template (220, 230, 240, 250), or a business template (260, 270, 280, 290).

Inserting Pictures and Words into a Template

Figure 5:
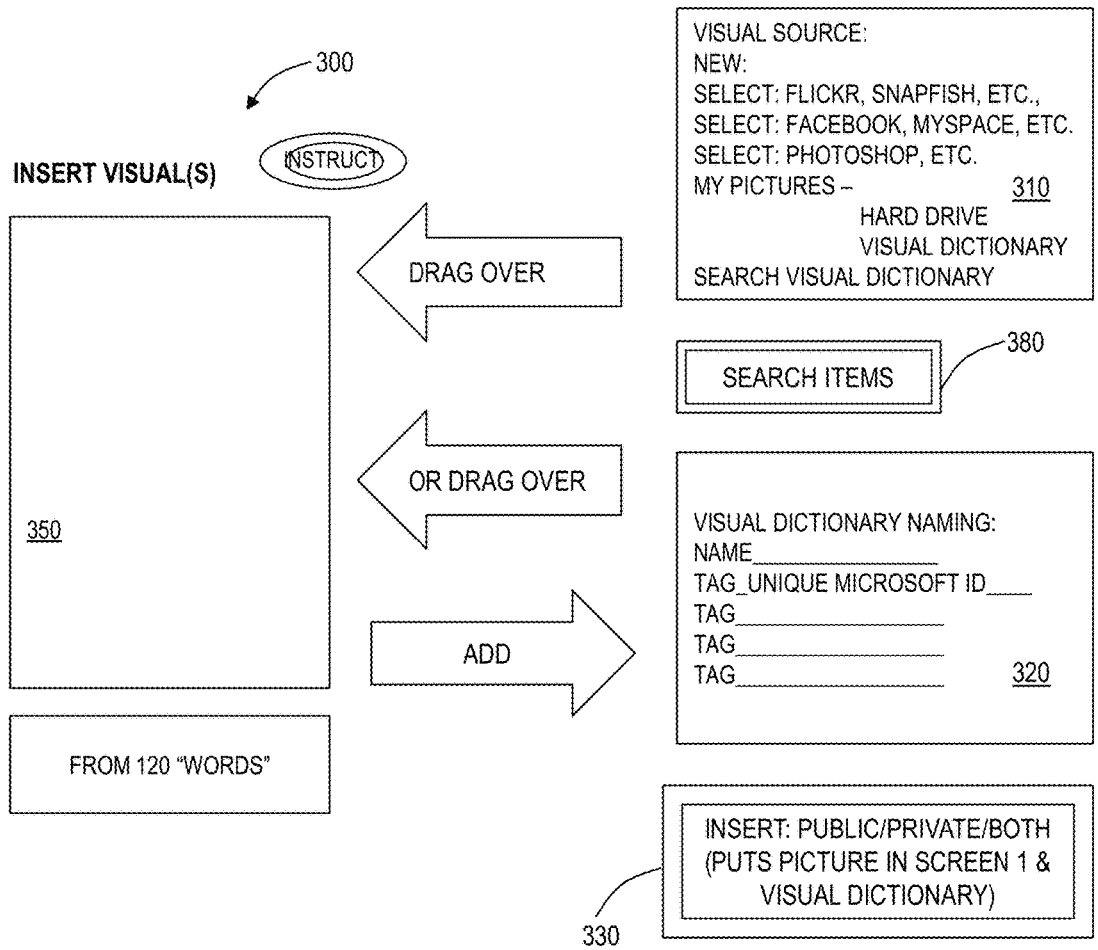
FIG. 5 illustrates an exemplary portal screen for enabling selection and tagging of pictures from a visual dictionary or external source and insertion into the template.

Words are added into a template simply by typing into the word box (131-136). Pictures are added by clicking on the appropriate visual box (121-126, depending on the template chosen) and being transported to the "insert pictures" portal (300) that is illustrated in FIG. 5. Within the insert pictures portal (300), the user can input a new picture into the work area (350) by one of two main methods: by linking (310) to an external site and selecting a picture for insertion, or by "searching terms" (380) in the visual dictionary and selecting a picture for insertion. Once the picture is inserted in the work area (350), the user can enter descriptive data into the appropriate data locations (320). Entering descriptive data into the data locations and saving this for later search creates a personal visual dictionary for the user. As with a word dictionary and a word associated with definitions, this visual dictionary has images and can be searched by a simple word from a word dictionary or can be searched by the other defined data tags (320). Once the user feels he has the right picture and all the data entered to index the picture in a visual dictionary, the user selects the "insert" button (330). This causes the picture to be inserted into the appropriate location in the template (121-126), and simultaneously into the visual dictionary with descriptive data.

Saving the Template

Figure 6:
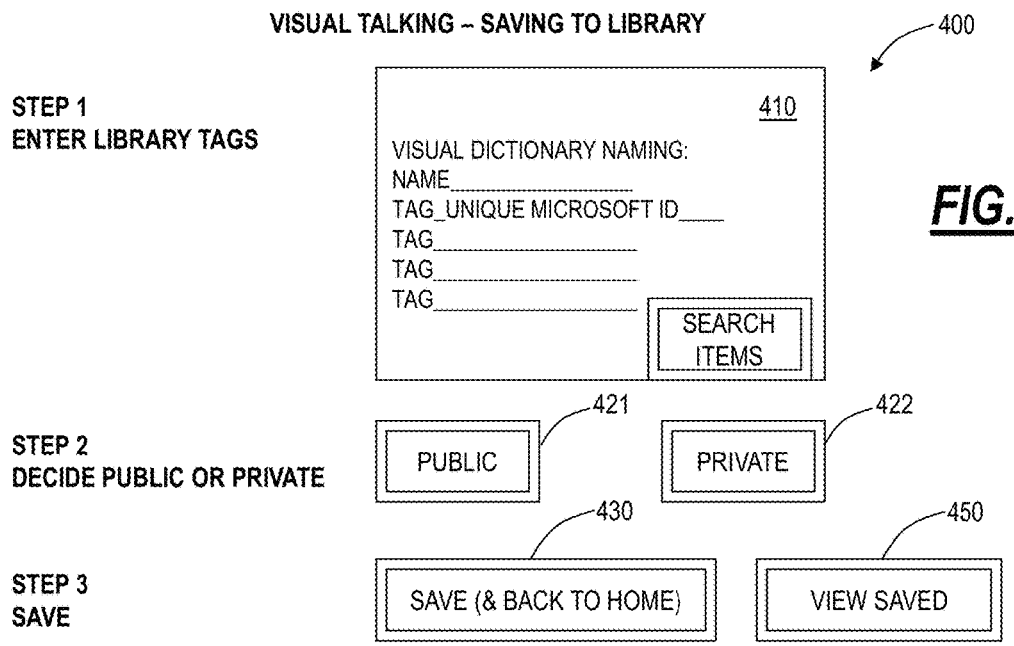
FIG. 6 illustrates an exemplary portal screen for saving the completed template to a library.

Prior to sending (150) a completed template (120), a user can save the template by pressing the save button (140). The user then enters the save portal user interface (400) as illustrated in FIG. 6. The user inputs data into the appropriate fields creating a visual library record (410). Then, the user must decide to save the record as a public (421) or as a private (422) record. Finally, the user "saves" (430) the completed template in the library and is immediately returned to the home portal (100). At any time while in the save portal, the user may search (450) all previously saved entries in the library, and when completed, return to the save portal with no changes from when the user left the save portal.

Sending the Completed Template

Figure 7:
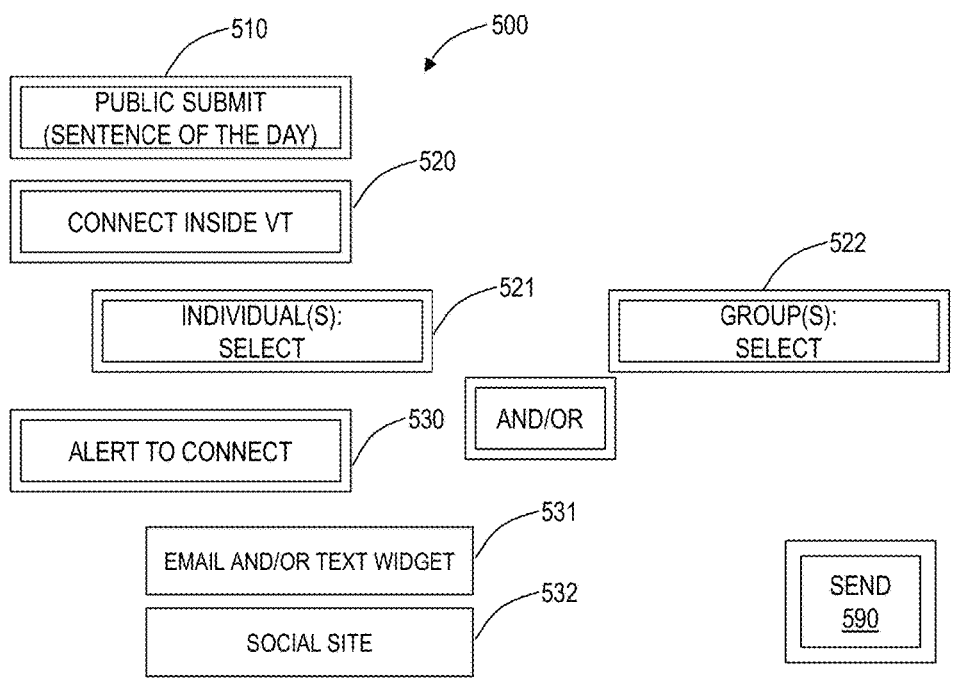
FIG. 7 illustrates an exemplary portal screen for selecting the community and sending the completed template to the community.

With the template complete and saved (140), the user sends (150) the completed template using the send portal (500). FIG. 7 illustrates an exemplary send portal. If the template is a sentence template, the user can select "Public Submit" (510) to be considered for "sentence of the day" and be published on the home portal (100) for viewing by other users. The user must choose who can review the message after login to the portal (520). The user can select individuals (521) or groups (522). If the user wants to send an external alert outside of the portal to the intended recipient (530), the user selects the appropriate alert system (531, 532). After the user selects the send button (590), the user is returned to the original home portal (100) automatically. Note, FIG. 7 illustrates an exemplary send portal that may be used over a network. Alternatively, FIG. 7 may be modifier to provide a send user interface on a mobile device with similar functions.

Responding to a Message

With reference to FIG. 2, the user knows that there is a message awaiting the user's response by seeing the "Respond" button (160) highlighted. When the user selects the respond button (160), the user is presented with the user interface (600) depicted in FIG. 4. The user can view (610) all messages awaiting response by selecting "View More" (602) and scrolling through a list of templates (i.e., sentences, etc). This scrolling mechanism operates similar to viewing the "sentence of the day" (110) as depicted in FIG. 2, and then scrolling through the sentences after pressing "View More" (101). In the user interface of FIG. 4, in order to select a message to respond to, the user clicks on "Select One" (601), and that selection is then inserted into the "design your sentence" template (620).

The "design/save/send" actions necessary to finish the design of the respond sentence are similar to the actions described above for: (1) inserting pictures and words into a template, (2) saving the template, and (3) sending the completed template. For the first action, the user selects "Visuals" (621-626) in the user interface 600 of FIG. 4, and is presented with user interface 300 of FIG. 5 to insert images. For the second action, the user selects "Save" (640) and is presented with user interface 400 of FIG. 6 to save the template. For the third action, the user selects "Send" (650) and is presented with user interface 500 of FIG. 7 to send the message. The user can press "Home" (670) and return to FIG. 2 at any time.

Edit Library of Saved Templates

Figure 4:
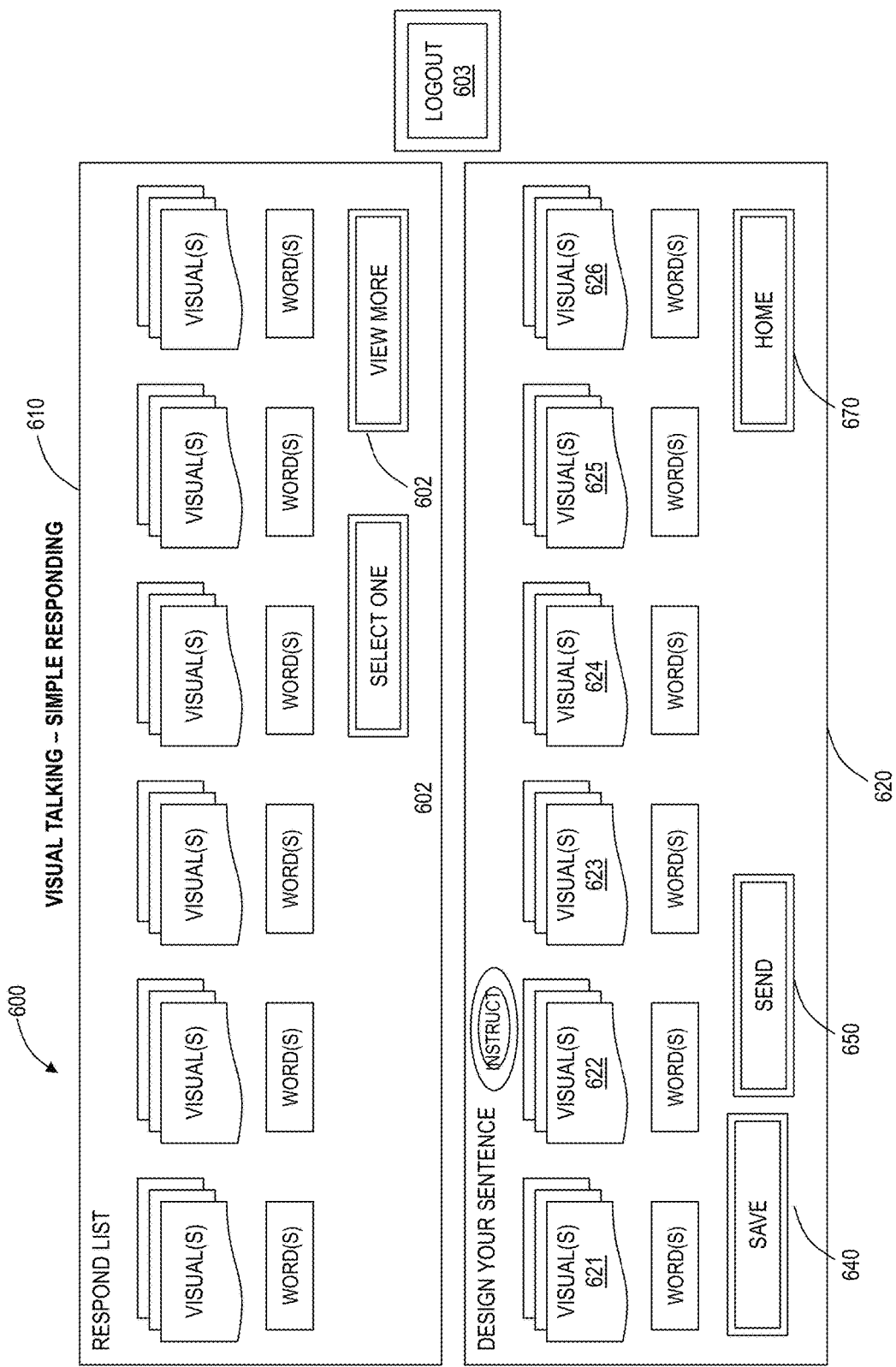
FIG. 4 illustrates an exemplary portal screen for "responding" to messages sent to the login user.
Figure 8:
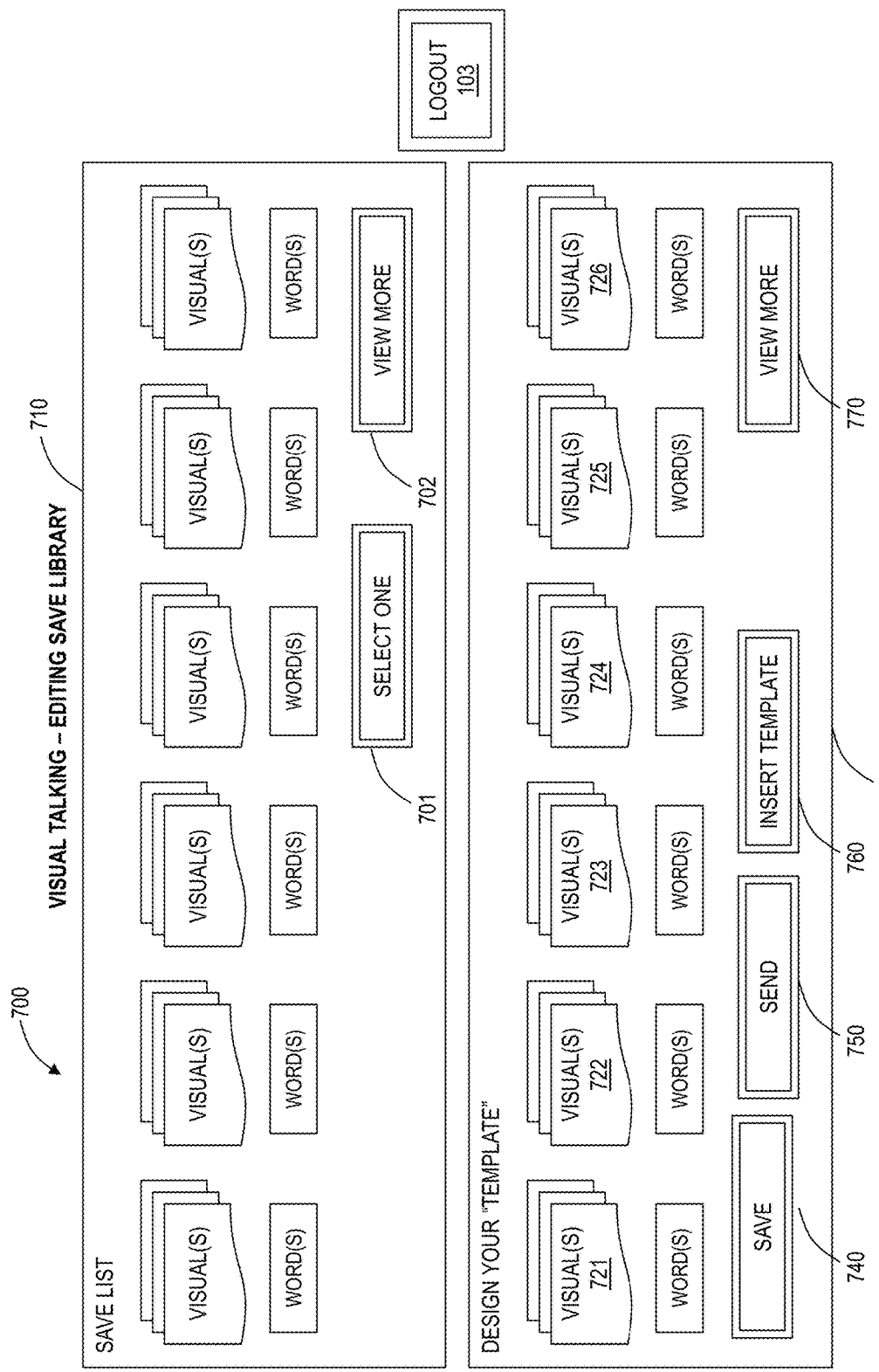
FIG. 8 illustrates an exemplary portal screen for editing the library of saved templates.

As illustrated in the user interface 700 of FIG. 8, a user may want to: (1) add to and complete a previously saved sentence (720), (2) add/insert a previously saved sentence into a larger template (760), or (3) send a previously completed sentence (750). Similar to responding to a message, as illustrated in FIG. 4, the user selects (701) a saved sentence from a list (702) and edits the saved sentence in "Design your template" (720). Once the user completes the template (720), the user has three options: (1) to save (740), (2) to send (750), or (3) to insert into a larger template (760). Selecting save (740), the user is presented with the user interface of FIG. 6. Selecting send (750), the user is presented with the user interface of FIG. 7. Selecting insert/template (760), the user is presented with the user interface of FIG. 3.

Example: Sentence Message

In creating a simple message "I love you" to send to the user's spouse, the user selects the simple sentence template (120) in the home portal (100) illustrated in FIG. 2. The user types "I" in the first word box (131), "love" in the second word box (132), and "you" in the third word box (133). Above the word "I" the user clicks (121) to go to the "insert pictures" portal (300) of FIG. 5, and selects a picture (310) from an external site where the user stored a self-image digital picture from that day. The user inserts that picture (350) and the associated data and tags (320), and selects the insert button (330) to put the image (121) above the "I" in the template 120. Next, the process is repeated for selecting the image (122) above the word "love," which happens to come from the visual dictionary on a search. The template is completed by adding a picture (123) of the intended recipient ("you") from a digital photo scanned into the "insert pictures" portal (300). With the template completed, the user selects save (140) and in the library (400) user interface of FIG. 6, adds the data (410), private (422), and saves (430). As a final step, the user presses send (150) on the user interface of FIG. 2, selects the individual (521) on the user interface of FIG. 7, and hits send (590). The message is sent to the recipient. The person to whom this message is sent has a respond button (160) flashing and responds to the message using a similar process.

Example: Very Simple Dialogue to Make a Choice while Shopping

As another example, consider a female shopper in the dressing room of a major retailer trying to match a potential new pair of shoes with the best dress from several different dress styles. While in the dressing room, the shopper tries on each dress with the pair of shoes and takes a digital picture of herself on her cell phone and stores each image. After taking all the needed dress pictures, the shopper logs into the portal (100) and enters the design a sentence template (120). The shopper types "Which dress?" into the first word box and then above this word box the shopper clicks (121) to go to the "insert pictures" portal (300). From her saved digital pictures (310), the shopper individually adds each picture taken to the insert visuals (350), and without saving these temporary pictures in the visual dictionary (320), the shopper inserts (330) the pictures into the sentence (121) in one box, and skipping save (140), selects send (150) to send the message to her friend. The person to whom this message is sent responds (160) using a similar process, selects the best dress and sends the response to the shopper. The shopper then leaves the dressing room and buys the selected dress.
Example: Paragraph Message Leading to a Book Template With reference to FIG. 9, one method to make a paragraph is to create individual sentences (120 or 210), save them individually in the library (410), and add the sentences individually to the paragraph template (220) by using the save library insert template (720) and the select one (701) sentence from viewing the saved sentences (710). For example, consider a user that wants to send the following message to a group of friends: "I went for a walk in the woods. The trees were in full bloom. I saw birds romancing and I heard their songs. I turned over a rock and saw all kinds of critters . . . " During the walk, the user took many digital photos of the woods, the trees, the blooms, birds, critters, etc. For each sentence, the user builds the sentence using the design your sentence template (120) as described in the simple example above, and saves each sentence in the library (410), but does not send the sentences saved. Once all sentences are completed and saved, using the interface of FIG. 8, the user edits the save library (720), selects insert template (760) to select a paragraph (220), clicks "select one" (701) to choose a previously saved sentence, and inserts the sentence into the paragraph template. Once the paragraph is complete the user saves (400) the paragraph and sends the paragraph (500) to a group (522) of friends.

Figure 9:
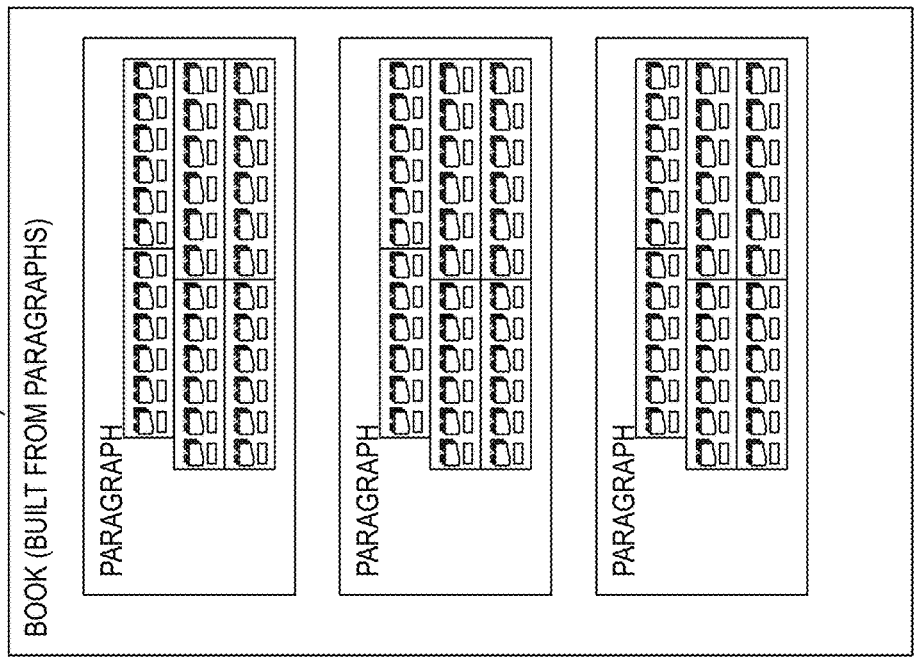
FIG. 9 illustrates an exemplary flow of how to construct a paragraph or book from a plurality of saved sentences.

With reference to FIG. 9, the user can create a book, story, or longer template by saving individual paragraphs (220) and then combining the paragraphs together in a book template (250). Combining paragraphs can include editing and manipulation of a plurality of saved sentence templates. The book building process is similar to the paragraph building process described above.
Example: How to Manual at Work With reference again to FIG. 9, a how to instruction manual at work can be built easily by creating simple sentence (210) instructions and then adding each sentence instruction in a sequenced list to the manual template which is similar to a book template.
Example: Maintenance Worker Asking for Best Way to Fix Trouble at Remote Site Similar to the shopper example above, consider a maintenance worker who could be at a local site to repair a machine, but needs expert advice from the central office.

Similar to the shopper example, the maintenance worker takes pictures of the machine in action and uses these pictures in sentences sent to the expert, for the expert to select the best way forward. The maintenance worker performs the work recommended by the remote expert and records this success in a workflow (280) template. Furthermore, the maintenance worker can go to the save library (700) and view the pictoral operating manual (290) for the machine.
Web Portal Referring to FIG. 10, in an exemplary embodiment, a block diagram illustrates a server 1200 which may be utilized in an exemplary implementation of the web portal 10. The web portal 10 may be formed through one or more servers 1200. The server 1200 may be a digital computer that, in terms of hardware architecture, generally includes a processor 1202, input/output (I/O) interfaces 1204, a network interface 1206, a data store 1208, and a memory 1210. It should be appreciated by those of ordinary skill in the art that FIG. 10 depicts the server 1200 in an oversimplified manner, and a practical embodiment may include additional components and suitably configured processing logic to support known or conventional operating features that are not described in detail herein. The components (1202, 1204, 1206, 1208, and 1210) are communicatively coupled via a local interface 1212. The local interface 1212 may be, for example but not limited to, one or more buses or other wired or wireless connections, as is known in the art. The local interface 1212 may have additional elements, which are omitted for simplicity, such as controllers, buffers (caches), drivers, repeaters, and receivers, among many others, to enable communications. Further, the local interface 1212 may include address, control, and/or data connections to enable appropriate communications among the aforementioned components.

The processor 1202 is a hardware device for executing software instructions. The processor 1202 may be any custom made or commercially available processor, a central processing unit (CPU), an auxiliary processor among several processors associated with the server 1200, a semiconductor-based microprocessor (in the form of a microchip or chip set), or generally any device for executing software instructions. When the server 1200 is in operation, the processor 1202 is configured to execute software stored within the memory 1210, to communicate data to and from the memory 1210, and to generally control operations of the server 1200 pursuant to the software instructions. The I/O interfaces 1204 may be used to receive user input from and/or for providing system output to one or more devices or components. User input may be provided via, for example, a keyboard, touch pad, and/or a mouse. System output may be provided via a display device and a printer (not shown). I/O interfaces 1204 can include, for example, a serial port, a parallel port, a small computer system interface (SCSI), an infrared (IR) interface, a radio frequency (RF) interface, and/or a universal serial bus (USB) interface.

The network interface 1206 may be used to enable the server 1200 to communicate on a network, such as the Internet and the like, etc. For example, the server 1200 can utilize the network interface 1206 to communicate to/from a plurality of users of the web portal 10, etc. The network interface 1206 may include, for example, an Ethernet card or adapter (e.g., 10BaseT, Fast Ethernet, Gigabit Ethernet) or a wireless local area network (WLAN) card or adapter (e.g., 802.11a/b/g/n). The network interface 1206 may include address, control, and/or data connections to enable appropriate communications on the network. A data store 1208 may be used to store data. The data store 1208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1208 may incorporate electronic, magnetic, optical, and/or other types of storage media. In one example, the data store 1208 may be located internal to the server 1200 such as, for example, an internal hard drive connected to the local interface 1212 in the server 1200. Additionally in another embodiment, the data store 1208 may be located external to the server 1200 such as, for example, an external hard drive connected to the I/O interfaces 1204 (e.g., SCSI or USB connection). In a further embodiment, the data store 1208 may be connected to the server 1200 through a network, such as, for example, a network attached file server.

The memory 1210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 1210 may incorporate electronic, magnetic, optical, and/or other types of storage media. Note that the memory 1210 may have a distributed architecture, where various components are situated remotely from one another, but can be accessed by the processor 1202. The software in memory 1210 may include one or more software programs, each of which includes an ordered listing of executable instructions for implementing logical functions. The software in the memory 1210 includes a suitable operating system (O/S) 1214 and one or more programs 1206. The operating system 1214 essentially controls the execution of other computer programs, such as the one or more programs 1206, and provides scheduling, input-output control, file and data management, memory management, and communication control and related services. The operating system 1214 may be any of Windows NT, Windows 2000, Windows XP, Windows Vista, Windows 7, Windows Server 2003/2008 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), or the like. The one or more programs 1216 may be configured to implement the various processes, algorithms, methods, techniques, etc. described herein with respect to the web portal 10 and the like.

Mobile Device

Figure 11:
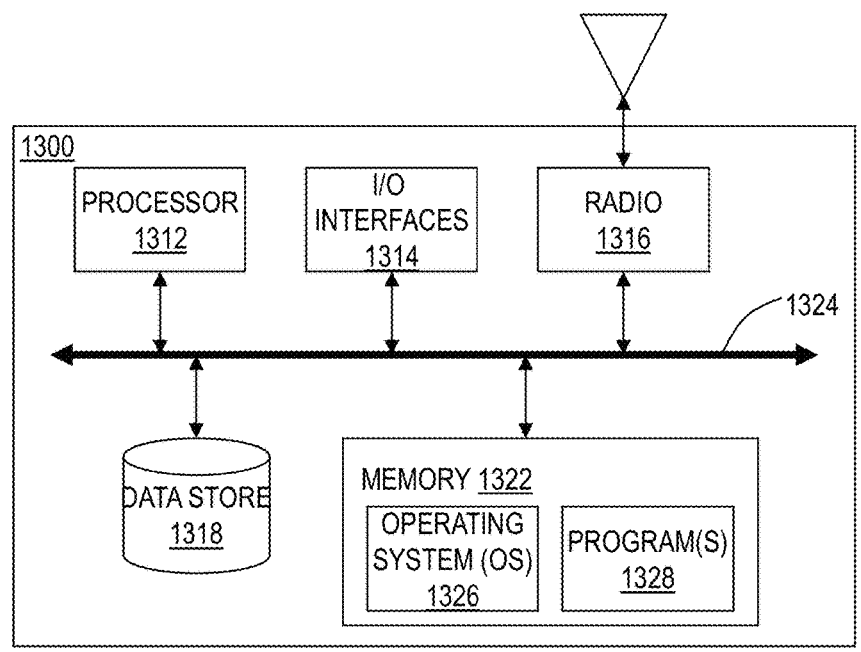
FIG. 11 illustrates an exemplary block diagram of a mobile device which may be utilized to provide mobile communications with sequential images.

Referring to FIG. 11, in an exemplary embodiment, the present disclosure may include a mobile device 1300 with various components configured for providing mobile communications using sequenced images. The mobile device 1300 may be a cell phone, smart phone, portable digital accessory (PDA), tablet device, laptop computer, and the like. The mobile device 1300 may be a digital device that, in terms of hardware architecture, generally includes a processor 1312, input/output (I/O) interfaces 1314, a radio 1316, a data store 1318, and memory 1322. It should be appreciated by those of ordinary skill in the art that FIG. 11 depicts the mobile device 1310 in an oversimplified manner, and a practical embodiment may include additional components and suitably configured processing logic to support known or conventional operating features that are not described in detail herein. The components (1312, 1314, 1316, 1318, 1320, and 1322) are communicatively coupled via a local interface 1324. The local interface 1324 can be, for example but not limited to, one or more buses or other wired or wireless connections, as is known in the art. The local interface 1324 can have additional elements, which are omitted for simplicity, such as controllers, buffers (caches), drivers, repeaters, and receivers, among many others, to enable communications. Further, the local interface 1324 can include address, control, and/or data connections to enable appropriate communications among the aforementioned components.

The processor 1312 is a hardware device for executing software instructions. The processor 1312 can be any custom made or commercially available processor, a central processing unit (CPU), an auxiliary processor among several processors associated with the mobile device 1310, a semiconductor-based microprocessor (in the form of a microchip or chip set), or generally any device for executing software instructions. When the mobile device 1310 is in operation, the processor 1312 is configured to execute software stored within the memory 1322, to communicate data to and from the memory 1322, and to generally control operations of the mobile device 1310 pursuant to the software instructions. The I/O interfaces 1314 can be used to receive user input from and/or for providing system output to one or more devices or components. User input can be provided via, for example, a keyboard, a keypad, a mouse, a scroll bar, buttons, and the like. System output can be provided via a display device such as a liquid crystal display (LCD), touch screen, and the like. The I/O interfaces 1314 can also include, for example, a serial port, a parallel port, a small computer system interface (SCSI), an infrared (IR) interface, a radio frequency (RF) interface, and/or a universal serial bus (USB) interface. The I/O interfaces 1314 can include a graphical user interface (GUI) that enables a user to interact with the mobile device 1310. Furthermore, the I/O interfaces 1314 may include a camera and/or video camera device configured to obtain images. The camera may be utilized in conjunction with the dialog presented in FIG. 6 with providing new images for use in communications.

The radio 1316 enables wireless communication to an external access device or network. Any number of suitable wireless data communication protocols, techniques, or methodologies can be supported by the radio 16, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB. The data store 1318 can be used to store data. The data store 1318 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1318 can incorporate electronic, magnetic, optical, and/or other types of storage media.

The memory 1322 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 1322 may incorporate electronic, magnetic, optical, and/or other types of storage media. Note that the memory 1322 can have a distributed architecture, where various components are situated remotely from one another, but can be accessed by the processor 1312. The software in memory 1322 can include one or more software programs, each of which includes an ordered listing of executable instructions for implementing logical functions. In the example of FIG. 11, the software in the memory system 1322 includes a suitable operating system (O/S) 1326 and programs 1328. The operating system 1326 essentially controls the execution of other computer programs, and provides scheduling, input-output control, file and data management, memory management, and communication control and related services. The operating system 1326 can be any of LINUX (or another UNIX variant), Android (available from Google), Symbian OS, Microsoft Windows CE, iPhone OS (available from Apple, Inc.), Palm OS, Blackberry OS, and the like.

Exemplary System Configurations

Figure 12:
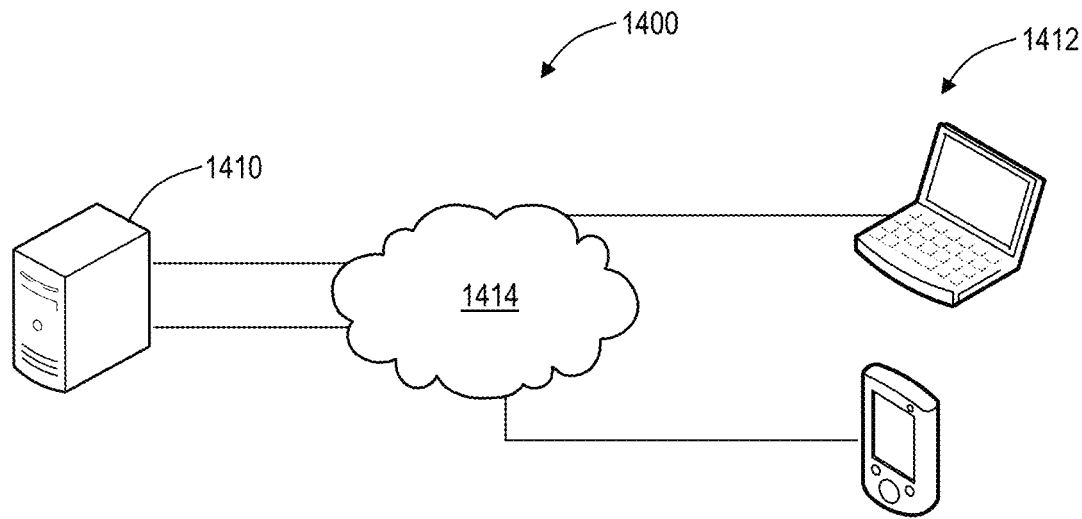
FIG. 12 illustrates exemplary operational scenarios of the present disclosure including a web portal-based scenario and an application-based scenario.
Figure 12:
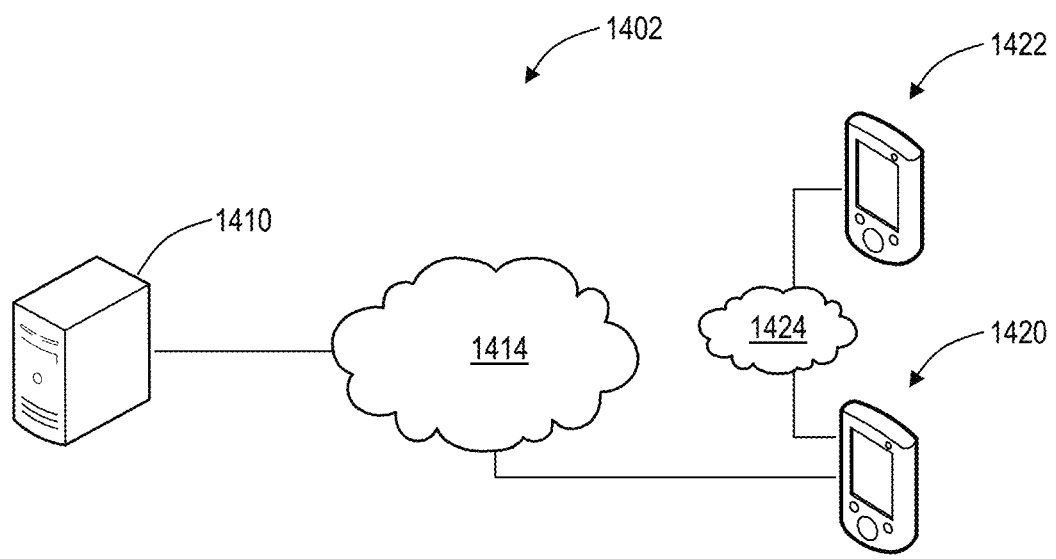

Referring to FIG. 12, in exemplary embodiments, various diagrams illustrate exemplary operational scenarios providing mobile communications using sequenced images. As described herein, the systems and methods of the present disclosure enable communications between users using sequenced images. FIG. 12 illustrates two exemplary operational scenarios including a web portal-based scenario 1400 and an application-based scenario 1402. Each of these exemplary scenarios 1400, 1402 may be utilized to perform the systems and methods described herein.

In an exemplary embodiment, the web portal-based scenario 1400 includes a web portal 1410 connected to a plurality of users 1412 via a network 1414, such as the Internet. Here, the plurality of users 1412 may include laptop computers, desktop computers, tablets, mobile devices, and the like connected to the network 1414, e.g. through wired connections (cable modem, digital subscriber loop (DSL), dial-up, Ethernet, etc.) or wireless connections (3G/4G cellular, WLAN, WIMAX, etc.). One of the users 1412 may access the web portal 1410, such as described in FIG. 1A, and create a message of sequenced images via the web portal 1410. Once created, the message may be sent via the web portal 1410 to another of the users 1412. For example, the message may be sent through any form known in the art, including, but not limited to, emails, web link, picture message via Multimedia Messaging Service (MMS), text message via Short Message Service (SMS), tweet via Twitter®, instant message, Facebook® update, and the like. Of note, in the web portal-based scenario 1400, the message is created on the web portal 1410 using a UI and associated dictionaries connected to the web portal 1410. That is, the users 1412 may implement any of the methods, processes, mechanisms, etc. described herein in FIGS. 1-9 via the web portal 1410.

In another exemplary embodiment, the application-based scenario 1402 includes a first user 1420 communicatively coupled to a second user 1422 via a network 1424. In one exemplary embodiment, the first user 1420 may include a mobile device such as the mobile device 1300 and the network 1424 may include a wireless network (e.g. 3G/4G cellular, WLAN, WIMAX, etc.). Here, the mobile device 1300 includes an application in the programs 1328 that may be referred to as a visual dictionary application. The application is configured to provide similar functionality as the web portal 1410. Specifically, the application may be configured to implement any of the methods, processes, mechanisms, etc. described herein in FIGS. 1-9. Using the application, the first user 1420 may create a message of sequenced images on the mobile device 1300. The application may allow the first user 1420 to send the message to the second user 1422 via the network 1424. For example, the message may be sent through any form known in the art, including, but not limited to, emails, web link, picture message via Multimedia Messaging Service (MIMS), text message via Short Message Service (SMS), tweet via Twitter®, instant message, Facebook® update, and the like. The second user 1422 does not necessarily have to be configured with the application for receipt of the message. The second user 1422 may receive the message via conventional mechanisms.

In an exemplary embodiment in the application-based scenario 1402, the first user 1420 may connect once or periodically to the web portal 1410 (or another server). For example, the web portal 1410 may provide the application in downloaded form to the mobile device 1300. It is expected that the first user 1420 may connect to the web portal 1410 for initial download and installation of the application. Furthermore, the first user 1420 may connect to the web portal 1410 periodically for updates, image synchronization, and the like.

In both the web portal-based scenario 1400 and the application-based scenario 1402, the web portal 1410 may include a visual dictionary as part of the data store 1208 and the memory 1210. As described herein, the visual dictionary includes a plurality of images used to create messages. FIG. 5 illustrates using the visual dictionary for creating a message, and FIG. 6 illustrates adding new images into the visual dictionary. In the web portal-based scenario 1400, the visual dictionary may be extremely large with billions and billions of images stored at the web portal 1410. Note, each user may have a customized visual dictionary, but a particular image may be stored once and tagged separately for each user. That is, the visual dictionary for the web portal 1410 may include a vast plurality of images along with individual dictionaries for a plurality of users with the individual dictionaries including specific images of the plurality of images.

In the application-based scenario 1402, the visual dictionary may be referred to as a local visual dictionary that is stored within the mobile device 1300 (e.g. in the data store 1318, the memory 1322, etc.). The application-based scenario 1402 may be constrained in an amount of storage available at the mobile device 1300 for the visual dictionary. As storage amounts increase in the mobile device 1300, the local visual dictionary may include more images. In an exemplary embodiment, the local visual dictionary may include a subset of the plurality of images stored in the web portal 1410. This subset may be user-defined, dynamically adjusted based on usage history, predetermined, and the like. Furthermore, the mobile device 1300 may synchronize with the web portal 1410 on a periodic basis to upload/download new images and the like.

In an exemplary embodiment, a user in the application-based scenario 1402 may also be a user in the web portal-based scenario 1400. Here, the user may define a visual dictionary on the web portal 1410 that is synchronized with the mobile device 1300. For example, the user may enter the web portal and select particular images of the plurality of images on the web portal 1410 for use in the local visual dictionary. Alternatively, the web portal 1410 may be configured to cache recently used images of the user and to synchronize these in the local visual dictionary.

Palette of Forms

Referring to FIGS. 13-24, in various exemplary embodiments, the present disclosure may be utilized building and managing a layered dialogue of a community using electronic dialogue communication amongst a plurality of users. Since the invention of the printing press, words have dominated communication, and there are few other communication methods beside the "I talk, you listen and respond" format, and their use is very limited, such as hand sign language for the deaf. More recently, with the advent of text messaging, a limited set of simple symbols, like "smiley or sad faces" are being added to word messages. These simple symbols lack any rich or descriptive meaning and as such, are normally used to end a conversation. Still, the simple symbols are put in simple word sentences and inserted into the "I talk, you listen and respond" conversation format.

The electronic communications dialog systems and methods described herein utilizes sentences based on images as the fundamental component of a sentence. However, this new system continues to use the "I talk, you listen and respond" conversation format demanded by word-based systems. It is as though the command and control mechanism of the spoken or written word is commanding the communication using images, where no such command and control is required. The electronic communications dialog systems and methods described herein may be utilized to allow unique and flexible methods to create a new conversation flow of image, sentences, or visual templates for individuals or defined communities. Without the use of words, and by using images, hundreds (or thousands or millions of geographically diverse language backgrounds) of community members may visually talk simultaneously or in new organized flows.

The current "I talk, you listen" command and control communication mechanism may be replaced by a system and method that uses visual templates uniquely inserted, arranged, rearranged, and reused in many new conversation style forums assembled in a predetermined sequence for a specific community, e.g. inserting a visual template of a complete new business idea in an editor forum ensures it will be focused upon, and then inserted in a circle peer forum to expand the idea, and finally to be inserted into a workflow forum to be approved and quickly implemented ensures that the idea gets fully explored, expanded, approved and then correctly implemented. Three different command and control communication mechanism where used on one template distributed among many forums and an unlimited number of members. Therefore, it is desirable to build a communication system and method that uses visual templates inserted into any number of predetermined forum styles organized in a precise flow by community members.

Figure 13:
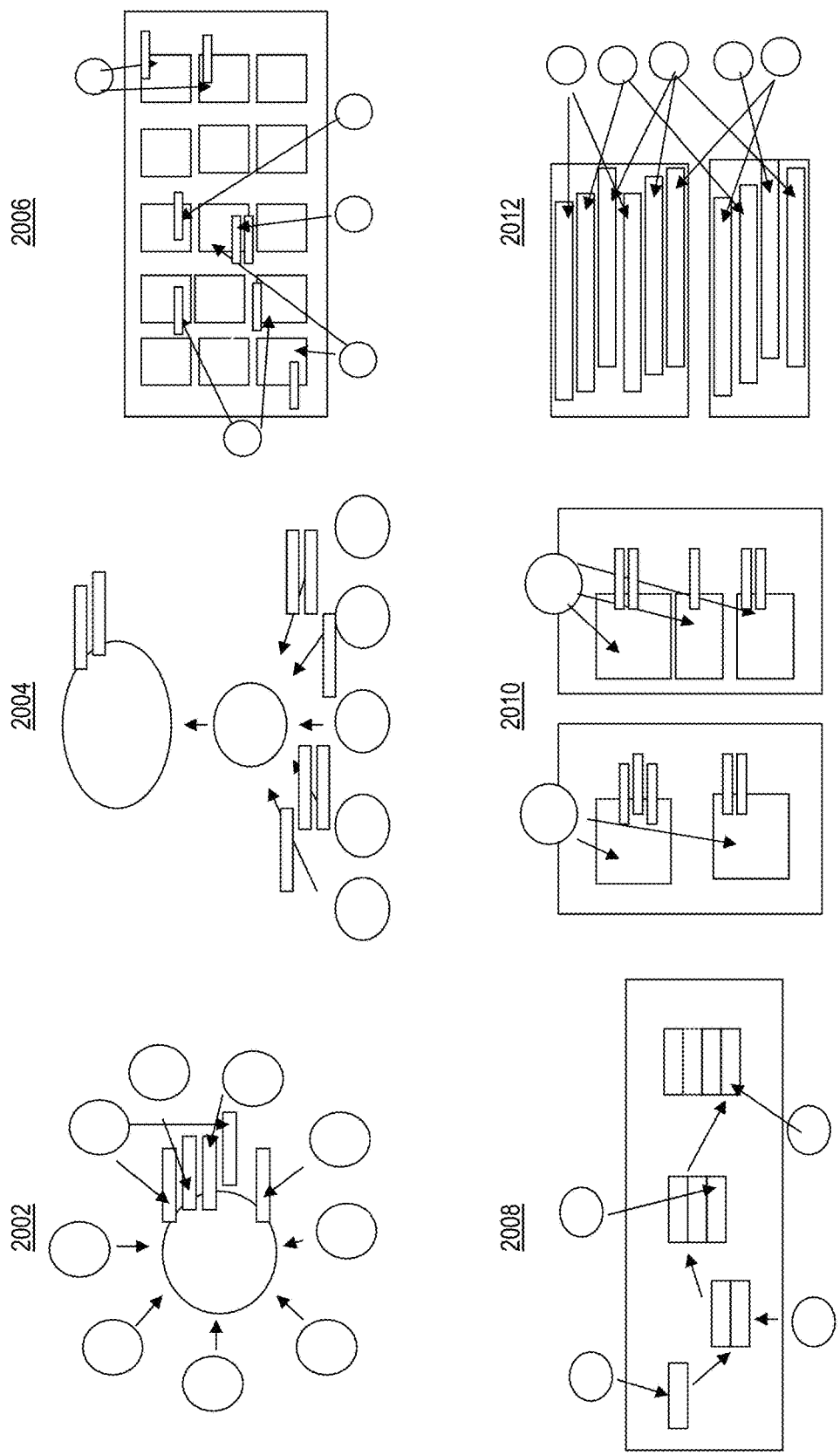
FIG. 13 illustrates an exemplary block diagram of a sample of the possible conversation forum styles used individually or in a collective process flow for a community.

Collectively, FIGS. 13-24 described a "palette of forms" using the electronic communications dialog systems and methods described herein outside the standard "I talk, you listen" structure. FIG. 13 illustrates an overview of the palette which contains a sample of the possible conversation forum styles used individually or in a collective process flow for a community. Specifically, exemplary conversation forum styles may include a circle peer forum 2002 described in FIG. 15, an editor forum 2004 described in FIG. 16, a topic wall 2006 described in FIG. 17, a workflow forum 2008 described in FIG. 18, posting style 2010 described in FIG. 19, and linear style 2012 described in FIG. 20. FIGS. 15-20 illustrate exemplary forums that may be created using the visual image communication system and method of the present disclosure. A lead member may select a particular forum style or styles for the community and put them in a defined sequence (examples are illustrated in FIGS. 21-24). Individual members may access the community forums by entering a portal (via computer browser, a PDA browser, smart phone browser, etc), joining a community, and entering their visual templates in the specific forum or flow of forums.

Figure 14:
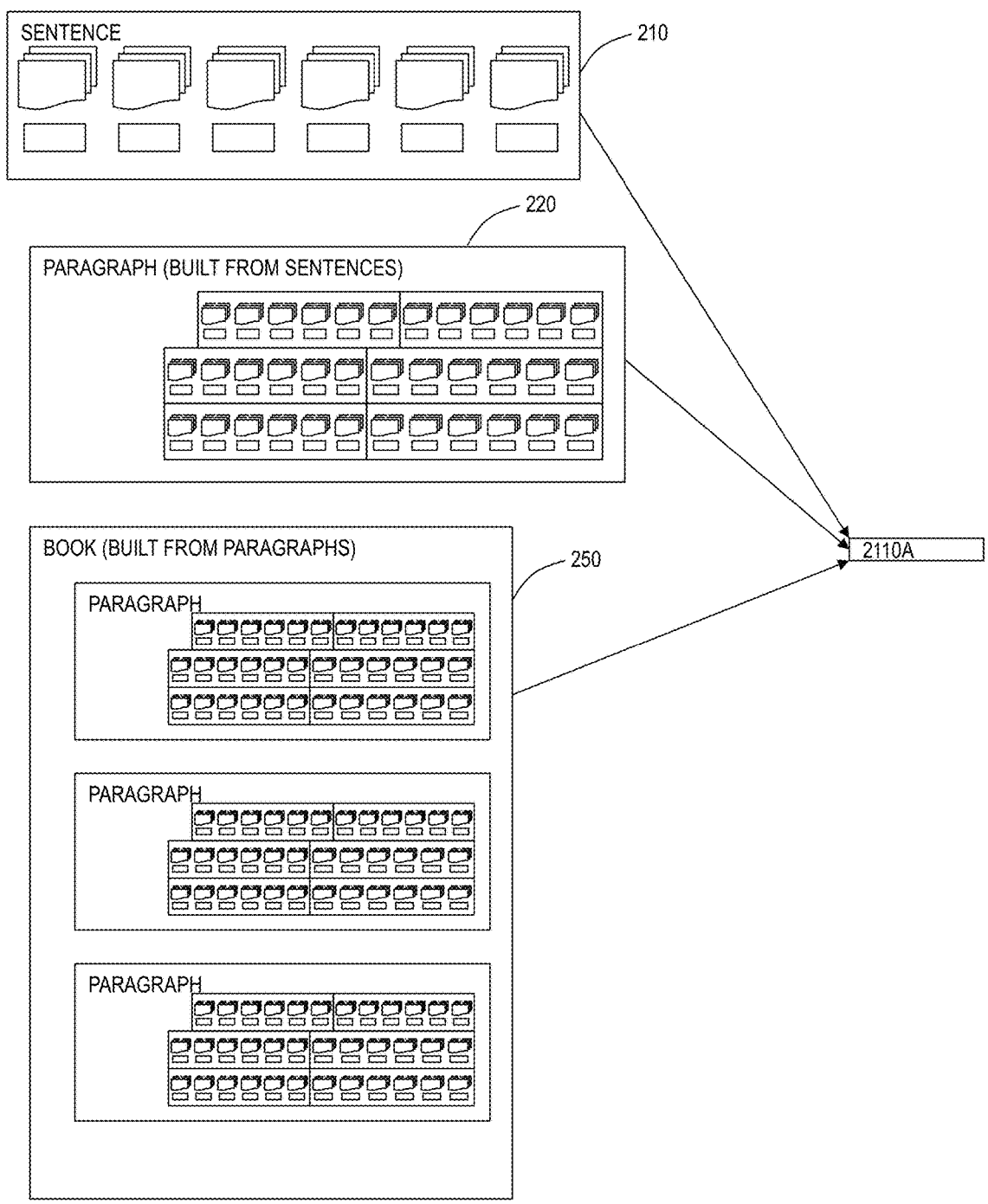
FIG. 14 illustrates a visual template which may be used a conversation sentences, threads, etc. flowing through the structure of forums.

FIG. 14 illustrates a visual template 2110A which may be used in a conversation sentences, threads, etc. flowing through the structure of the forums described in FIGS. 15-20. As described in FIG. 9, the visual template 2110A may include a visual sentence 210, a visual paragraph 220, a visual book 250, and the like, each of which contain images as the basic foundation for conveying a message. In FIGS. 15-20, this visual template 2110A structure is summarized in a message block (2110A) from a specific member (10), for example 2110A is the first visual template message from member 10 with the last digits referring to the member and A referring to the first message sent. Further, 2110B is the send message from member 10, 2111A is a first message from member 11, etc. In this manner, FIGS. 15-20 illustrate message flows from various members 2200 using the visual templates 21XXn where XX is the member on the FIG. and n is the sequenced message from the member.

Figure 15:
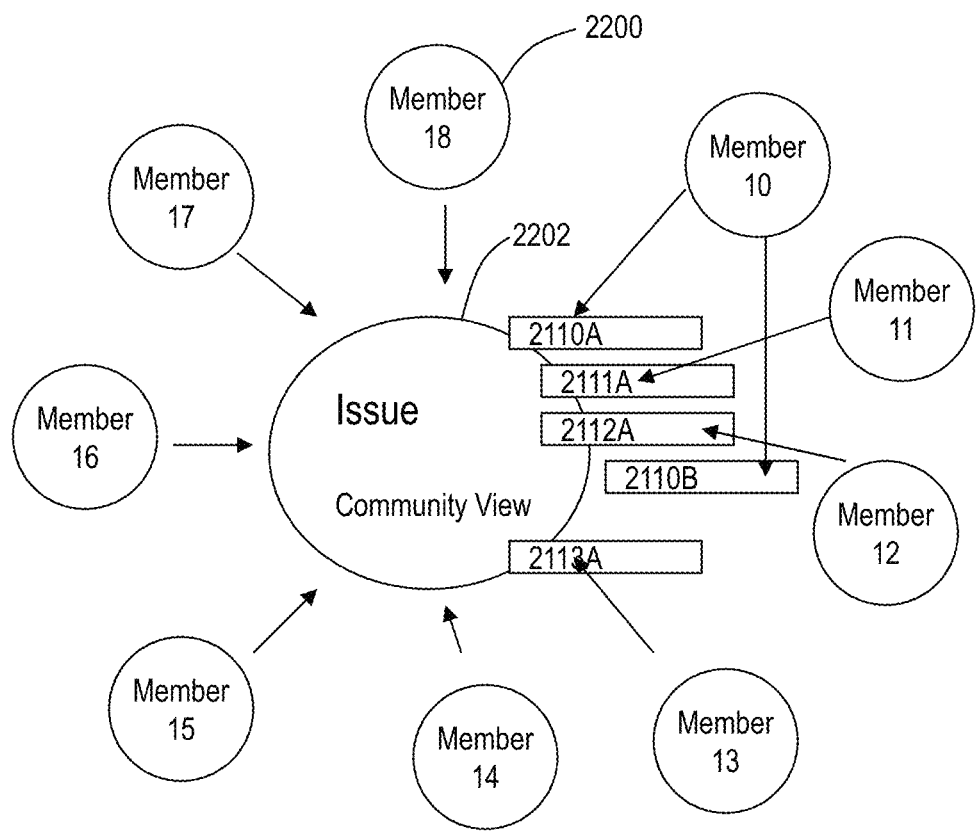
FIG. 15 illustrates the circle peer forum where an entire community of members may access to view, respond, etc. to all visual templates.

FIG. 15 illustrates the circle peer forum 2002 where an entire community of members 2200 may access to view, respond, etc. to all visual templates 2110. The circle peer forum 2002 conversation style allows all members 2200 (10, 11, 12, 13, 14, etc) to see all other members visual templates 2110 and to respond to all other visual templates. For example, the various visual templates 2110 may be "posted" in a community view 2202 where all members 2200 may view, respond, etc. The community view 2202 may be physically stored at web portal 10 and accessed by the members 2200 via a mobile device 1300 or the like. The circle peer forum 2002 is useful for openly discussing an issue (a point, an idea, etc) to get all relevant facts, points of view, etc. to fully understand the issue. In operation, a member 2200 may click on any visual template 2110 from another member (e.g. the visual template 2110A) and respond (e.g. the visual template 2110B), and other members 2200 may respond to any of the other members 2200 and the circle peer forum 2002 keeps track.

Figure 16:
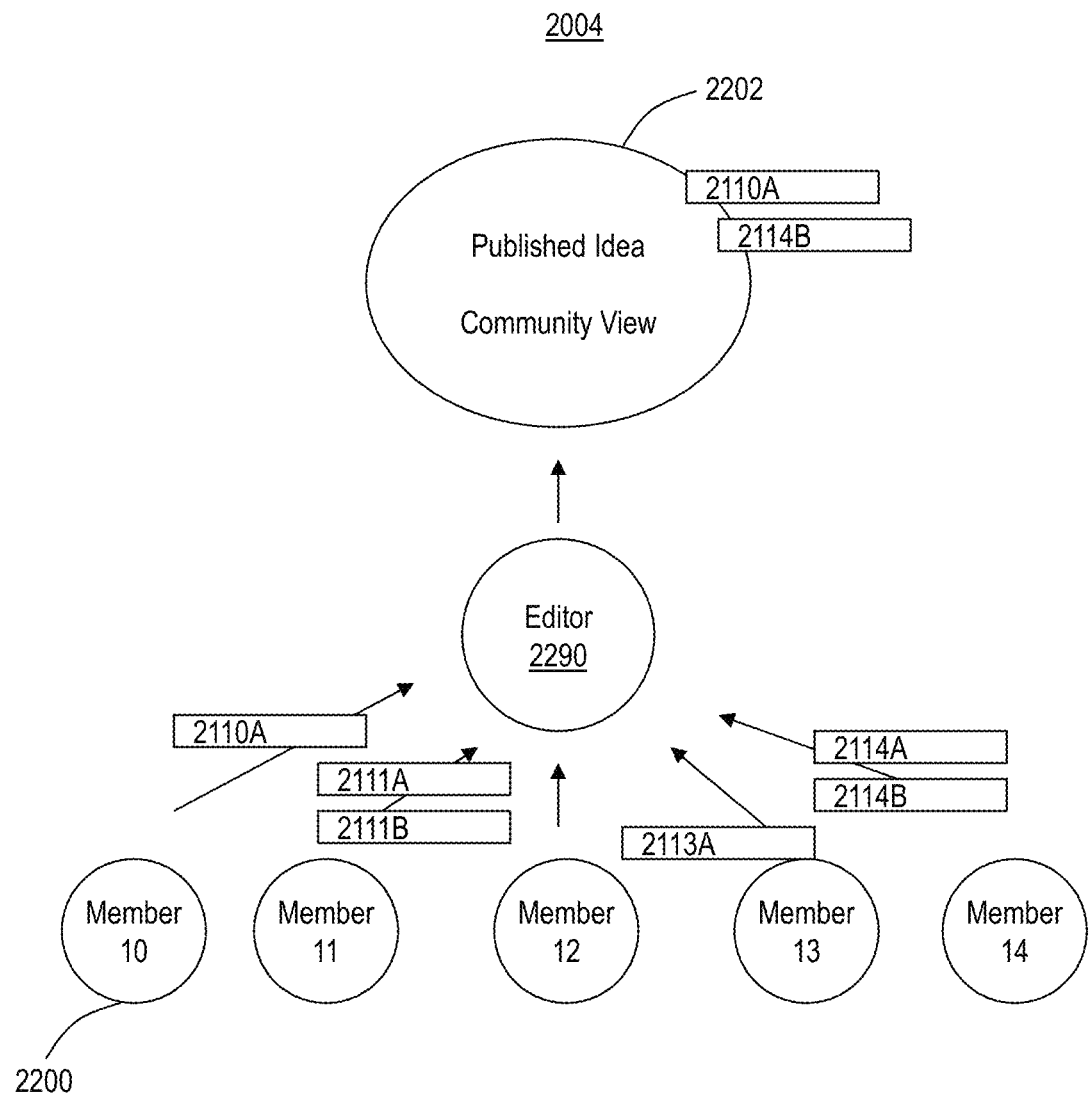
FIG. 16 illustrates the editor forum where an entire community submits their visual templates to one editor.

FIG. 16 illustrates the editor forum 2004 where an entire community submits their visual templates 2110 to one editor 2290, and the editor 2290 is the only one who can see these submitted visual templates 2110, but the editor 2290 selects some visual templates 2110 to publish to the entire community to see in the community view 2202. The editor forum 2004 is particularly useful for communities who want to have a clear decision on all conversations. For example, in FIG. 16, the editor 2290 selects only the visual templates 2110A, 2114B for the community view 2202.

Figure 17:
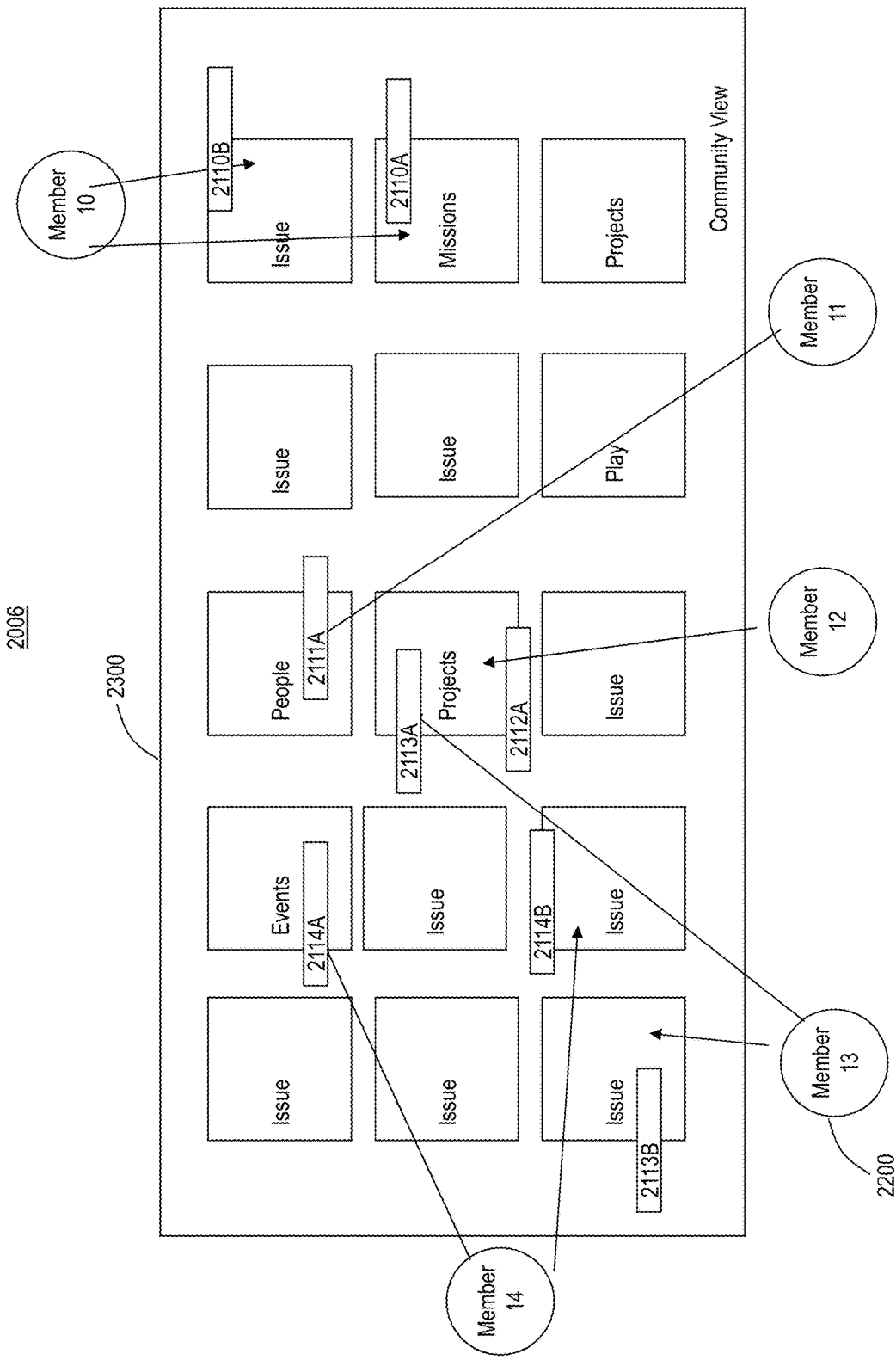
FIG. 17 illustrates the topic wall where all the members can select a specific issue on a topic and submit the visual templates to that issue for other to view.

FIG. 17 illustrates the topic wall 2006 where all the members 2200 can select a specific issue on a topic wall 2300 and submit the visual templates 2110 to that issue for others to view. The topic wall 2006 is particularly useful for large communities that have many different subjects to discuss. For example, the topic wall 2300 may be physically stored at web portal 10 and accessed by the members 2200 via a mobile device 1300 or the like. The topic wall 2006 may include any topic such as, for example, issues, events, people, projects, missions, play, etc.

Figure 18:
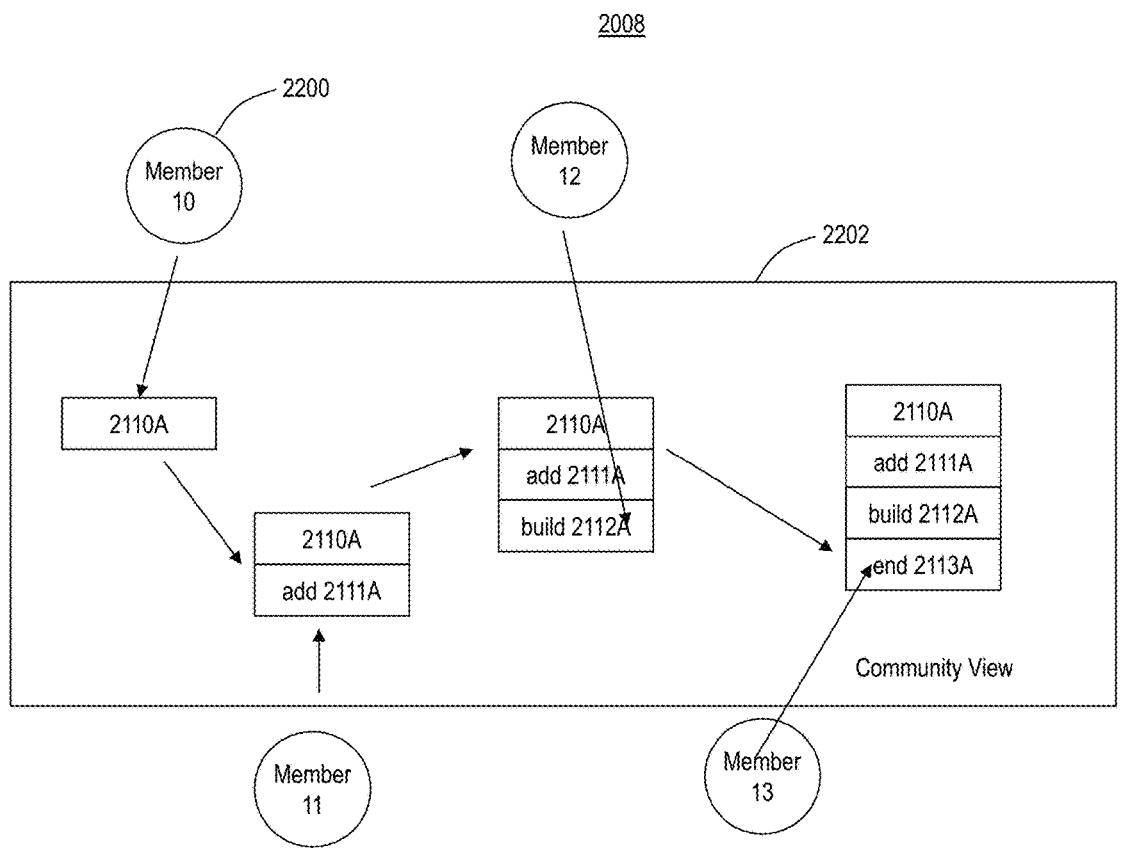
FIG. 18 illustrates the workflow forum where all of the members can see the entire flow in the community view, but only certain of the members can comment on the visual templates at certain times in the flow.

FIG. 18 illustrates the workflow forum 2008 where all of the members 2200 can see the entire flow in the community view 2202, but only certain of the members 2200 can comment on the visual templates 2110 at certain times in the flow. The workflow forum 2008 allows all of the members 2200 to view and comment on a subject as it moves through various different viewpoints, e.g. different departments in a corporation, with the end result being a conversation that has moved in a linear fashion through different groups. This is particularly useful for communities who want to ensure certain key functions have reviewed and commented.

Figure 19:
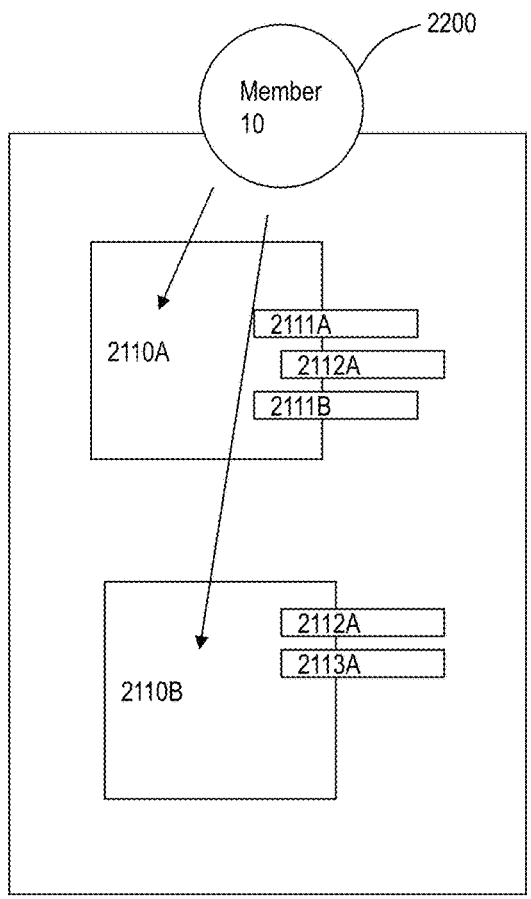
FIG. 19 illustrates the posting style where a specific member creates an ongoing story where other members can insert their visual template comments.
Figure 19:
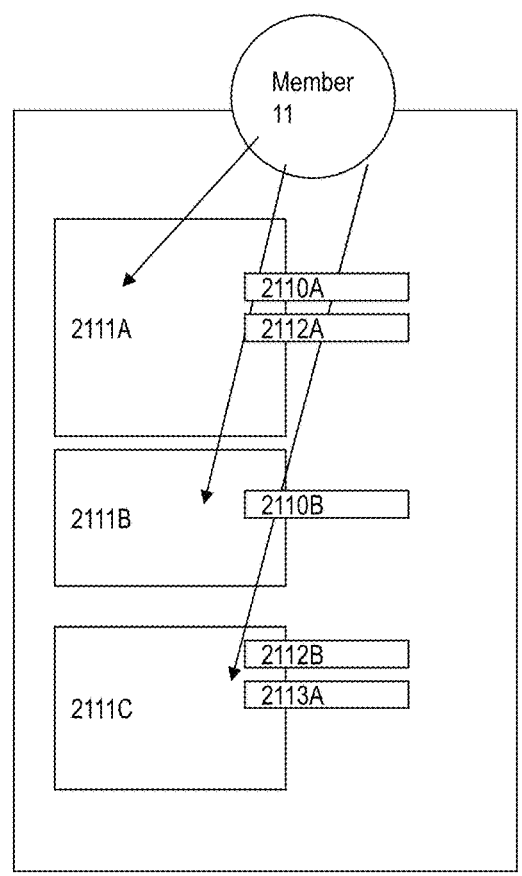

FIG. 19 illustrates the posting style 2010 where a specific member 2200 creates an ongoing story where other members 2200 can insert their visual template 2110 comments. The posting style 2010 allows individual members 2200 to keep a running portrayal of their visual templates 2110 over time, with the ability of other members 2200 to comment with their visual templates 2110 on any part of the running portrayal. This is particularly useful for individuals and groups to share a developing story, activity, thought, etc over time and review how that area changed over time and who had input.

Figure 20:
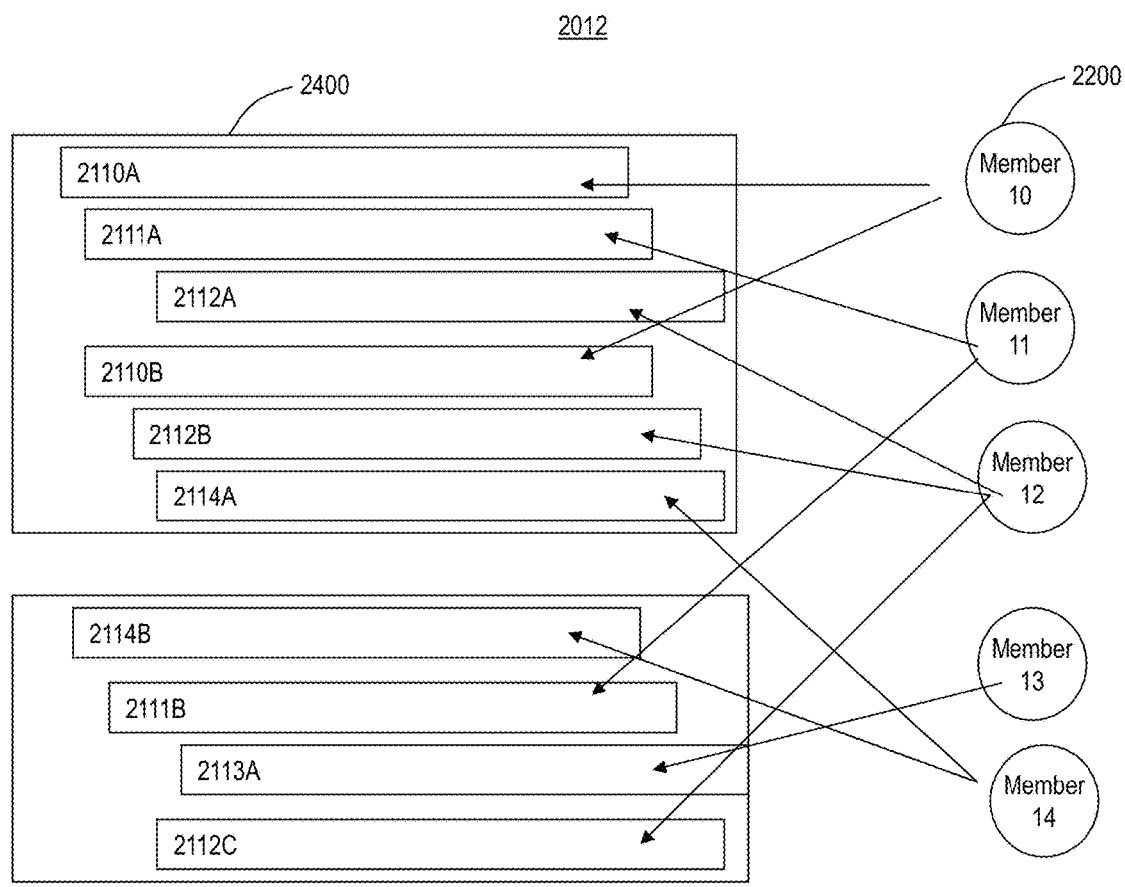
FIG. 20 illustrates the linear style where all of the members can enter the flow of a conversation at any point.

FIG. 20 illustrates the linear style 2012 where all of the members 2200 can enter the flow of a conversation 2400 at any point. The linear style 2012 allows the members 2200 to send messages and respond to messages and show the linear progression of the conversation 2400. This is intended to keep track of basic conversations between a few individual members 2200.

Creating a Community with Profiles and Layered Forum Conversations

In the word dominated world of "I talk, you Listen", the flow of the conversation is already defined, so there is little need when using words to change the conversation style.

Using visual templates 2110 as the basis of communication instead of words, the flow of the first conversation and each subsequent conversation among a few members 2200 or all members 2200 can be designed and determined by community leader(s). A community leader will want the flexibility to start a conversation in certain way and have the flow of the conversation evolve into different conversation forums.

Figure 21:
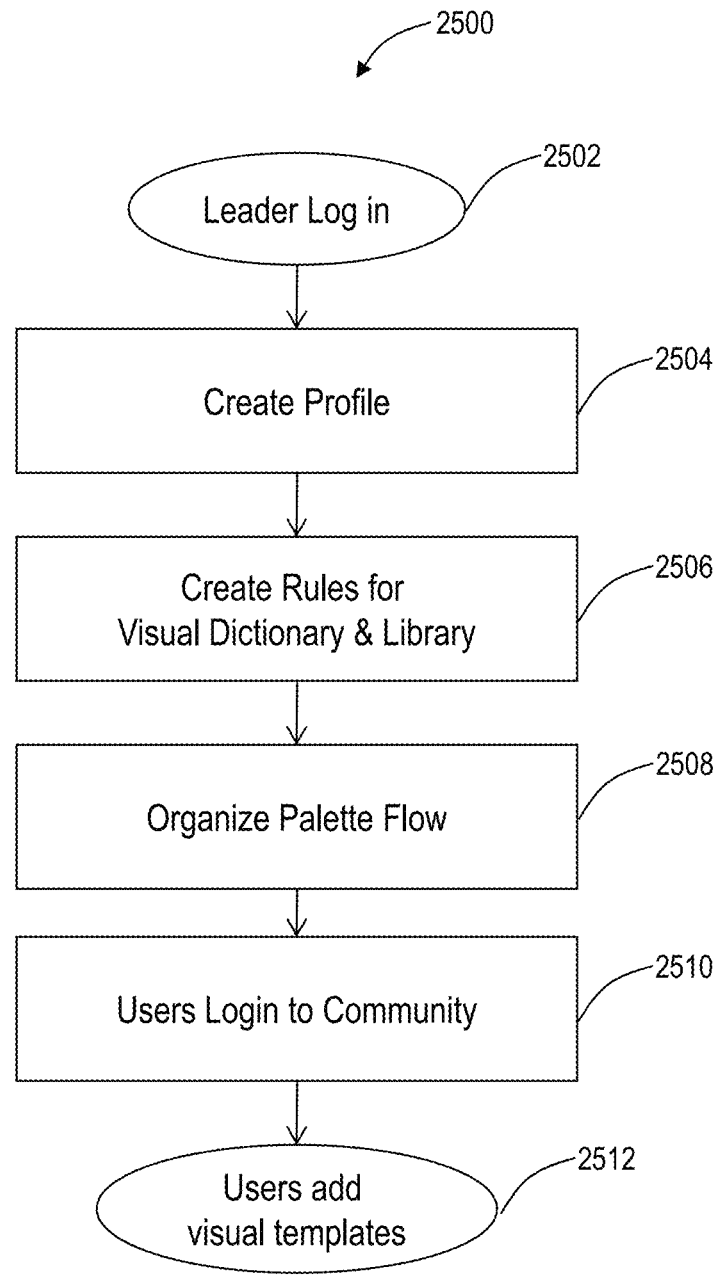
FIG. 21 illustrates a flowchart of an exemplary embodiment for a community leader(s) to build a new community with the desired layered conversations for visual templates.

FIG. 21 illustrates a flowchart of an exemplary embodiment 2500 for a community leader(s) to build a new community with the desired layered conversations for visual templates. As described herein, a community leader, member, etc. is an individual with a device, component, etc. configured to utilize the visual templates via the portal 10 and the like. In the exemplary embodiment 2500, a leader logs into the portal 10 (step 2502) to create a profile allowing individual members to sign up (step 2504), to articulate rules to guide member creation of public and private visual dictionaries and visual libraries (2506), and to organize a conversation flow from a palette (2508). At this point, users, etc. may login through the profile (step 2510), and the users, now members, may participate fully by adding their visual template messages to the forums (step 2512).

Thus, the present disclosure may be utilized for building and managing the layered dialogue of a community using electronic dialogue communication (e.g. via images) amongst a plurality of users. The users may be based on a community definition that includes common binding membership elements. The community leaders may use structures from a palette of forums defining how the flow of dialogue progresses and evolves among users. Users may participate by submitting their visual templates (i.e. sentences, paragraphs, books, etc.) into the dialogue flow.

To initiate a community, leaders select certain membership criteria, certain visual dictionary and visual library rules. The leaders may select from a palette the type of conversations (e.g. circle peer style, an editor style, a topic wall style, a workflow style, a posting style, etc.) and then sequence them in a predetermined flow. Users can enter the entire conversation flow or just parts thereof of their choosing to engage in dialogue.

To initiate or join a conversation, a user first selects the preferred community(ies) they are a member of, and upon entry scans all the conversations, and adds their appropriate template in a conversation, or creates a new conversation directed at members they chose. The user can enter discussion at various points. The user creates their templates from a set of templates already created by the community, or from their private library of templates and completed templates. To insert images into a template, a user selects the images from the community visual dictionary, their own private dictionary, or another public source. Once the user inserts their template into the conversation, they press send and others in the conversation can see the addition. The template can be viewed in multiple conversations. Millions of users can interact real time together with this method.

One use of the system and method is for private individuals in a community to carry on many conversations about what events, issues, projects, activities, etc. are important now and in the future, so a conversations starts with a topic wall type to show all the conversations possible, followed by a circle peer style to focus on a specific area, and finalized with an editor style to reach a publicized consensus. Another use of the system and method is for a business to solve a critical problem, so a conversation starts with the editor style to select the most important problem, followed by a circle peer style to find potential solutions, followed by a work flow style to gain acceptance of certain solutions. Another use of the system is for a group (of friends, of zoologists, etc.) who want to track their day or produce books of common interest, so they start with a posting method to share thoughts, followed by an editor method to finalize the output.

Example: Community Flow for Wide Variety of Subject Matter

Figure 22:
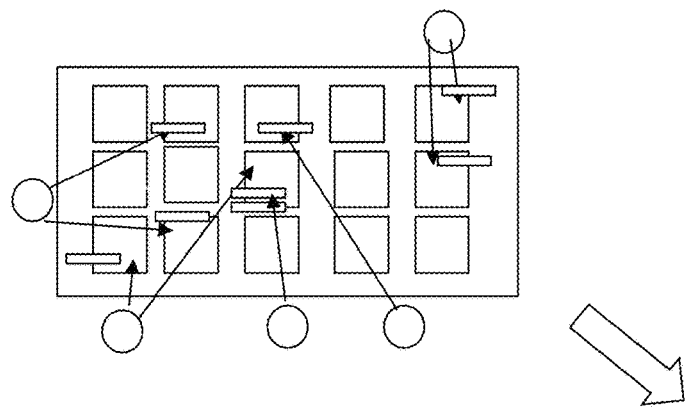
FIG. 22 illustrates an exemplary embodiment of selection of several forum styles ordered in a sequence to facilitate individual discussions on a wide range of topics.
Figure 22:
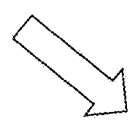
Figure 22:
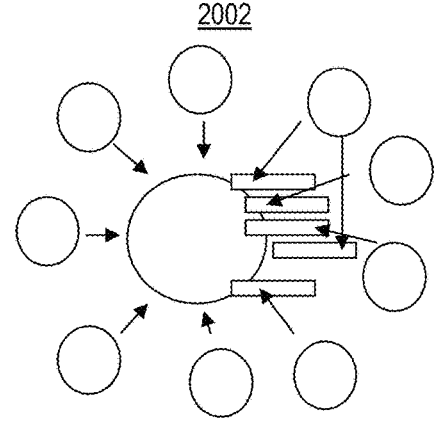
Figure 22:
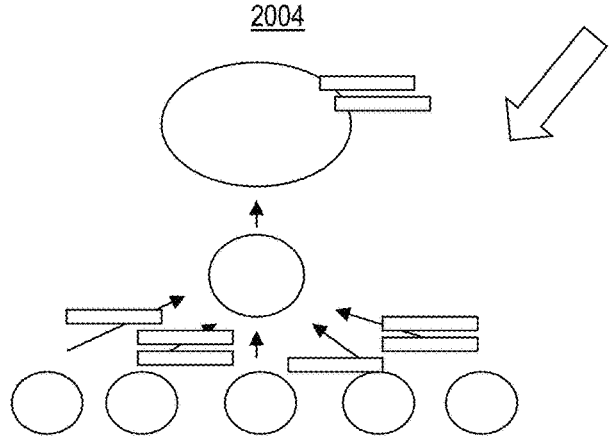
Figure 23:
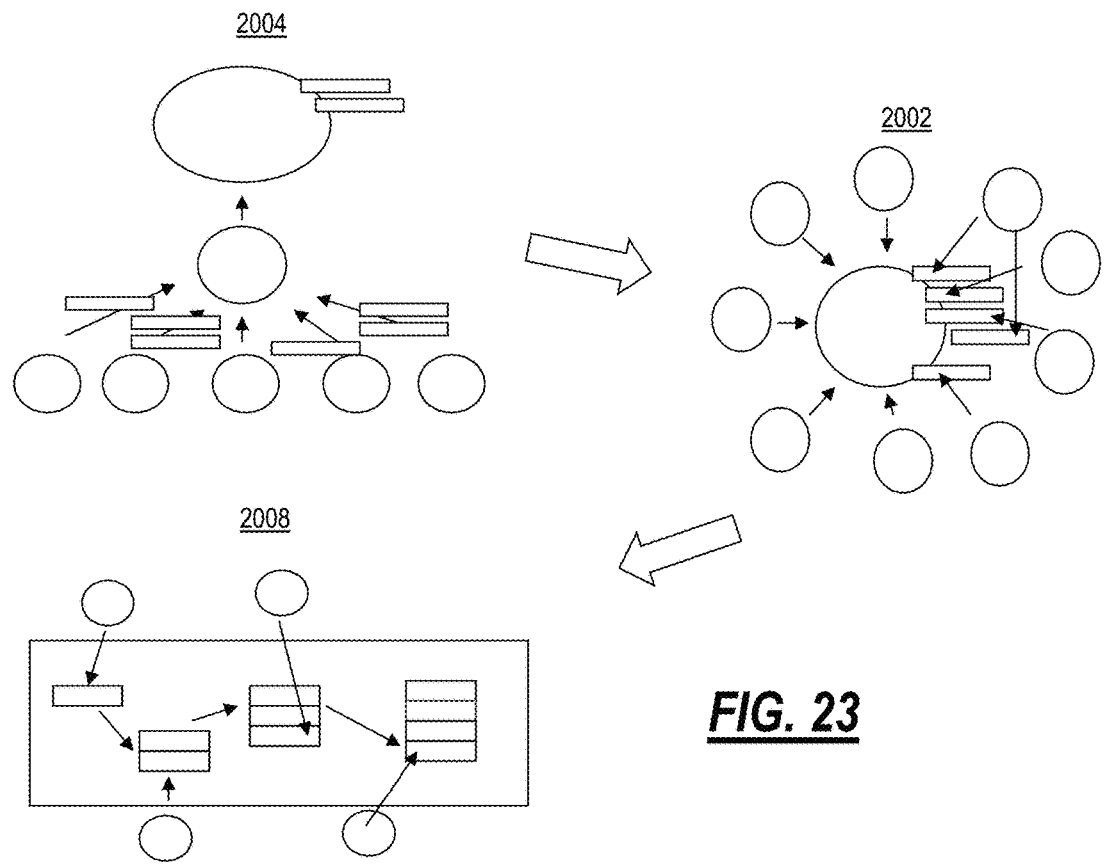
FIG. 23 illustrates an exemplary embodiment of selection of several forum styles ordered in a sequence to facilitate a business group to solve a specific complex problem.

FIG. 22 illustrates an exemplary embodiment of selection of several forum styles ordered in a sequence to facilitate individual discussions on a wide range of topics. To create a socially conscious community 1) exposed to certain major issues of the day and 2) capable of creating positive action steps for the community, the community leader may enter the portal and creates a community using the exemplary embodiment 2500. For example, to create the structure of the conversation flow, the leader selects the wall forum 2006 from the palette and uses this as the first conversation flow piece to create and select all issues. Future members can enter this wall forum 2006 in the community and add issues, topics, etc for discussion. Realizing that the community will want to do more than list and view all issues, the leader selects the circle peer style 2002 from the palette and inserts this forum in the community, allowing users to take an issue from the wall forum 2006 and make that issue the center of discussion for a circle peer style 2002, and user can all see the discussion about the issue and contribute as needed. In the circle peer style 2002, the issue is fully explored by interested members from all viewpoints and perspectives. Realizing that certain members may want to take a fully explored issue from the circle peer flow and publicize the 'correct" viewpoint, the leader takes the editor forum style 2004 and makes this the last in the layered conversations. So a member selects an issue from the circle peer style 2002 and publishes their editor view in the editor forum style 2004, and the editor receives comments only the editor can see, and the editor publishes to the community only what the editor wants. Example: Community Flow for Solving Business Problems FIG. 23 illustrates an exemplary embodiment of selection of several forum styles ordered in a sequence to facilitate a business group to solve a specific complex problem. To create a business community designed to solve complex business problems, a company leader enters the portal and creates a community using the exemplary embodiment 2500. To create the structure of the conversation flow, the leader selects the editor forum 2004 from the palette and uses this to collect ideas from members on a published public problem the editor is addressing. The editor takes the solution idea and publishes only the ones the editor selects have merit, as judged by the editors' skills and experience. The leader anticipates that the layered conversation should next include a circle peer forum 2002, so the leader takes the forum from the palette and inserts it in the layered conversation. This allows a member to take a published editor visual template from the editor style and make it the central item of the circle peer forum 2002, thus allowing all member to add to and build the core solution. Next the leader anticipates reaching a final consensus on the right solution from each impacted company department perspective, the leader next adds the work flow forum 2008 into the layered conversation. The solution in visual template format enters the work flow forum 2008 and each department in the work flow adds there visual template messages. In this fashion, a company leader created the community using a specific layered conversation flow, and this community is good at solving complex business problems from all perspectives.

Example: Community Flow for Posting Thoughts and Publishing a Result

Figure 24:
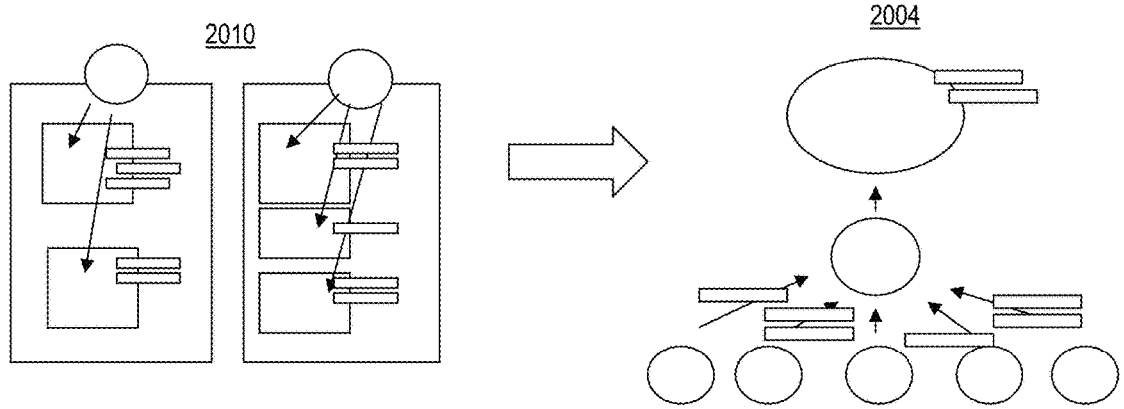
FIG. 24 illustrates an exemplary embodiment of selection of several forum styles ordered in a sequence to facilitate full understanding of a detailed subject.

FIG. 24 illustrates an exemplary embodiment of selection of a couple of forum styles ordered in a sequence to facilitate full understanding of a detailed subject. A leader believes the community members want to express their beliefs as they experience life, so members want to keep a public daily log (or any time increment) of visual templates. So the leader forms a community with the starting layered conversation as a posting style 2010 forum. As the wisdom in the community grows, special experts want to summarize the wisdom, so the leader next adds an editor forum 2004 to the layered conversation so members have the ability to become expert prognosticators.

Content Distribution Systems and Methods

Figure 25:
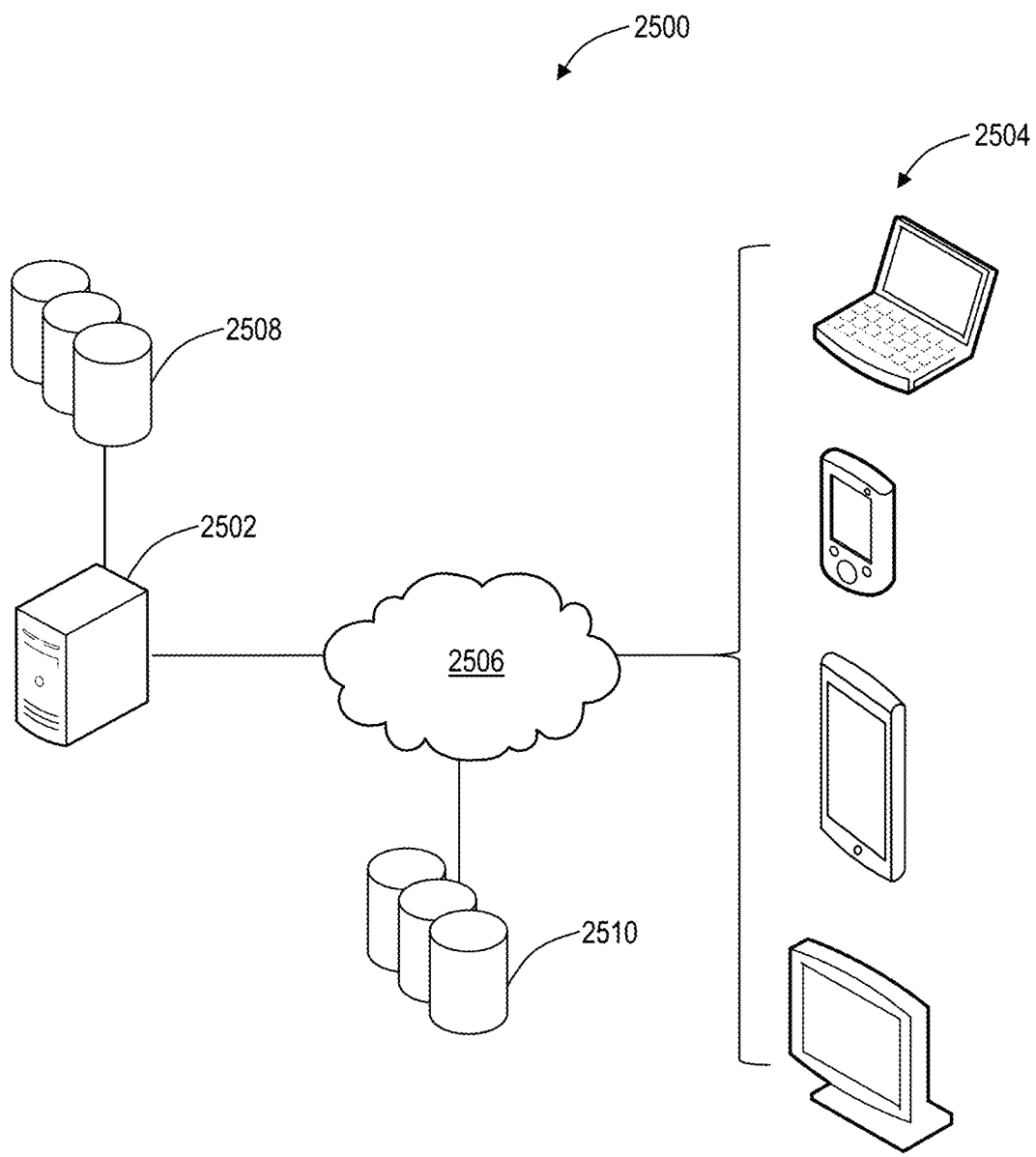
FIG. 25 illustrates a content distribution network for content distribution systems and methods between users via sequences of digital images.

Referring to FIG. 25, in an exemplary embodiment, a content distribution network 2500 is illustrated for content distribution systems and methods between users via sequences of digital images. Note, while described herein as content distribution systems and methods and the content distribution network 2500, these can also be referred to as content delivery. The content distribution network 2500 includes a host server 2502 communicatively coupled to a plurality of users 2504 through a network 2506. The host server 2502 provides a mechanism for the plurality of users 2504 to access content store via data stores 2508, 2510. The host server 2502 can be similar to the server 1200 or variations thereof. The users 2504 can be similar to the mobile device 1300 or variations thereof. Also, the users 2504 can include other types of devices, such as, but not limited to televisions, computers, Internet appliances, content servers, or any type of device configured to interact with content. The data store 2508 can be local with respect to the host server 2502, and the data store 2510 can be remote from the host server 2502 connected via the network 2506. The content distribution systems and methods contemplate either or both implementations. The network 2506 can be the Internet or generally any data communication network for content distribution thereon.

The term content used herein can refer to any type of data received over the content distribution network 2500. Exemplary content can include video, music, text, graphics, web sites, web objects, documents, live streaming media, database results, software, and the like. In exemplary embodiments, the content distribution network 2500 can be a cable television network (CATV), a multiple service offering (MSO) network, a wireless provider network, and the like. The host server 2502 is configured to provide interaction between the users 2504 and the content stored in the data stores 2508, 2510. In an exemplary embodiment, the host server 2502 enables interaction between the users 2504 and the content stored in the data stores 2508, 2510 using the sequences of digital images described herein. The content distribution systems and methods can be viewed as using the aforementioned systems and methods in FIGS. 1-24 for content distribution, selection, viewing, editing, redirecting/repurposing, and the like. That is, the aforementioned images, dictionaries, palette of forms, etc. can be used in conjunction with the host server 2502 and the users 2504 for interaction with the content stored in the data stores 2508, 2510.

Figure 26:
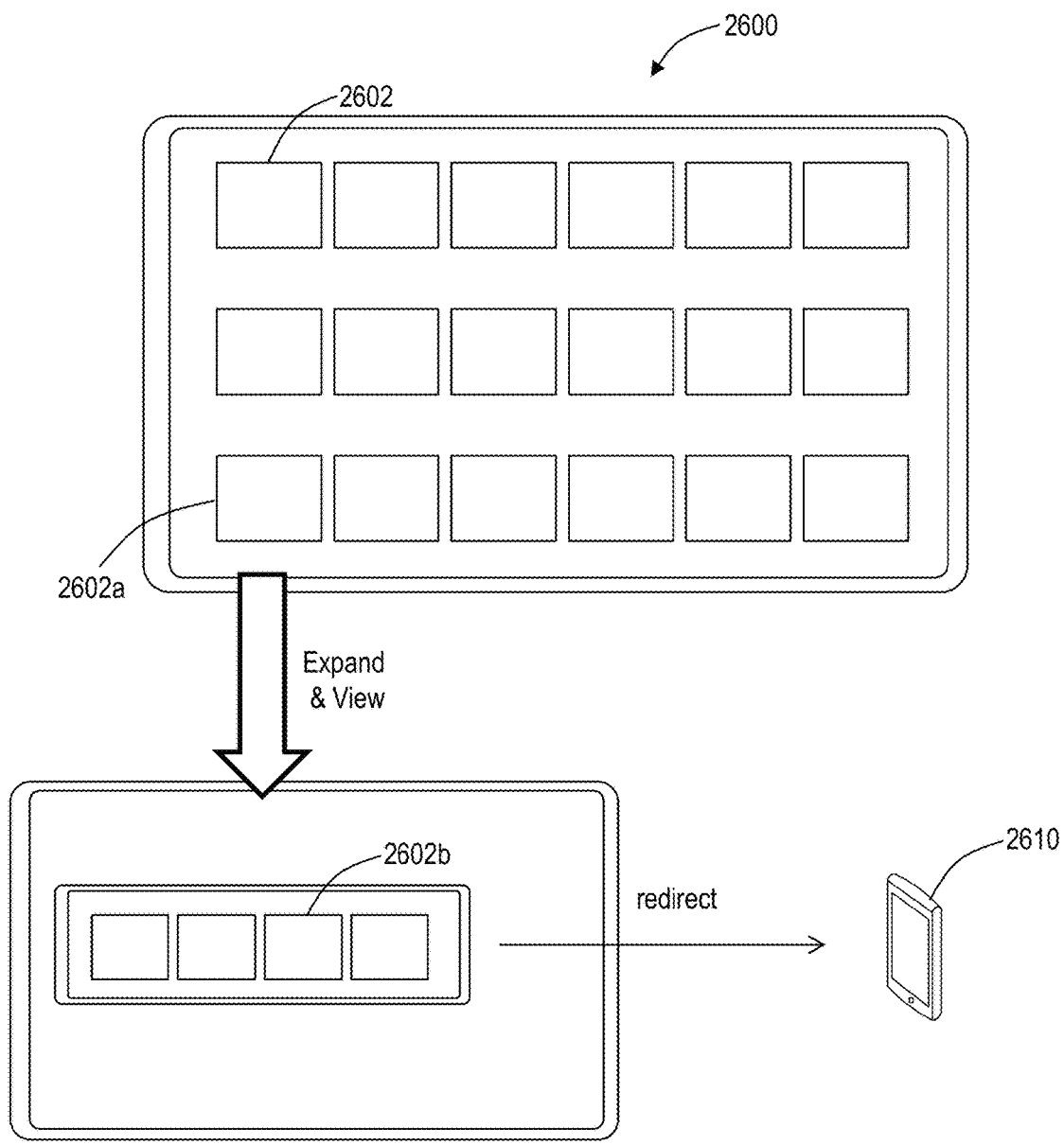
FIG. 26 illustrates a user interface for content distribution systems and methods via sequences of digital images.

Referring to FIG. 26, in an exemplary embodiment, a user interface 2600 is illustrated for content distribution systems and methods via sequences of digital images. With respect to the content distribution network 2500, the user interface 2600 can be associated with one of the users 2504 and their associated device with the user interface 2600. The user interface 2600 is configured to enable user interaction with the content stored in the data stores 2508, 2510 using a plurality of images 2602 displayed thereon. The user interface 2600 can receive the images 2602 from the host server 2502 and interact with the content stored in the data stores 2508, 2510 through the host server 2502. That is, the content distribution systems and methods provide a dialogue between the users 2504 and the content stored in the data stores 2508, 2510 through the host server 2502. This dialogue between the users 2504 and the content uses pictures as the primary mode of dialogue.

As described herein, the images 2602 include one of a plurality of images from a visual dictionary associated with the user 2504 or a general visual dictionary. Each image 2602 can have a direct correspondence with a plurality of words previously associated with the image 2602 such that the image 2602 is configured to convey a message represented by the plurality of words to the user 2504. Each of the images 2602 can include a definition provided by the user such that each of the plurality of images conveys one or more words based on the definition or a general definition.

In an exemplary embodiment, each of the images 2602 is a link or pointer to underlying content, such as content stored in the data stores 2508, 2510. The user interface 2600 is configured to enable an end user to select one of the images 2602 (or multiple images 2602, etc.). This selection can be through a touch screen, a stylus pen, a mouse, a keyboard, a keypad, a pointer, a remote control, and the like. For interaction, the images 2602 allow the end user to select, expand, and view. For example, the user can select a particular image 2602a with the user interface 2600 expanding to show additional images 2602b. The user can select one of the additional images 2602b to be redirected to content 2610. In an exemplary embodiment, each of the images 2602 is a stand-alone image with no corresponding text associated therewith (of course text can be part of the image). Here, the image 2602 alone is used to visually convey a message to the user 2504 of the underlying content. In another exemplary embodiment, each of the images 2602 can include corresponding text for a short description thereof.

Figure 27:
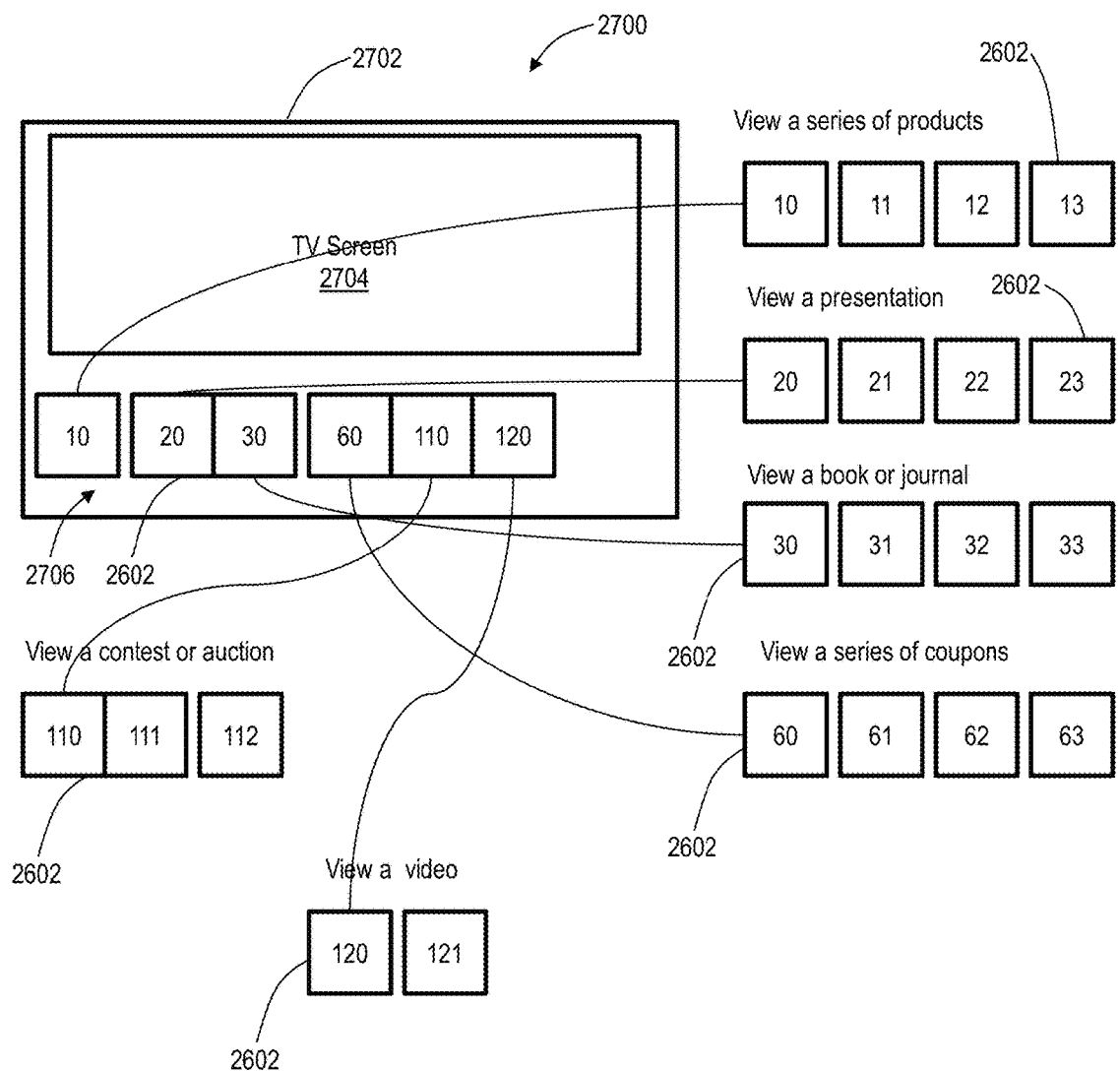
FIG. 27 illustrates a television for utilizing content distribution systems and methods via sequences of digital images in television applications

Referring to FIG. 27, in an exemplary embodiment, a television 2700 is illustrated for utilizing content distribution systems and methods via sequences of digital images in television applications. The television 2700 can be part of the content distribution network 2500 belonging to one of the users 2504 and being connected to the host server 2502 over the network 2506. In this example, the network 2506 can include the CATV/MSO network, e.g. coax, fiber-to-the-home, etc., a satellite provider, an Internet television provider, etc. Note, while not shown, those of ordinary skill in the art will recognize the television 2700 can be connected to a set top box or equivalent (i.e., a network interface device) for data communications with the host server 2502. The television 2700 includes a display 2702 for displaying content and images 2602 thereon. In an exemplary embodiment, the display 2702 is segmented into two sections—a display screen section 2704 and an image bar 2706 with a plurality of images 2602.

In essence, the television 2700 in the content distribution network 2500 replaces a conventional display with a visual talking system that allows the host server 2502 to send a guide like system to any user 2504 with all the content embedded in the message via links using the images 2602. The television 2700 can show a visual list of all content simultaneously through the images 2602 to view, select, etc. across all digital platforms. A user selects content to explore more, i.e. through clicking, selecting, touching, a remote control, etc. Subsequent to selection, the television 2700 can display all the options to expand, view, watch (like a video), and/or to redirect to a friend or add to your own content and redirect (this could also include a built in licensing system for copyrights assignment, etc).

The images 2602 on the display screen 2702 can enable a user to pull in content from the content distribution network 2500. In the example of FIG. 27, the display screen 2702 includes images 2602-10, 2602-20, 2602-30, 2602-60, 2602-110, 2602-120. Selection of the image 2602-10 can be for the user to view a series of products, for example, denoted by images 2602-10, 2602-11, 2602-12, 2602-13. Selection of the image 2602-20 can be for the user to view a presentation, for example, denoted by images 2602-20, 2602-21, 2602-22, 2602-23. Selection of the image 2602-30 can be for the user to view a book or journal, for example, denoted by images 2602-30, 2602-31, 2602-32, 2602-33. Selection of the image 2602-60 can be for the user to view a series of coupons, for example, denoted by images 2602-60, 2602-61, 2602-62, 2602-63. Selection of the image 2602-110 can be for the user to view a contest or auction, for example, denoted by images 2602-110, 2602-111, 2602-112, 2602-113. Finally, selection of the image 2602-120 can be for the user to watch a video, for example, denoted by images 2602-120, 2602-121. Of course, the foregoing are presented as exemplary embodiments for illustration purposes.

In another exemplary embodiment, the display screen 2702 can be solely filled with the images 2602, similar to the user interface 2600. A plurality of images 2602 can be simultaneously displayed on the display screen 2702, such as for example, fifty images 2702 with each of the images 2602 indicative of a video or channel. The user can, for example, select one of the images 2602 to see a sample of that video or channel, and then, optionally, select the image 2602 again to pay for or watch the video or channel. The user can also freely manipulate the placement, order, etc. of the images 2602 bringing in favorite videos or channels. The user can vote and/or rank videos or channels, and the like.

It is expected that the content distribution systems and methods form a new paradigm for content delivery such as, for example, in cable television, satellite television, etc. The images 2602 can be pointers to the actual content, i.e. the content associated with each image 2602 is underneath the image, overturned upon selection. From the display screen 2702, it is expected the user can select television programs, web videos, magazines, news articles, movies, music, etc. In essence, the images 2602 are abstractions of the associated content in the content distribution network.

Figure 28:
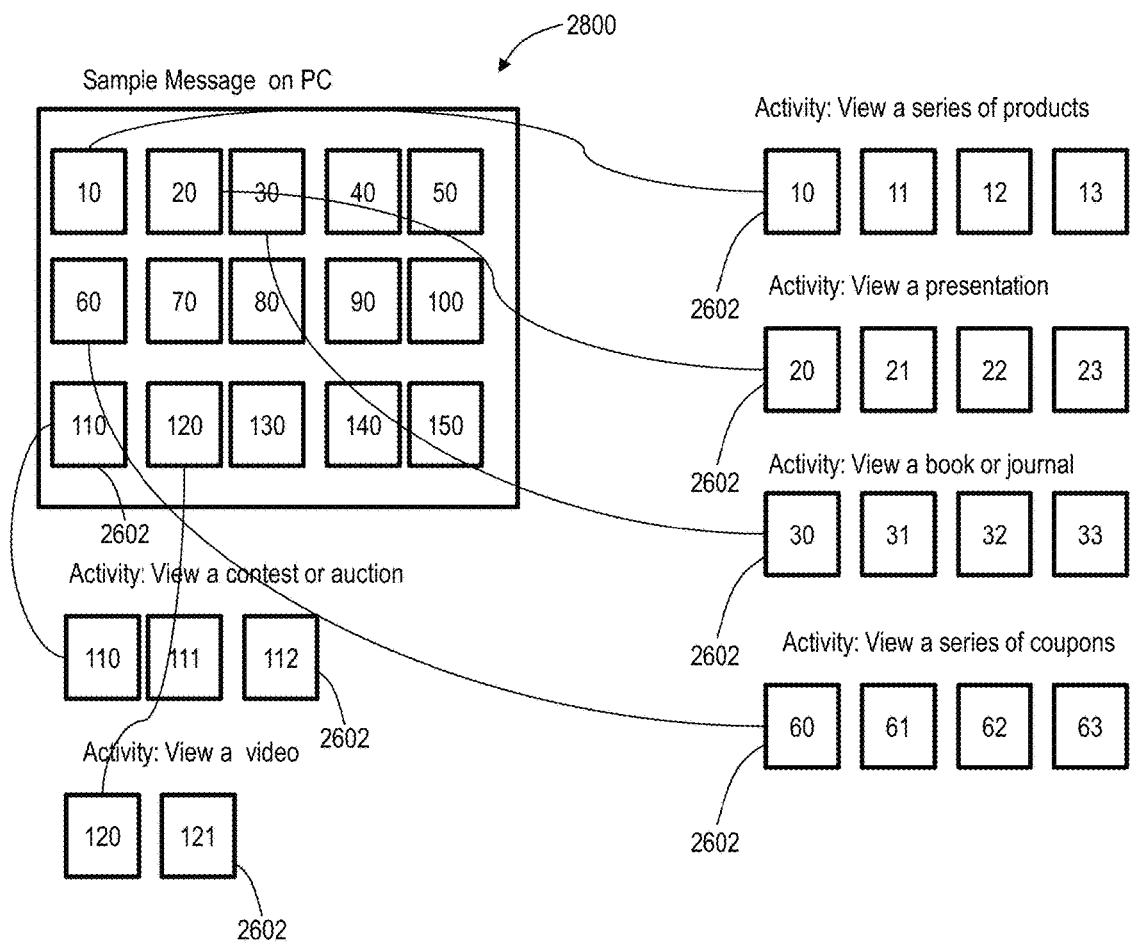
FIG. 28 illustrates a display screen on a computer for utilizing content distribution systems and methods via sequences of digital images.
Figure 29:
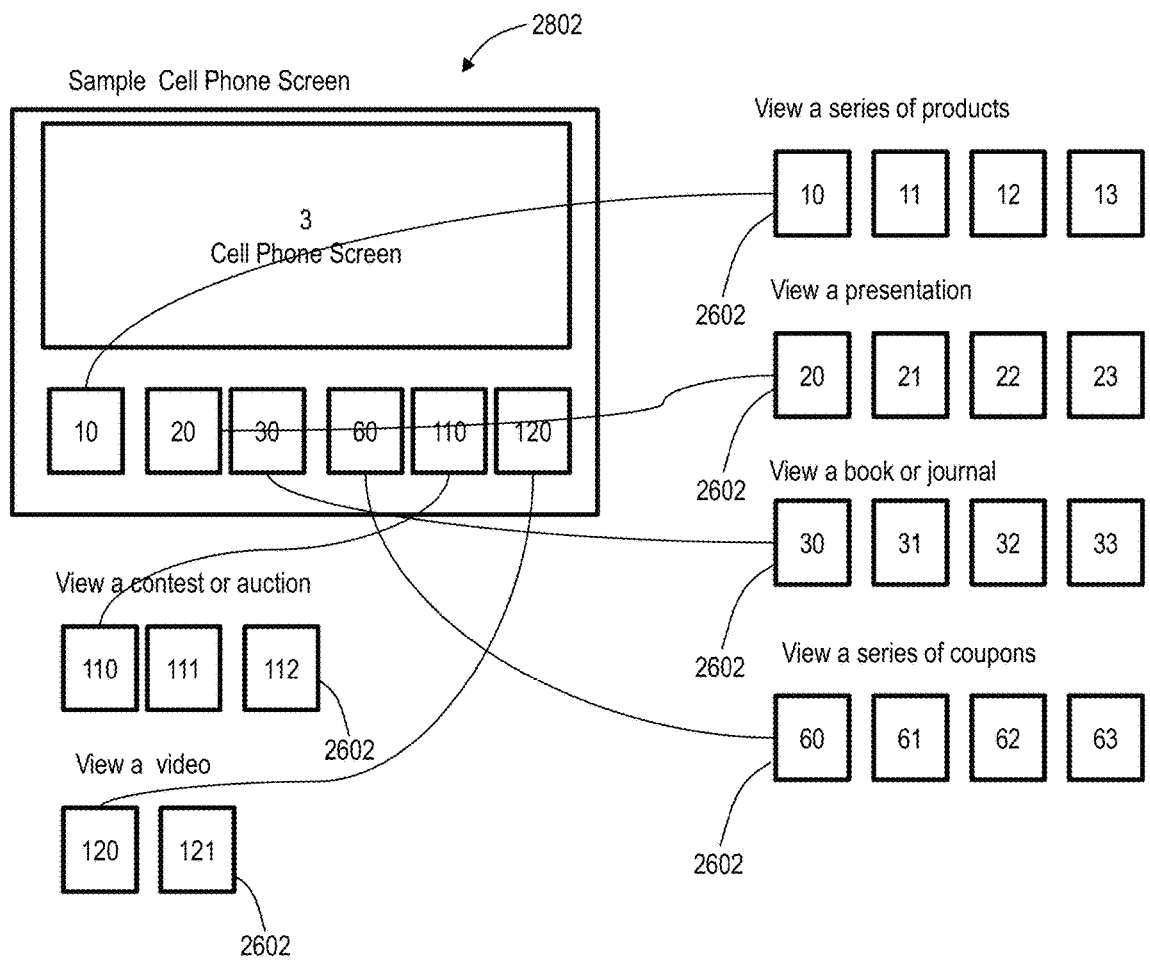
FIG. 29 illustrates a display screen on a mobile device for utilizing content distribution systems and methods via sequences of digital images.

Referring to FIGS. 28 and 29, in exemplary embodiments, display screens 2800, 2802 are illustrated for utilizing content distribution systems and methods via sequences of digital images on a computer and a mobile device. The display screen 2800 can be from a computer, and the display screen 2802 can be from a mobile device (e.g., cell phone) with the computer and the mobile device being associated with users 2504 in the content distribution network 2500. The display screens 2800, 2802 can operate similarly to the display screen 2702 described with respect to the television 2700.

Figure 30:
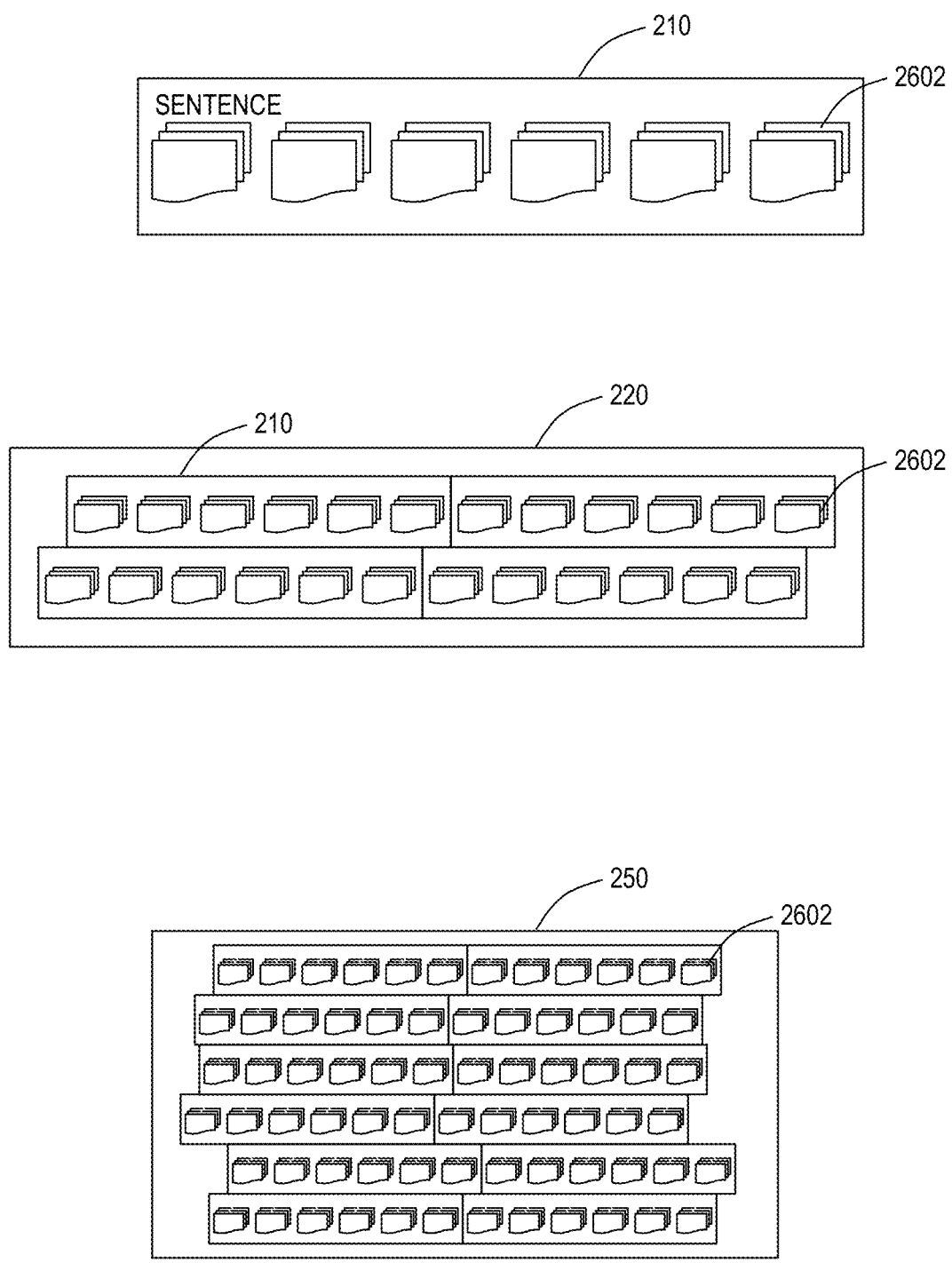
FIG. 30 illustrates exemplary message styles using the images in the content distribution network.

Referring to FIG. 30, in an exemplary embodiment, exemplary message styles 210, 220, 250 are illustrated using the images 2602 in the content distribution network 2500. In particular, FIG. 30 includes aspects described herein in FIG. 9 with a sentence 210 being a sequence of images 2602, a paragraph 220 being a sequence of sentences 210, and a story 250 (or book) being a sequence of paragraphs 220. The sentences 210, paragraphs 220, etc. can be displayed in the content distribution network 2500 such as on the user interface 2600 and the display screens 2700, 2800, 2802. The sentences 210, paragraphs 220, etc. can flow across the screen. Generally, the sentences 210, paragraphs 220, etc. are meant to provide arresting, Captivating, Elegantly Styled Messages (On TV, Smart Phone, PC, or Any Digital Device).

Figure 31:
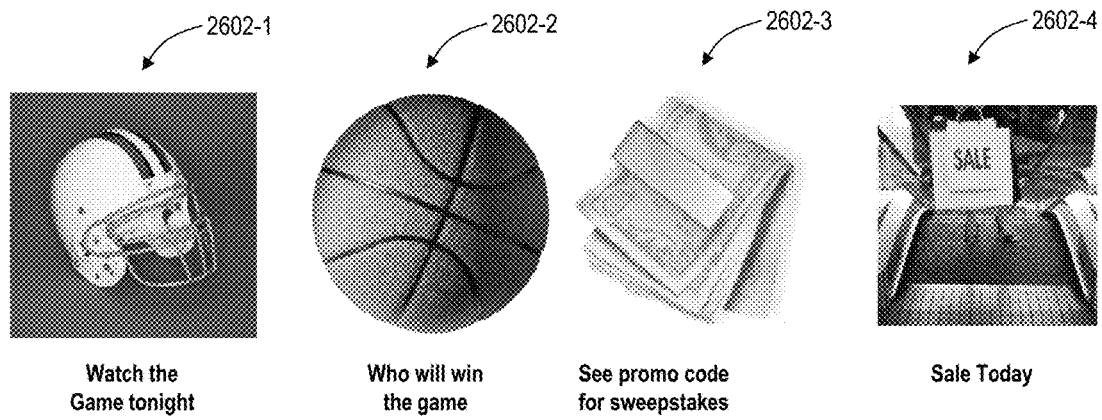
FIG. 31 illustrates exemplary images for display on the user interface and the display screens in the content distribution network.
Figure 31:
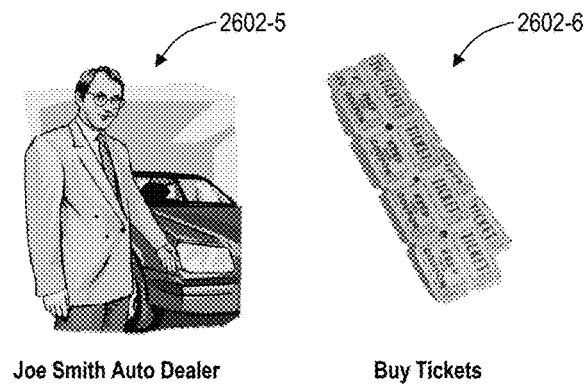

Referring to FIG. 31, in an exemplary embodiment, exemplary images 2602-1-2602-6 are illustrated for display on the user interface 2600 and the display screens 2700, 2800, 2802. For example, the image 2602-1 can be to watch the game tonight and selecting it could create a reminder and/or record the game, or if the game is in progress, bring the game on screen. The image 2602-2 can be to provide a user's opinion of who will win the game. The image 2602-3 can be for a promotion code associated with a sweepstakes. The image 2602-4 can be to provide details to the user for a sale. The image 2602-5 can be to provide details to the user for an auto dealership. Finally, the image 2602-6 can be for the user to buy tickets. Those of ordinary skill in the art will recognize the images 2602 can relate to practically anything. The images 2602 enable more efficient mechanisms to reach users such as relative to banner ads and analytics. The new analytics can include an ability to follow who uses specific images in what type of content along with tracking information (sent where, when, etc.). Current word communication systems do not have a same ability of tracking for analytics. This is an advantage of the systems and methods described herein using sequences of digital images.

Figure 32:
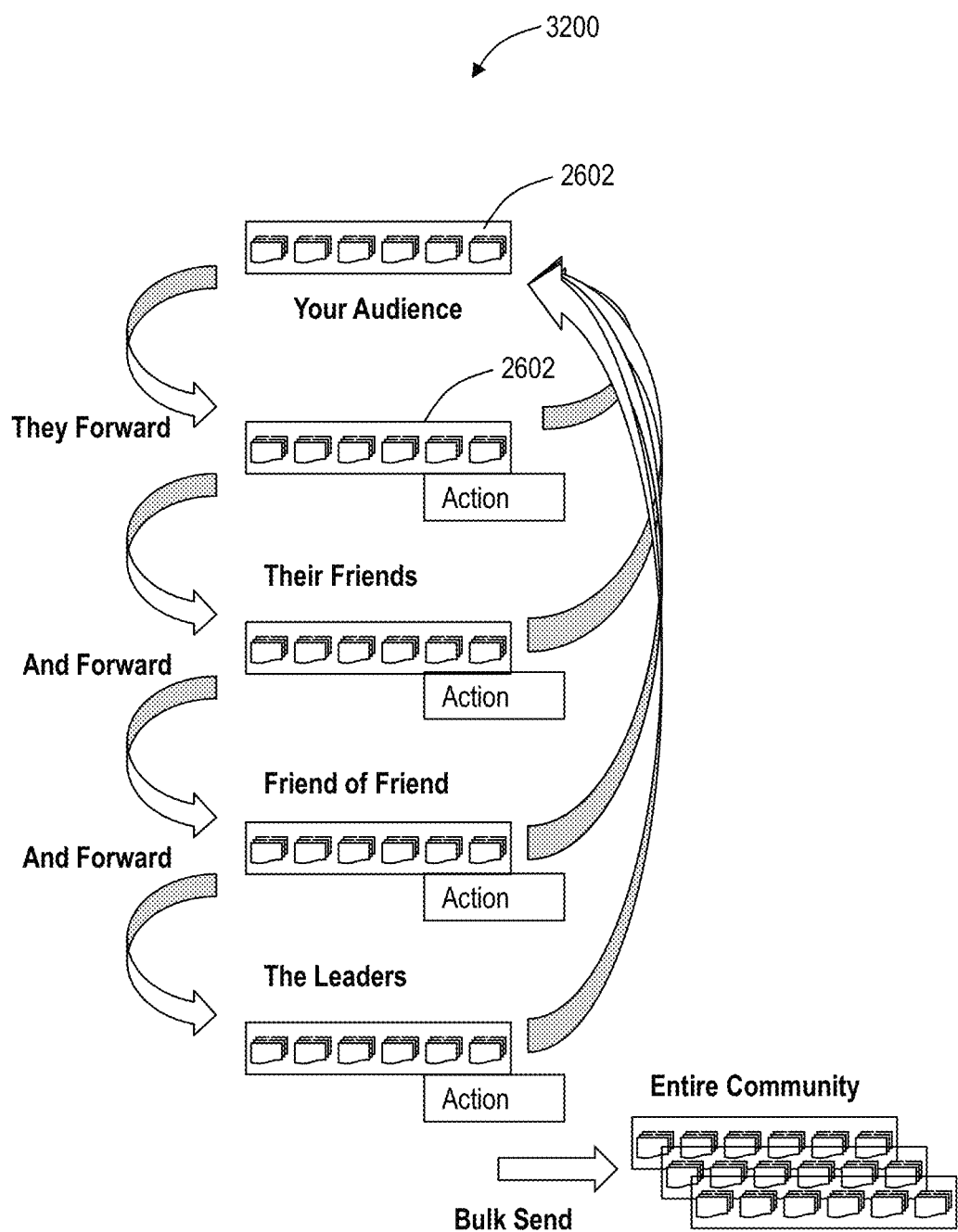
FIG. 32 illustrates a flow diagram of interactive visual messages over the content distribution network.

Referring to FIG. 32, in an exemplary embodiment, a flow diagram illustrates interactive visual messages 3200 over the content distribution network 2500. The visual messages 3200 provide interactive messages anywhere, everywhere at any time to any digital device. In this example, the visual messages 3200 are in a cascaded format, i.e. the messages cascade forming a cascading communication system. First, the messages 3200 are delivered to an intended audience. This can be from the host server 2502 to intended users 2504. It is expected that the receiving users 2504 will forward with appropriate actions, there forwarded users 2504 will forward with appropriate actions, etc. There can be bulk sending of the messages 3200 to an entire community, etc. Further, the host server 2502 can monitor the movement of the messages 3200 and the actions associated therewith. Also, each user 2504 can provide their own content, i.e. organize content and distribute it to other users 2504. Again, the content can include analytics as described herein.

Figure 33:
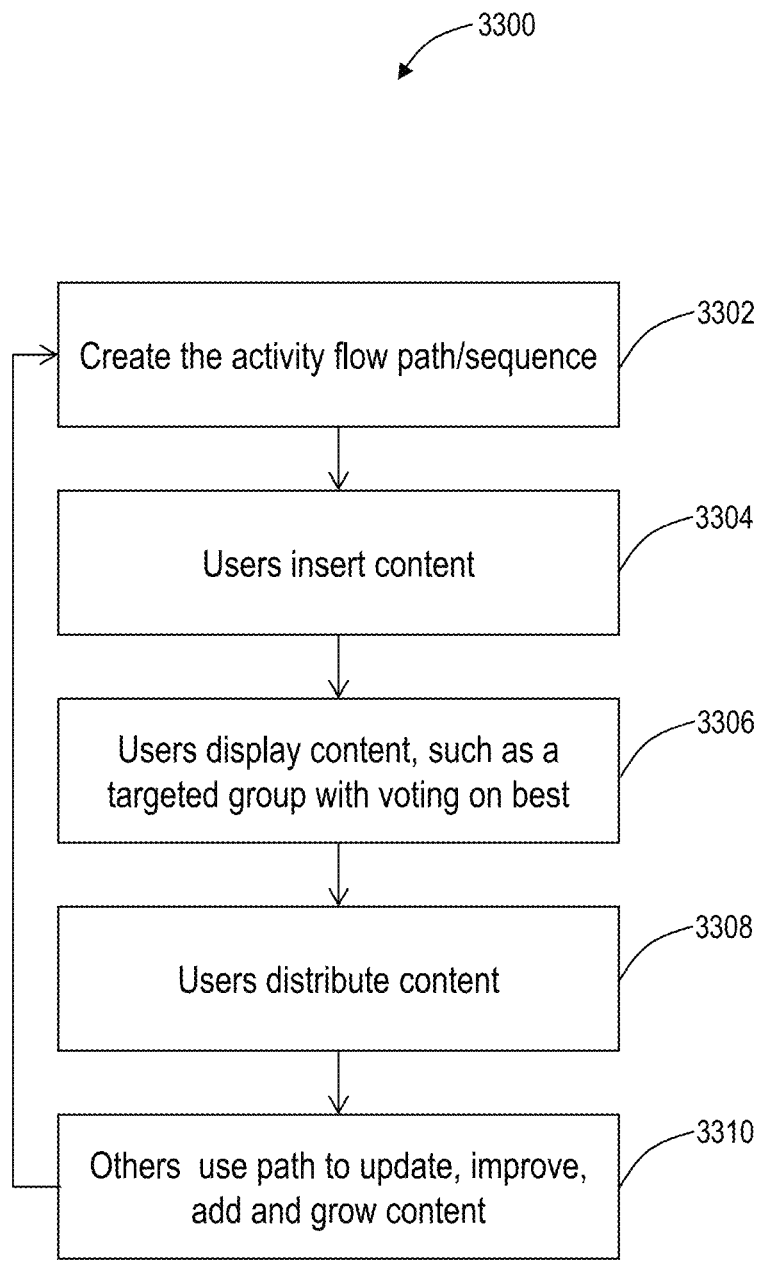
FIG. 33 illustrates a flowchart of a method for building an activity flow of content, distributing it, and adapting it.

Referring to FIG. 33, in an exemplary embodiment, a flowchart illustrates a method 3300 for building an activity flow of content, distributing it, and adapting it. In an exemplary embodiment, the method 3300 can use the content distribution network 2500 being operated by the users 2504 and distributed therebetween. The activity flow of content can be the images 2602 and the underlying content associated therewith. In the following, the method 3300 is described with reference to examples related to a book (e.g., a bible story). First, an activity flow path/sequence is created (step 3302). This can include, for the book, selecting a bible verse and leaving blank spots for users to insert the images 2602 related thereto. Users then insert content (step 3304). Here, the users can insert pictures for the images 2602 to tell the story of the bible verse. Next, the users can display the selected content with certain users or a targeted group voting on the best content (step 3306). The elected content can be distributed (step 3308). For example, the content can be distributed to interested audiences, e.g. those who buy religious books. Finally, Others use the path to update, improve, add and grow content in a collaborative, recursive, and crowd sourced format (step 3310).

The method 3300 can be used for "Activity managed flow" using the sequential digital images. This can be done in a variety of applications with users crowd sourcing development of projects. For example, this can be done with respect to games, building a video or visual story, building a manual, etc. Generally, the sequential digital images described herein can be used for content distribution as well as for content creation, i.e. in building and managing activities such as described herein relative to the method 3300. Generally, the method 3300 and variants thereof can be viewed as crowd sourcing where plural users work together to provide content items. This can be seen as the opposite of Twitter, Facebook, etc. where individual users publish content for viewing by plural users. Here, the users work together to form the content akin to a swarm of bees coming in, putting their thoughts into content, and allowing the group of users to select the best.

Figure 34:
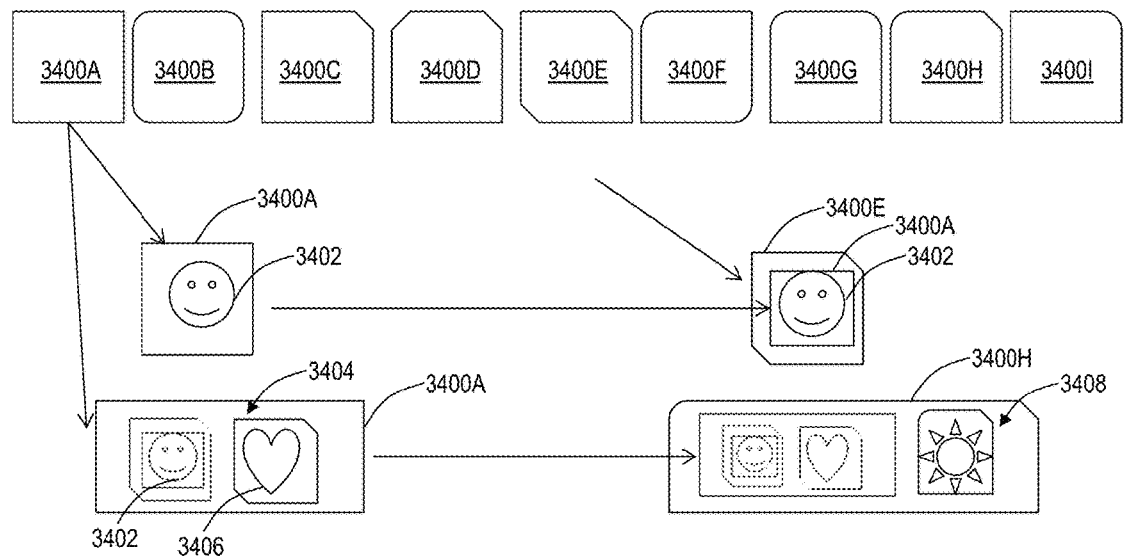
FIGS. 34-36 illustrate diagrams and a table of unique skin analytic systems and methods for managing a user's own visual content.
Figure 35:
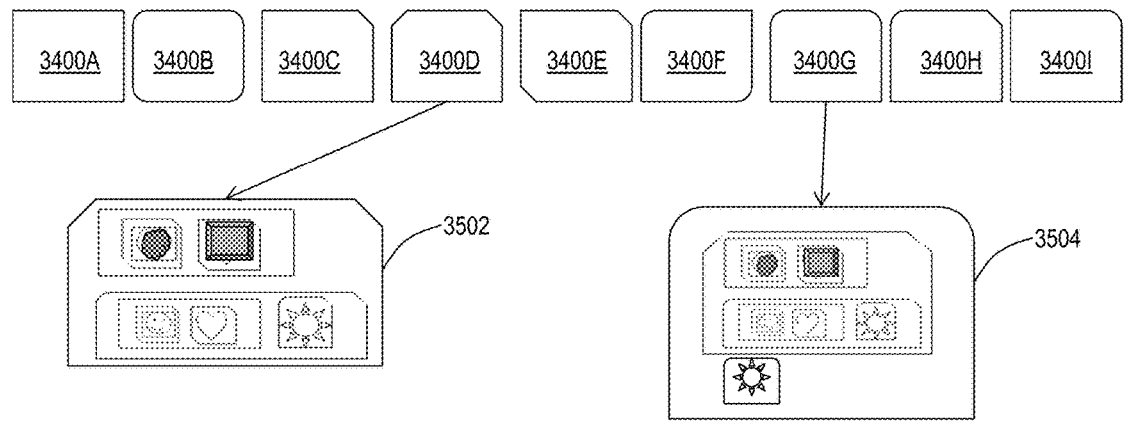
Figure 36:
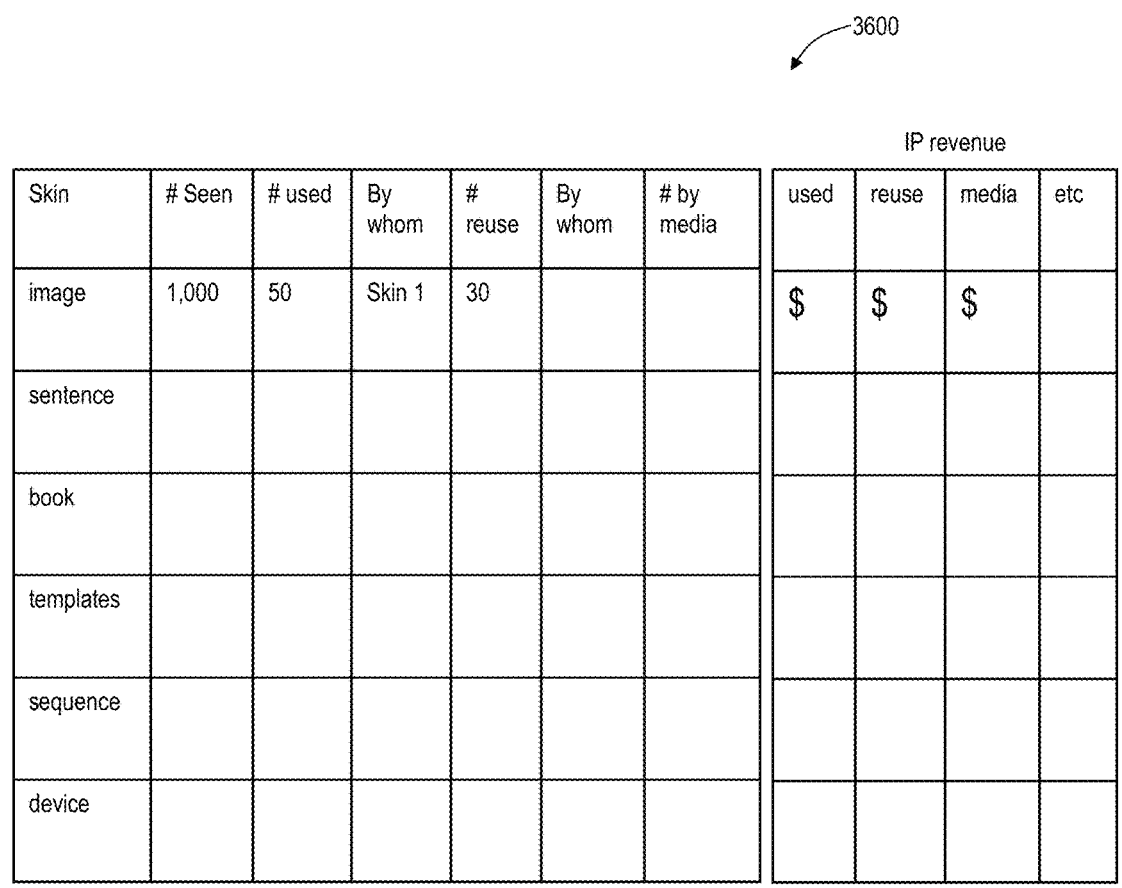

Referring to FIGS. 34-36, in exemplary embodiments, diagrams and a table illustrate unique skin analytic systems and methods for managing a user's own visual content. This management can be coupled with the sequential digital image systems and methods variously described herein or separately. Conventionally, with millions of "pictures" of the same thing, and millions more growing each day, using word/number tags to identify pictures and related content (e.g., videos, visual sentence & books, etc.) will not fully solve the identification problem, that is who owns what, how it was used, what sequence it went through (i.e., evolution derivations, etc.). Thus, unique skin analytic systems and methods can be used such that all visual content (or any other digital content) includes an added "skin" that envelopes all of the content, in either a visual or hidden manner. Importantly, the skin follows the flow of the content as it evolves, is derived, etc. The skins can be layered on top of each content such that as additions are made, by a new user, another skin is added in addition to the first skin (or any previous skins). Thus, skins can presumably be added until infinity. The skins can be followed by their user anywhere. Coupled with this marking of visual content with skins, skin analytics can show usage, timing, sequencing, and follow the flow of use in all forms of digital communication (PC, mobile devices, TV, tablet pads, etc.).

FIGS. 34-35 include multiple unique skins 3400A-3400I with a unique skin 3400 for each user. In these exemplary embodiments, the skins 3400 are depicted as different shapes, i.e. a different shape for each user. The image owner or originator places a corresponding skin 3400 on content. For example, the user associated with skin 3400A can own or create an image 3402 and embed the skin 3400A thereon or therein. In another example, the user associated with skin 3400E can take the image 3402 and embed their skin 3400E in addition to the skin 3400A on the image 3402 in a manner tracking the use, ownership, etc. of the image 3402. The user associated with skin 3400A can also own or create a sentence/template 3404 and embed the skin 3400A thereon or therein. The sentence/template 3404 can use the image 3402 with both the skins 3400A, 3400E and another image 3406 with a skin 3400E. Even further, the user associated with the skin 3400H can create another sentence/template 3408 made up of the images 3402, 3406 with their respective skins 3400 and other images. Note, while the skin 3400 is illustrated as a geometric shape, those of ordinary skill in the art will recognize it can be anything embedded in or on the image 3402 to uniquely identify the owner of the image 3402. This can include, but is not limited to, watermarking, steganography, distinguishing patterns added to the image 3402, labels or the like added to the image 3402, portrait frames on or around the image 3402, and the like. Further, as noted in the sentence/templates 3404, 3406, the skins 3400 can be embedded upon other skins 3400. Additionally, FIG. 35 illustrates the use of images with the skins 3400 in paragraphs 3502, 3504.

FIG. 36 illustrates a table 3600 that can be used to track the skins 3400 and their associated usage. The skins 3400 enable tracking of the images 3402, 3406 and their use in a visual talking context (or in any use). Advantageously, the skins 3400 are easier to use and less complex than a word-based metadata system. That is, the skins 3400 are embedded in, on, etc. the image, not extra metadata attached to the image file. Thus, when passed around, images do not need to take metadata with them, but rather the skins 3400 travel in or on the image. Metadata can still be maintained, but in the present invention, the metadata can remain with the owner of the image, and is not required to travel with the image. The skins 3400 are also better than other conventional tracking methods, such as cookies, in that they do not enable spying or tracking of users. Rather, the skins 3400 track the use of the images. The image owner can gets the analytics and it could be up to the skin owner as to whether to share this data. The table 3600 illustrates one exemplary analytics system/method using the skins 3400. For example, the table 3600 tracks items in the visual talking systems and methods described herein, i.e. images, sentences, books, templates, sequences, etc. Each of these items include sequenced digital images for conveying messages in lieu of words, i.e. "visual talking." Using the skins 3400, the user can track how many times an item is seen, used, by whom, etc. This also can be used to implement a copyright and/or royalty system for licensing, etc.

Cylindrical User Interface Systems and Methods

With the various exemplary embodiments described herein, images or sequenced images are presented to a plurality of users for conveying information thereto. As visual communicators grow both with the various exemplary embodiments described herein and the like, more efficient systems and methods are needed for viewing, selecting, adding, editing, and reading visual images. Conventional user interfaces include flat spaces in all directions that are too slow, cumbersome, difficult to manage, etc. Thus, systems and methods are described presenting digital images utilizing an infinite cylinder user interface. The infinite cylinder user interface contemplates use on a computer monitor, television, mobile device screen, projector, etc. as an efficient mechanism to present images to a user such as with image dictionaries, sentence libraries, image searches, saved images, etc.

Figure 37C:
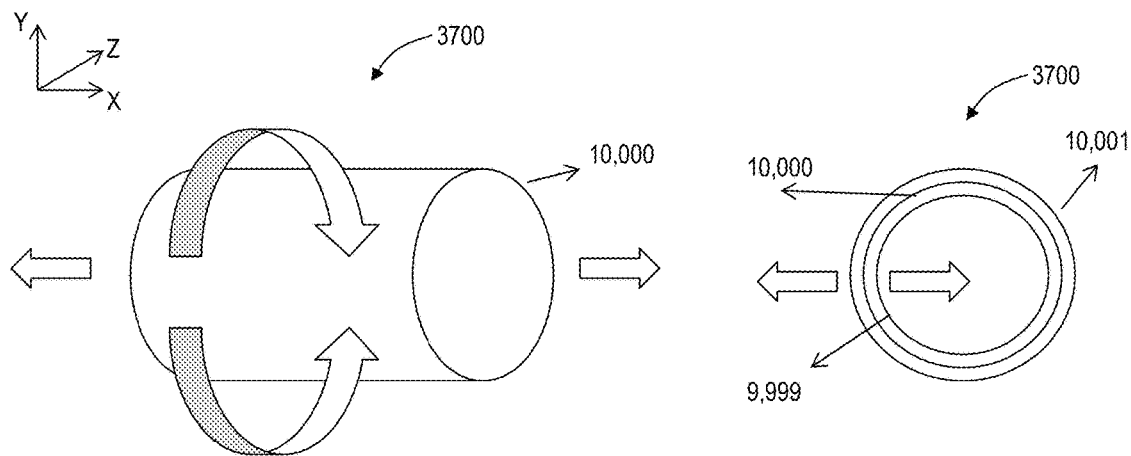
Figure 37C:
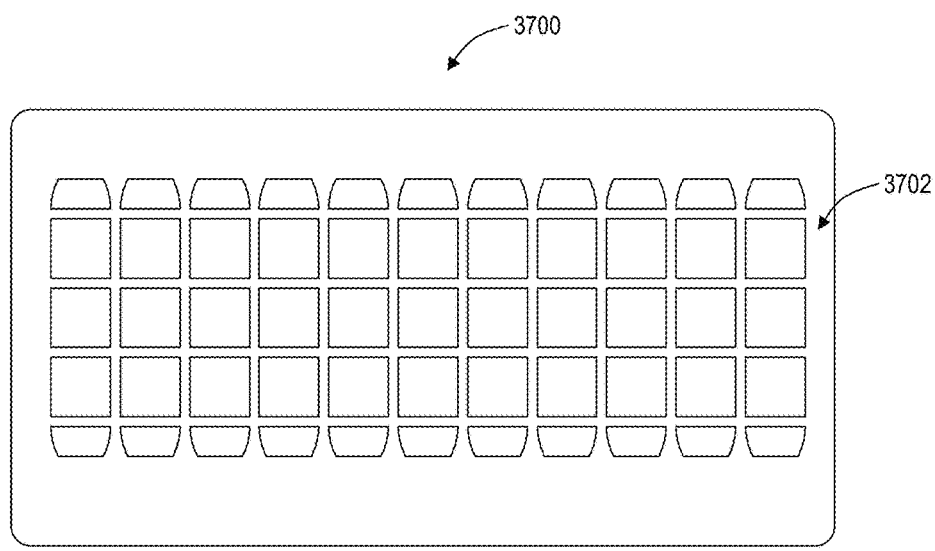

Referring to FIGS. 37A-37C, in an exemplary embodiment, schematic diagrams illustrate an infinite cylinder user interface 3700. The infinite cylinder user interface 3700 can be presented in any manipulateable visual format to efficiently present images to a user. The manipulateable visual formats include any formats where a user can move, select, scroll, drill-down, etc. such as computer screens with associated user inputs, touch screens, etc. FIG. 37A illustrates the infinite cylinder user interface 3700 in a perspective view. Note, in implementation, the infinite cylinder user interface 3700 is likely presented through a two-dimensional screen, but the perspective view is shown to show the various degrees of freedom in presenting images to a user through the infinite cylinder user interface 3700. FIG. 37B is a cross-sectional view of the perspective view of FIG. 37A. Finally, FIG. 37C is a screen shot view of the infinite cylinder user interface 3700.

The perspective view of FIG. 37A illustrates two modes of movement of the infinite cylinder user interface 3700. First, the infinite cylinder user interface 3700 can be moved along with associated images displayed thereon infinitely along an x-axis in either direction. Second, the infinite cylinder user interface 3700 can be spun along the x-axis to show different images thereon. Note, while FIGS. 37A-37B show the cylindrical surface as being finite, the spinning about the x-axis can be infinite or extremely large. The cross-sectional view of FIG. 37B illustrates another mode of movement, i.e. a third mode, where there can be infinite cylinders within cylinders, i.e. drill-down and/or drill-up. For example, assume the cylinder in FIG. 37A is cylinder 10,000, there can be a cylinder 10,001 in which cylinder 10,000 is contained and/or a cylinder 9,999 that is contained within cylinder 10,000. Here, the user can drill-down and/or up to move between cylinders. FIG. 37C illustrates the infinite cylinder user interface 3700 on a two-dimensional screen. Here, there are plural images 3702 that are presented in the infinite cylinder user interface 3700 and the user can perform any of the three modes of movement to display images on the screen, i.e. longitudinally along the x-axis, spinning about the x-axis, and drilling up and/or down from each cylinder.

Thus, with the infinite cylinder user interface 3700, cylinder surfaces can roll in either direction to infinity or stretch lengthwise in either direction to infinity. Cylinders can be inside one another until infinity, and the track from one cylinder to another to another and so on can be followed forward and backward. Cylinders can be related to each other in an infinite pattern to express 1) higher levels of related content building (i.e., image cylinder sends to sentence cylinder, to paragraph cylinder, to book, etc.) and 2) to track all levels of conversation flow. So, each person can have their own infinite cylinders that are their dictionaries, libraries, conversations, etc.

Figure 38:
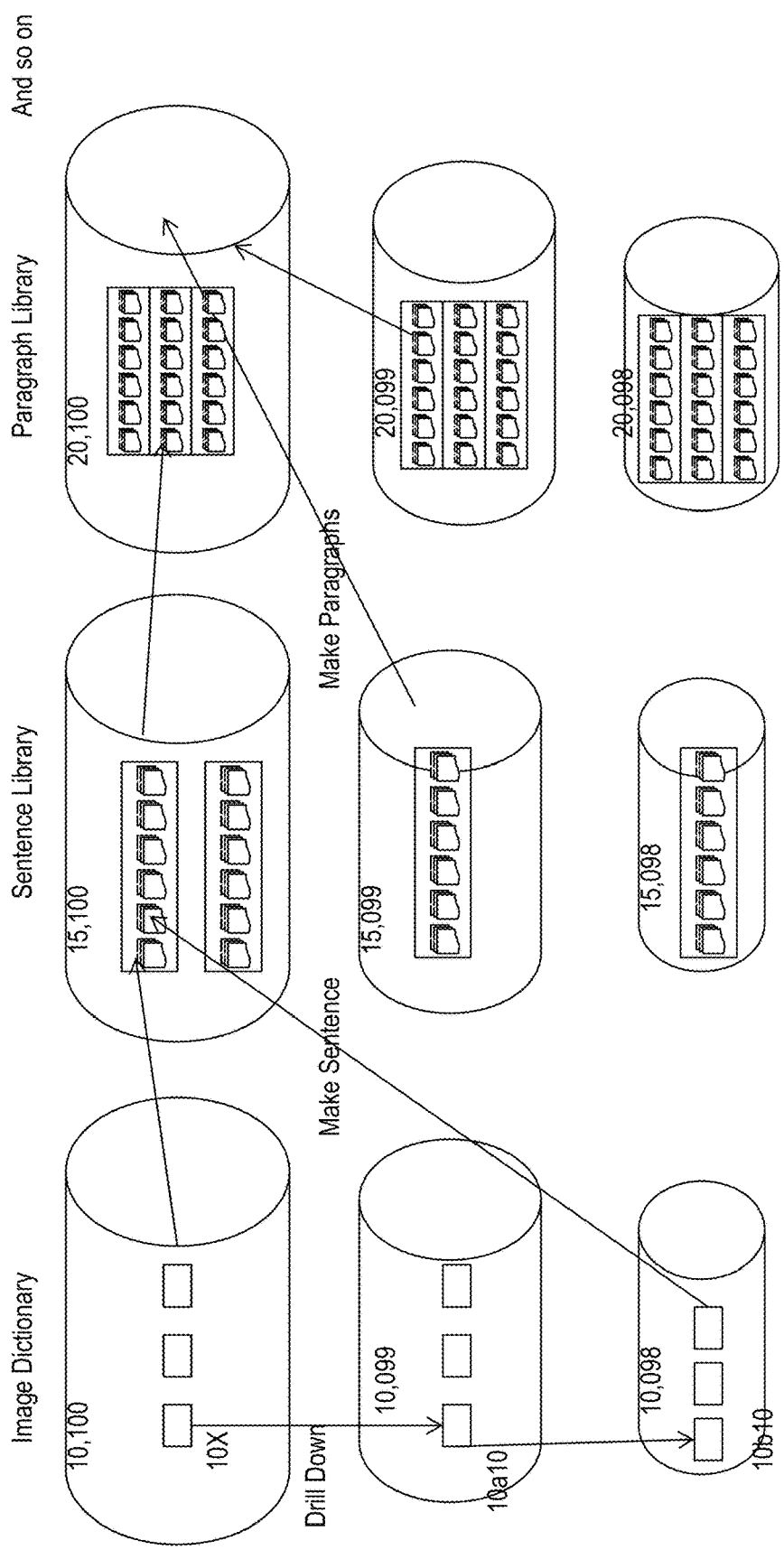
FIG. 38 is a schematic diagram of various cylinders in the infinite cylinder user interface showing exemplary relationships therebetween.

Referring to FIG. 38, in an exemplary embodiment, a schematic diagram illustrates various cylinders in the infinite cylinder user interface 3700 showing exemplary relationships therebetween. A first cylinder 10,100 is an image dictionary with a plurality of images associated therewith such as an image 10X. From the cylinder 10,100, a user can drill down to cylinders 10,099, 10,098, etc. where images 10a10, 10b10 are found. Note, there can be correlation or other relationships between the images 10X, 10a10, 10b10, etc. There can also be cylinders 15,100, 15,099, 15,098, 20,100, 20,099, 20,098, etc. Here the cylinders 15,100, 15,099, 15,098 can be sentence libraries of the images in the cylinders 10,100, 10,099, 10,098, and the cylinders 20,100, 20,099, 20,098 can be paragraph libraries of the sentence libraries, and so on.

Figure 39:
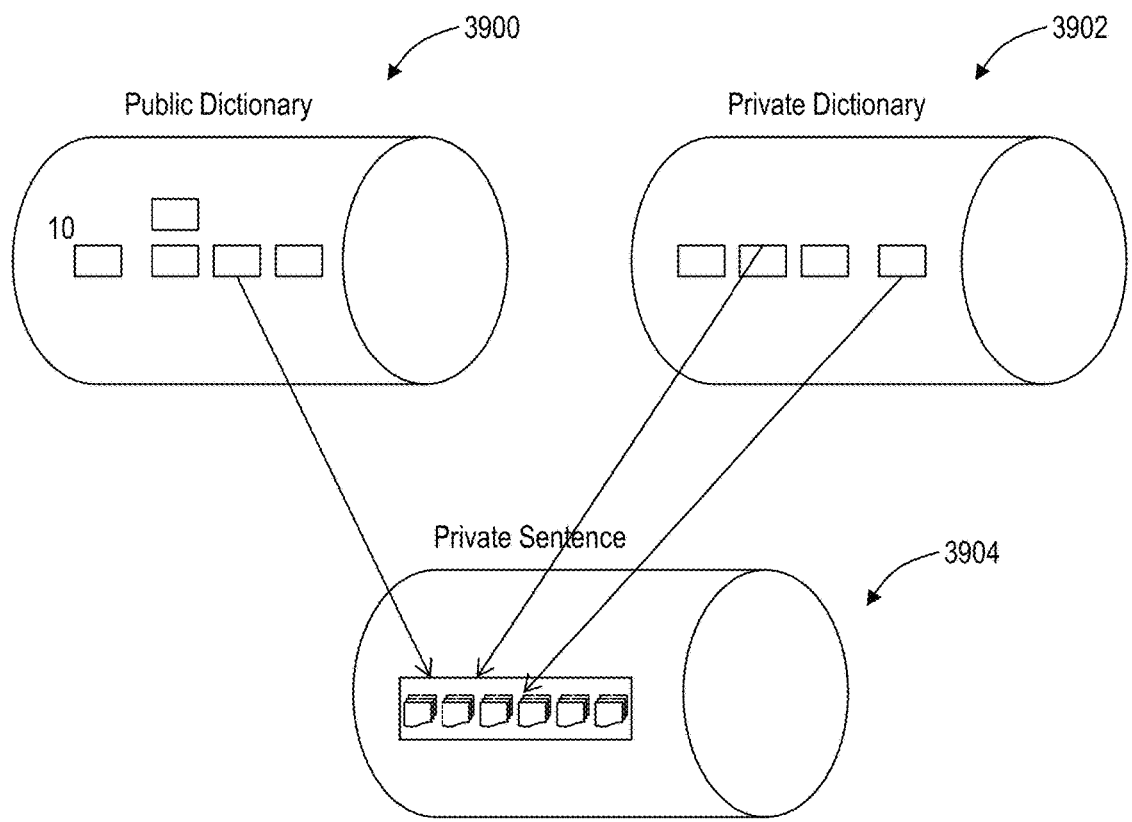
FIG. 39 is a schematic diagram of a public dictionary cylinder, a private dictionary cylinder, and a private sentence cylinder and relationships therebetween.

Referring to FIG. 39, in an exemplary embodiment, a schematic diagram illustrates a public dictionary cylinder 3900, a private dictionary cylinder 3902, and a private sentence cylinder 3904 and relationships therebetween. The public dictionary cylinder 3900 can be available for use by any of a plurality of users while the private dictionary cylinder 3902 can be associated with a specific user and thus only available to that specific user. The specific user can take images from the public dictionary cylinder 3900 and include them in the private dictionary cylinder 3902 and vice versa. Also, the specific user can have the private sentence cylinder 3904 in which the user includes images from both the cylinders 3900, 3902.

Figure 40:
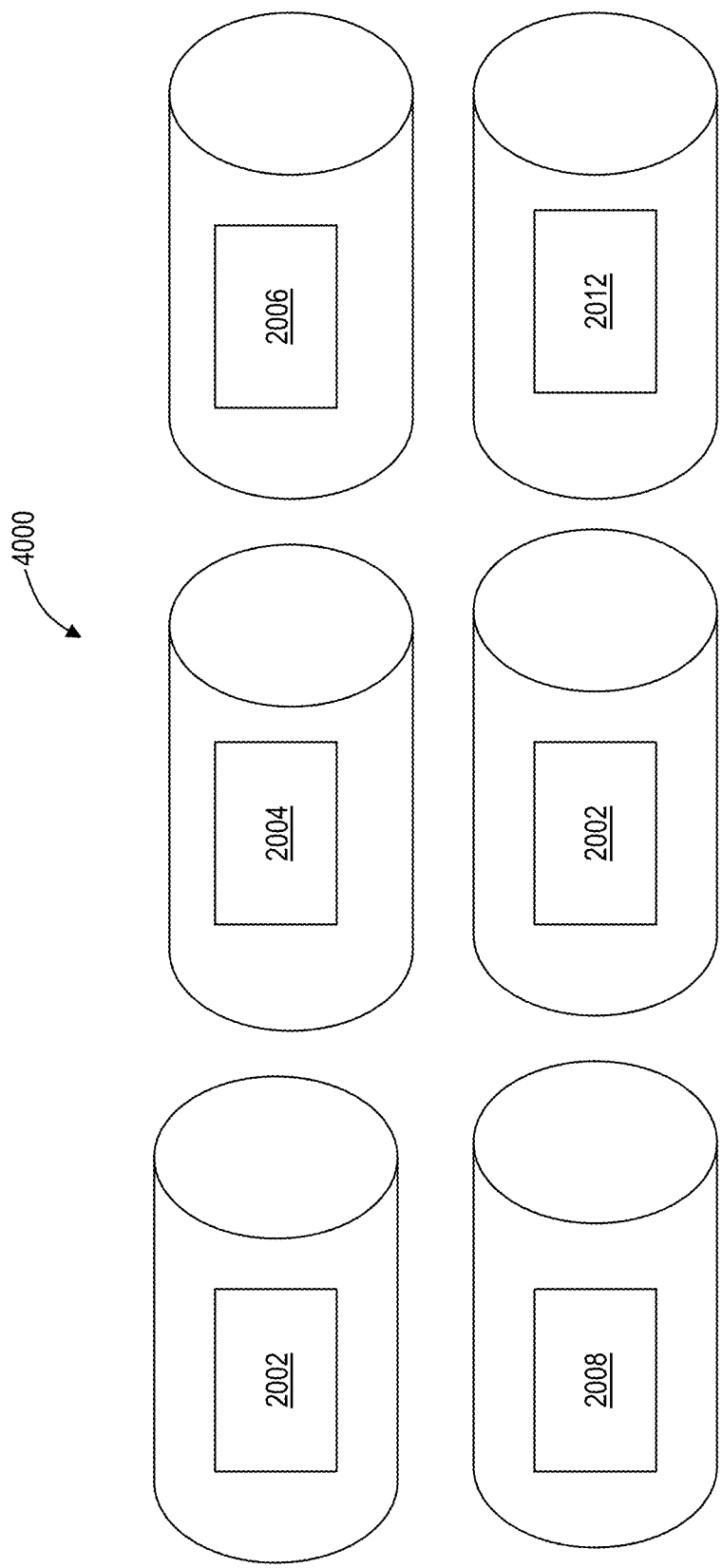
FIG. 40 is a schematic diagram of various cylinders including images from the exemplary conversation forum styles in FIGS. 15-20.

Referring to FIG. 40, in an exemplary embodiment, a schematic diagram illustrates various cylinders 4000 including images from the exemplary conversation forum styles in FIGS. 15-20. For example, one cylinder 4000 includes the circle peer forum 2002, another includes the editor forum 2004, another includes the topic wall 2006, another includes the workflow forum 2008, another includes the posting style 2010, another includes the linear style 2012, etc. That is, in an exemplary embodiment the infinite cylinder user interface 3700 can be used to complement the exemplary conversation forum styles for the electronic communications dialog systems and methods.

Figure 41:
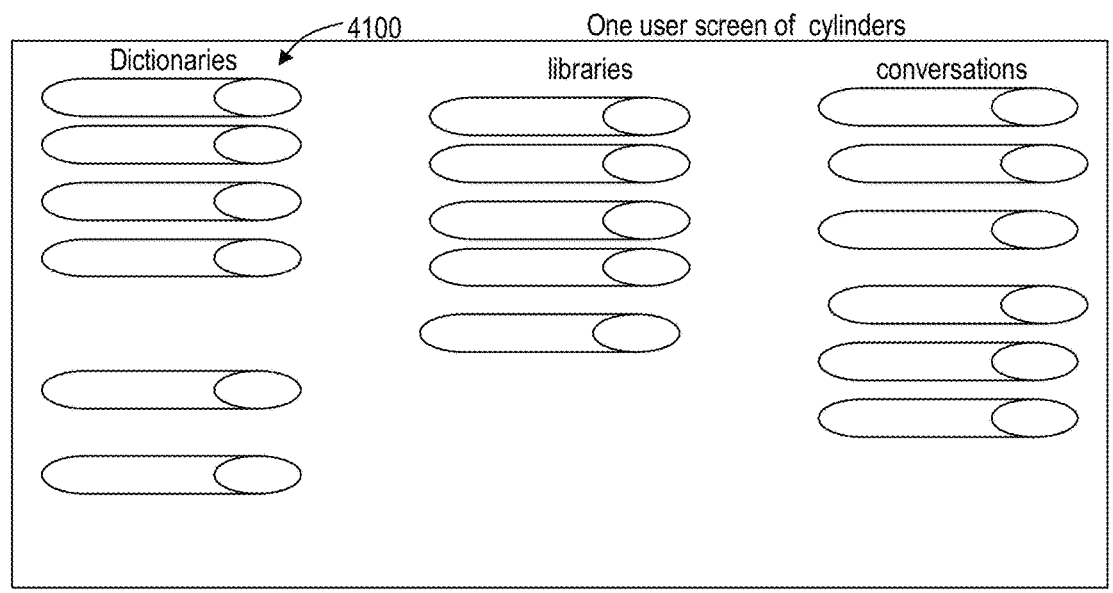
FIG. 41 is a screen shot of a plurality of cylinders on a user's screen.

Referring to FIG. 41, in an exemplary embodiment, a screen shot illustrates a plurality of cylinders 4100 on a user's screen. For example, the plurality of cylinders 4100 can be presented in a summary screen as shown in FIG. 41, and a user can select an individual cylinder 4100 for viewing particular images thereon. The user can come back to this summary screen of FIG. 41 or traverse the various different modes of movement as described herein.

In an exemplary embodiment, the infinite cylinder user interface 3700 can include a tracking mechanism for the plurality of cylinders 4100 that enable a user to easily maneuver around the system. That is, the tracking mechanism can keep track of the user's history or user flow. Users can track the where they started and where they are now, so they can always go back and follow their track all the way back to the beginning, even if they jumped from cylinder to cylinder.

Personalized Image Portal—Social Network

Figure 42:
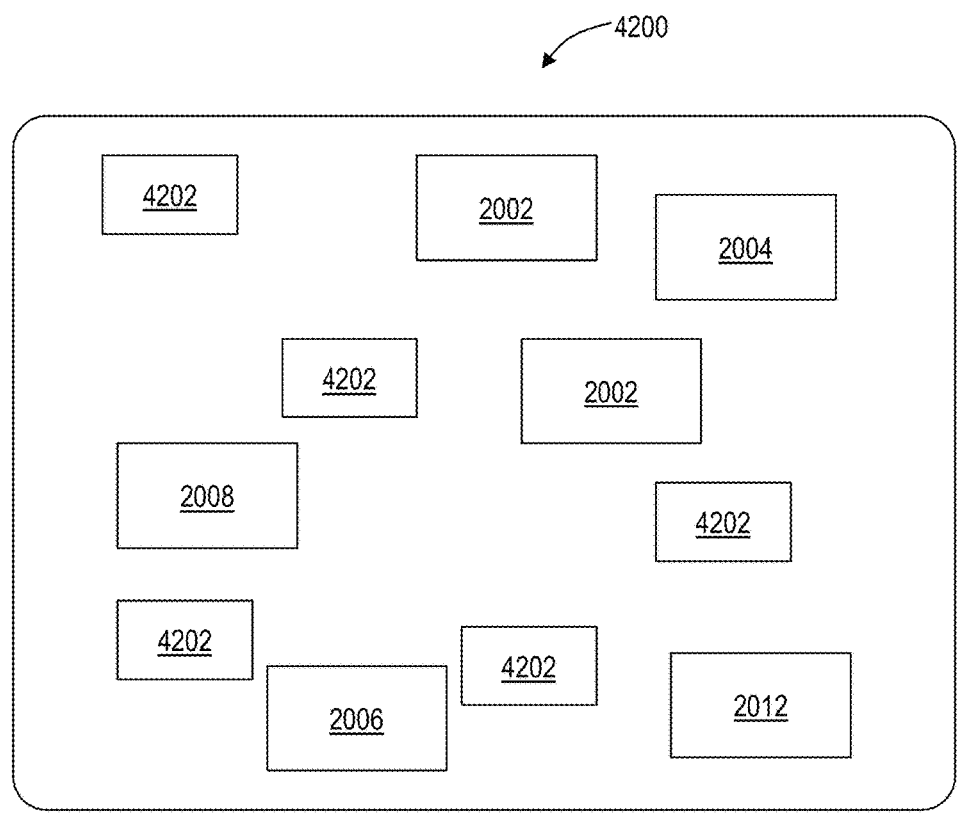
FIG. 42 is a screen shot of a user's personal image screen for the electronic communications dialog systems and methods.

Referring to FIG. 42, in an exemplary embodiment, a screen shot illustrates a user's personal image screen 4200 for the electronic communications dialog systems and methods. As described herein, various systems and methods are described relating fundamentally to the concept of using images as a basis for communication between users (e.g., in lieu of words). These electronic communications dialog systems and methods can be extended to social media and/or to an individual portal page for a user to express oneself via imagery as opposed to words. The user's personal image screen 4200 can be a web portal, home page, social media site, blog, etc. where a user stores, manipulates, and displays images 4202 and/or conversation forum styles 2002, 2004, 2006, 2008, 2010, 2012 for public and/or private viewing.

In an exemplary embodiment, the user's personal image screen 4200 is part of a social media platform where each user has their own screen 4200 (and optionally various infinite cylinder user interfaces 3700, dictionaries, etc.). The user can have friends, colleagues, acquaintances, etc. that are in their network and able to see the user's image screen 4200. Alternatively, the user can set the image screen 4200 to public such that anyone can view it. Of course, a subset of public/private can also be used depending on the content on the image screen 4200.

Content and Advertising Insertion Systems and Methods

Figure 43:
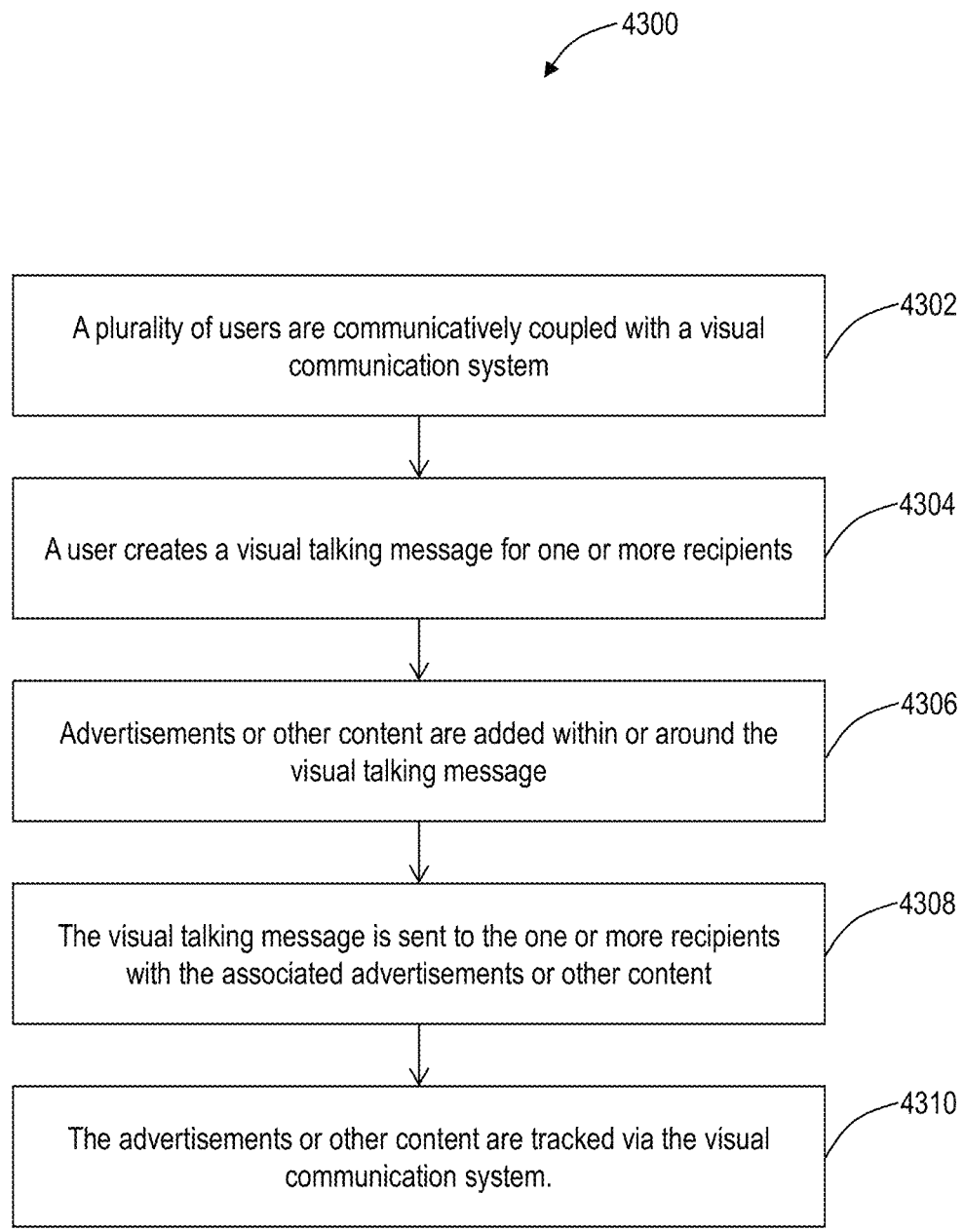
FIG. 43 is a flowchart of a content and advertising insertion method.

Referring to FIG. 43, in an exemplary embodiment, a flowchart illustrates a content and advertising insertion method 4300 which may be used with the various visual communication systems and methods described herein. The content and advertising insertion method 4300 contemplates use with the various exemplary embodiments described herein related to visual communications, i.e. "visual talking." That is, the content and advertising insertion method 4300 can operate through any of the web portal 10, the server 1200, the mobile device 1300, the web portal-based scenario 1400, the application-based scenario 1402, the templates 2500, the activity flows 3300, combinations thereof, and the like. The content and advertising insertion method 4300 and associated systems leverage the visual talking described herein. In particular, users can use the content and advertising insertion method 4300 for insertion of ads into their visual messages or select images with ads or content embedded therein. In doing so, the user can collect revenue or other credits (points, rewards, etc.) while using the visual talking system. As is described herein, the content and advertising insertion method 4300 allows the user to select images with advertising or other content, increases user control by not using cookies or other spyware techniques, increases efficiency by directly serving ads and other content to users who want it, and provides smarter targeting eliminating wasted impressions.

In fact, by coupling visual talking with the content and advertising insertion method 4300, ads and other content are part of the message much like how television advertising has moved towards so-called product placement. Visual talking has been described herein as a more efficient mechanism for communication instead of words with mobile devices and ubiquitous digital connectivity. The content and advertising insertion method 4300 provides a mechanism to couple revenue generation into visual talking in a user-controlled manner where ads and other content may be part of the message, i.e. a constituent image forming the message. In this manner, advertising is integrated such as product placement within the message as opposed to a banner ad that is typically ignored. As such, the novelty of the content and advertising insertion method 4300 is that 1) the ad or other content may be part of the message and 2) the ad or other content is controlled by the user generating the message including the user giving the control to an automatic algorithm or third party. Accordingly, the content and advertising insertion method 4300 provides greater user control and ensures "eyeballs" on the content versus conventional systems and methods.

In the content and advertising insertion method 4300, a plurality of users are communicatively coupled with a visual communication system (step 4302). As described above, the visual communication system can include any of the web portal 10, the server 1200, the mobile device 1300, the web portal-based scenario 1400, the application-based scenario 1402, the templates 2500, the activity flows 3300, combinations thereof, and the like. The users can by communicatively coupled via the Internet, wireless networks, local area networks, or a combination thereof. Further, the visual communication system can operate through an "app" on the mobile device 1300. Of note, the plurality of users are in communication in some manner with the visual communication system and able to send/receive visual talking messages therethrough. As described herein, a visual talking message is one using images in lieu or in addition to words to convey a message or any other type of information (i.e., sentence, paragraph, story, book, etc.). A user creates a visual talking message for one or more recipients (step 4304). Here, a particular user of the plurality of users can create and edit a visual talking message for delivery to the one or more recipients who can also be part of the plurality of users. The message creation can be through the visual communication system described herein.

Advertisements or other content are added within or around the visual talking message (step 4306). In particular, ads or other content can be added before, during, or after creation of the visual talking message as will be described. The ad or content insertion includes various exemplary scenarios. In a first exemplary scenario, the visual communication system is configured in a bid/auction mode whereby vendor images are selected in or around the visual talking message as the user is creating and/or editing the visual talking message. In this exemplary scenario, the visual talking system knows the profile of the sender as well as the various recipients and selects the vendor images appropriately. The ad or content insertion is performed concurrently or slightly after the visual talking message is created. Optionally, the sender is presented with the ad or other content beforehand thereby knowing the ad content ahead of time. In an exemplary embodiment, the sender could veto the ad content and/or request new ad content.

In a second exemplary scenario, the ad or other content can be a constituent part of the visual talking message, i.e. instead of being in or around the visual talking message as in the first exemplary scenario, the ad or other content can be one or more of the images forming the visual talking message. The second exemplary scenario operates as the message is being created, e.g. as the sender searches for images, sponsored images can be presented with ad content. The sponsored images can be presented based on an image search, e.g. a search for "sunshine" could display a weather related picture, based on the user searching specific vendor dictionaries, based on the user searching a so-called "shopping mall" or catalog of images, and the like. In this manner, the visual talking message includes the ads or other content as part of the actual message itself thereby ensuring "eyeballs" on the ads or other content, In a third exemplary scenario, vendors associated with ads or other content publish/sell this content to the users for inclusion in their image dictionaries for future inclusion in the visual talking message. Here, the vendors offer content in a creative manner to enable users to store this content for later use, i.e. sponsored images being previously presented to the sender and incorporated into the sender's image dictionary for selection therefrom. In this scenario, the user creates the visual talking message from their image dictionary which can include sponsored content that was previously incorporated there by the user. Again, for a message "you are the sunshine of my life," the sunshine can be a picture of the sun as part of an ad for a weather service. The user is the one who selects this ad from an associated image dictionary. Thus, in the second and third exemplary scenarios, the sender is explicitly selecting the ads or other content to be part of the visual talking message thereby providing sender control of ad content in the message.

Once the visual talking message is created and edited, the visual talking message is sent to the one or more recipients with the associated advertisements or other content (step 4308). As described above, the ads or other content can be in or around the message. The advertisements or other content are tracked via the visual communication system (step 4310). Advantageously, the content and advertising insertion method 4300 includes ad tracking based on each of the plurality of users being communicatively coupled to the visual communication system. In this step, the visual communication system tracks how many sponsored ads are used by the users as well as possibly tracking other metrics such as click through rates such as in FIG. 36. Here, the visual communication system can provide rewards, compensation, etc. to the users who use the ads in their visual talking messages as well as determine compensation required from vendors associated with the ads.

Referring to FIGS. 44-47, in various exemplary embodiments, block diagrams illustrate various exemplary operations of the content and advertising insertion method 4300 and the associated exemplary scenarios. For illustration purposes, the various exemplary embodiments in FIGS.

44-47 are illustrated with reference to the infinite cylinder user interface 3700. Of course, the content and advertising insertion method 4300 contemplates operation with other types of user interfaces and presentation. It is also noted that the various exemplary scenarios of the content and advertising insertion method 4300 can be used in combination with one another. That is, for example, ads could be added around a visual talking message that also includes sponsored images as part of the message itself.

Figure 44:
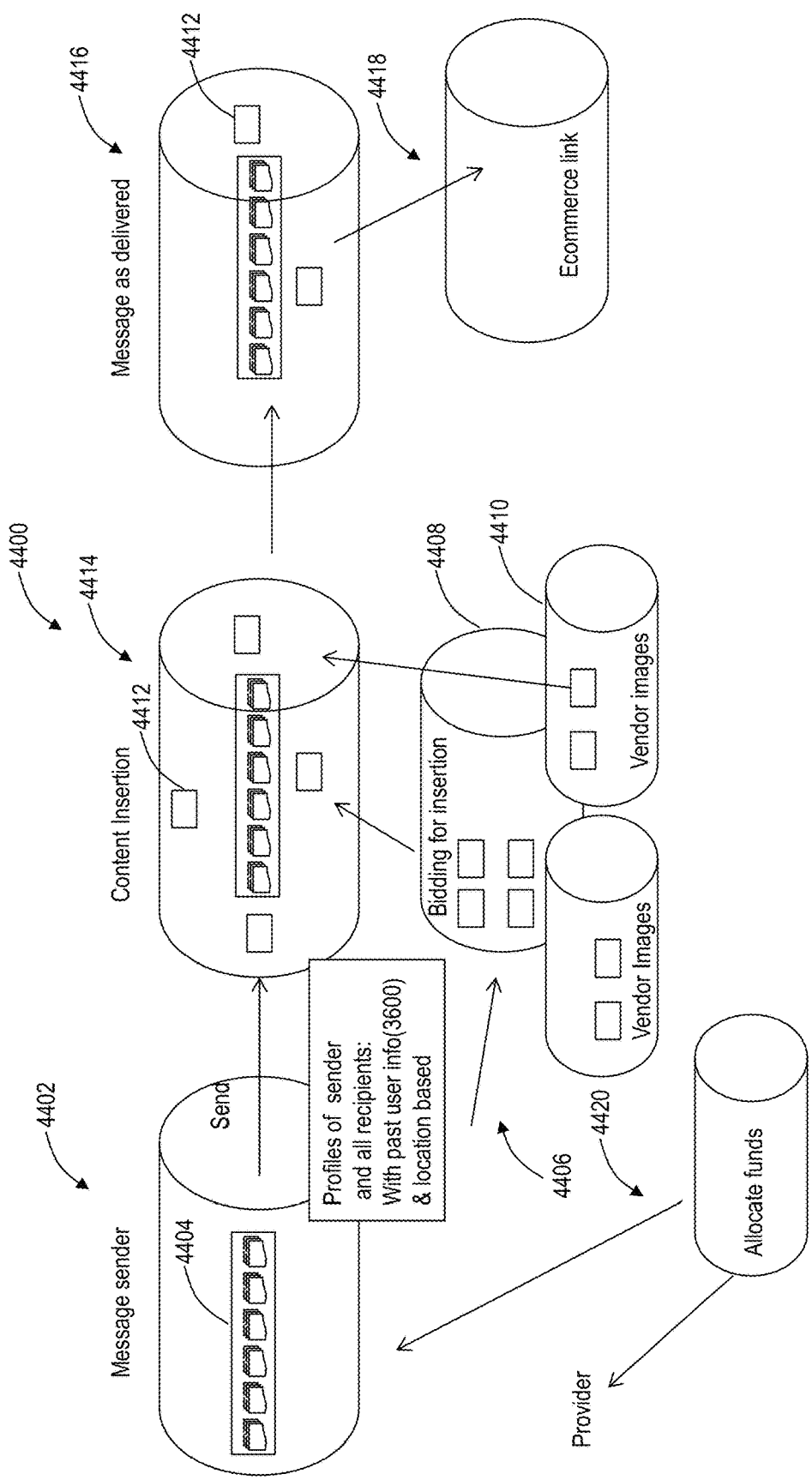
FIG. 44 is a block diagram of a first exemplary scenario of the content and advertising insertion method of FIG. 43.

FIG. 44 is a block diagram of a first exemplary scenario 4400 of the content and advertising insertion method 4300. That is, the first exemplary scenario includes real-time (or substantially real-time) ad bidding insertion while sending or receiving visual talking messages. At a first step 4402, a message sender is creating a visual talking message 4404. The step 4402 includes selection of various images to form the visual talking message 4404 as well as selecting a group of recipients (e.g., by username, email, cell phone number, etc.). Note, the sender and the recipients can include known profiles and history in the visual communication system, e.g. maintained through the table 3600. At a step 4406, the known profiles and history are provided to a bidding system 4408 which has a plurality of vendor images 4410 associated therewith. The bidding system 4408 is configured to quickly match the vendor images 4410 with the visual talking message 4404 for each intended recipient. Note, different recipients of the same visual talking message 4404 may receive different vendors images 4410 based on their unique profiles and history. The bidding system 4408 is configured to provide algorithmic matches of the vendor images 4410 based on the visual talking message 4404 and the individual recipients. For example, if the visual talking message 4404 relates to an automobile, the vendor images 4410 can be selected for auto dealerships, and further recipients can receive specialized images 4410 based on their known profiles.

The bidding system 4408 places various images 4412 in or around the visual talking message 4404 at a step 4414. The visual talking message 4404 is delivered at a step 4416 with the various images 4412. At a step 4418, a recipient can click through one of the images 4412 to bring up an ecommerce link. Finally, at a step 4420, funds are allocated based on the various images 4412. For example, the funds can be money, reward points, or the like. Further, the allocation of funds can be a value transfer from the vendors to the recipient, the visual communication system, or other providers. The idea here is to track the use of the images 4412 and compensate the senders and the like for their inclusion in their messages. Further, the visual communication system can track click through rates of the recipients providing the vendors useful statistics for their ad effectiveness.

Figure 45:
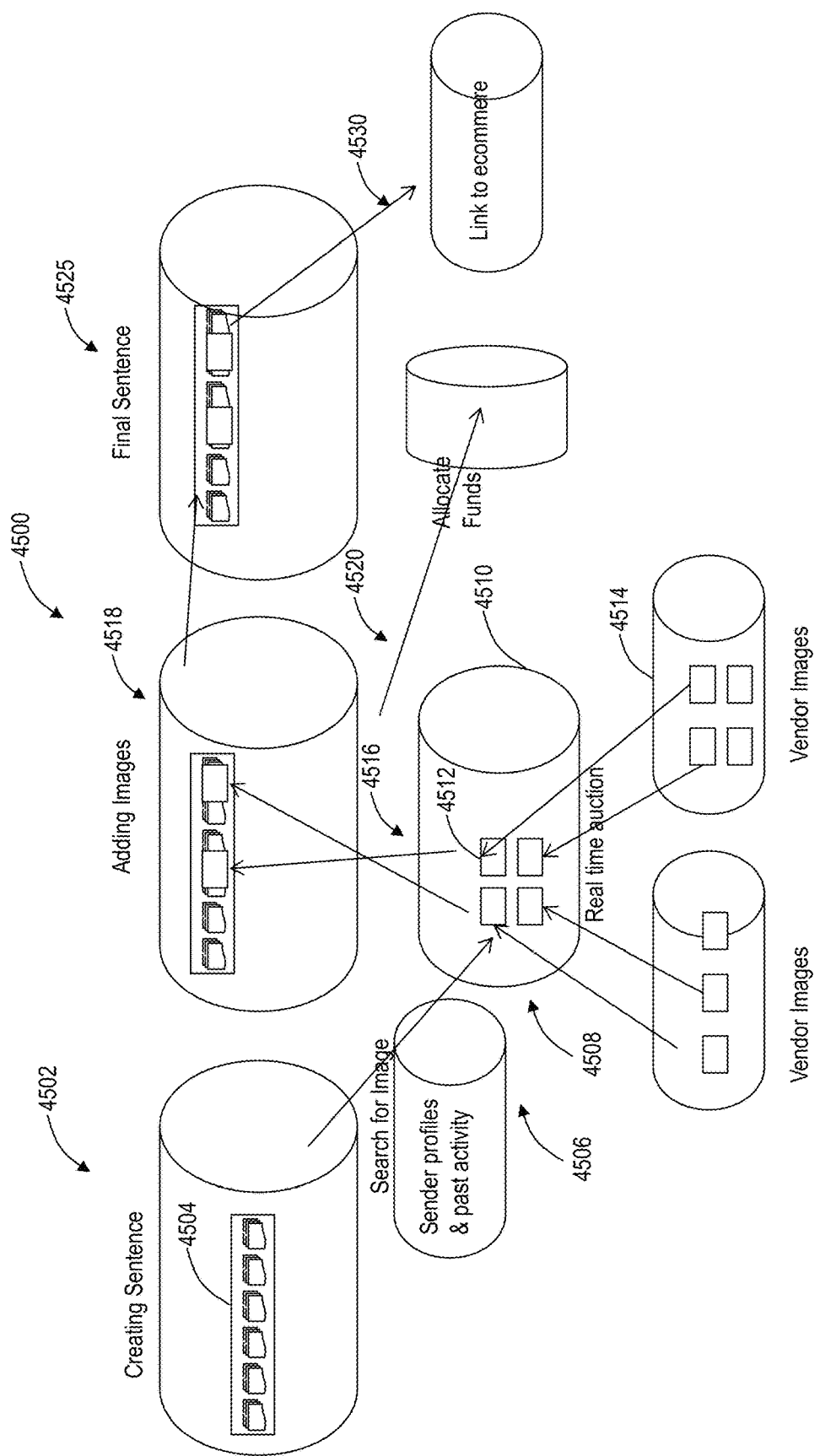
FIG. 45 is a block diagram of a second exemplary scenario of the content and advertising insertion method of FIG. 43.

FIG. 45 is a block diagram of a second exemplary scenario 4500 of the content and advertising insertion method 4300. That is, the second exemplary scenario includes real-time (or substantially real-time) bidding for image insertion into visual talking messages. At a step 4502, a sender is preparing a visual talking message 4504. The sender searches for images at a step 4506 to include in the visual talking message 4504. Again, the visual communication system includes knowledge of the sender's profile and past history, such as through the table 3600, and uses this information during the image search process. The second exemplary scenario 4500 includes a real time auction 4510 which determines which images 4512 to present to the sender for possible inclusion into the message 4504. The images 4512 are selected from a plurality of vendor images 4514 such as based on an algorithmic process using the search terms, already selected content of the message 4504, the sender's profile and history, and the like. The sender at a step 4516 can select one of the images 4512 presented from the real time auction 4510 for insertion into the visual talking message 4504 (step 4518). At a step 4520, funds are allocated by the visual communication system based on the sender's selection of the images 4512. At a step 4525, the message 4504 is delivered. At a step 4530, one of the recipients clicks through to an ecommerce link associated with the images 4512.

Figure 46:
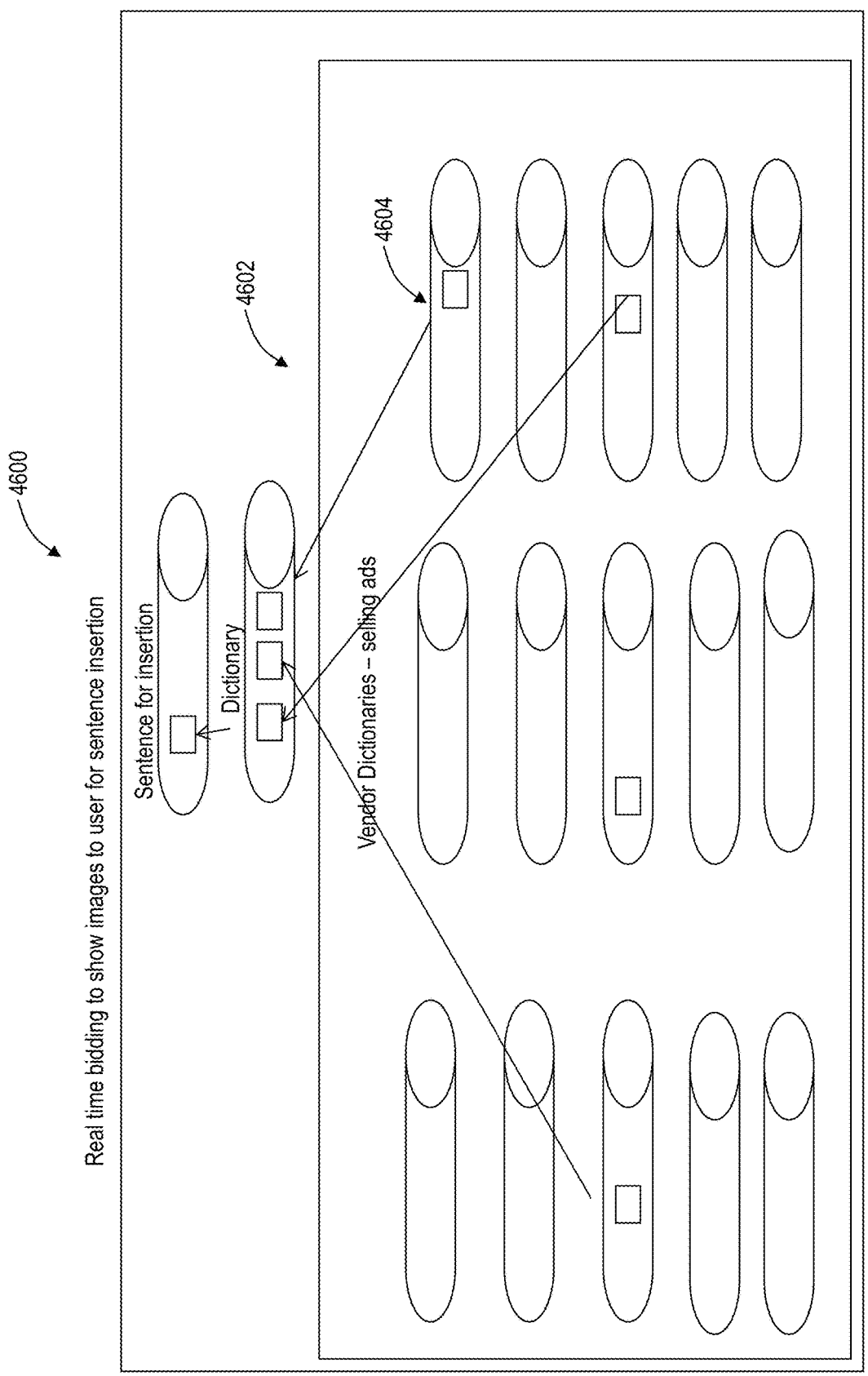
FIG. 46 is another block diagram of the second exemplary scenario of the content and advertising insertion method of FIG. 43.

FIG. 46 is a block diagram of another aspect 4600 of the second exemplary scenario 4500 showing selection from vendor image dictionaries based on the real time auction 4510. At a step 4602, the sender can be presented various images 4604 based on a search query. For example, the images 4604 can be presented via the infinite cylinder user interface 3700. The sender can select desired images 4604 and insert them into a sentence or visual talking message. In another exemplary embodiment, the aspect 4600 can be view as an online shopping mall showing various images. That is, the vendor image dictionaries can also be catalogs of various stores online—all insertable as content into visual talking messages.

Figure 47:
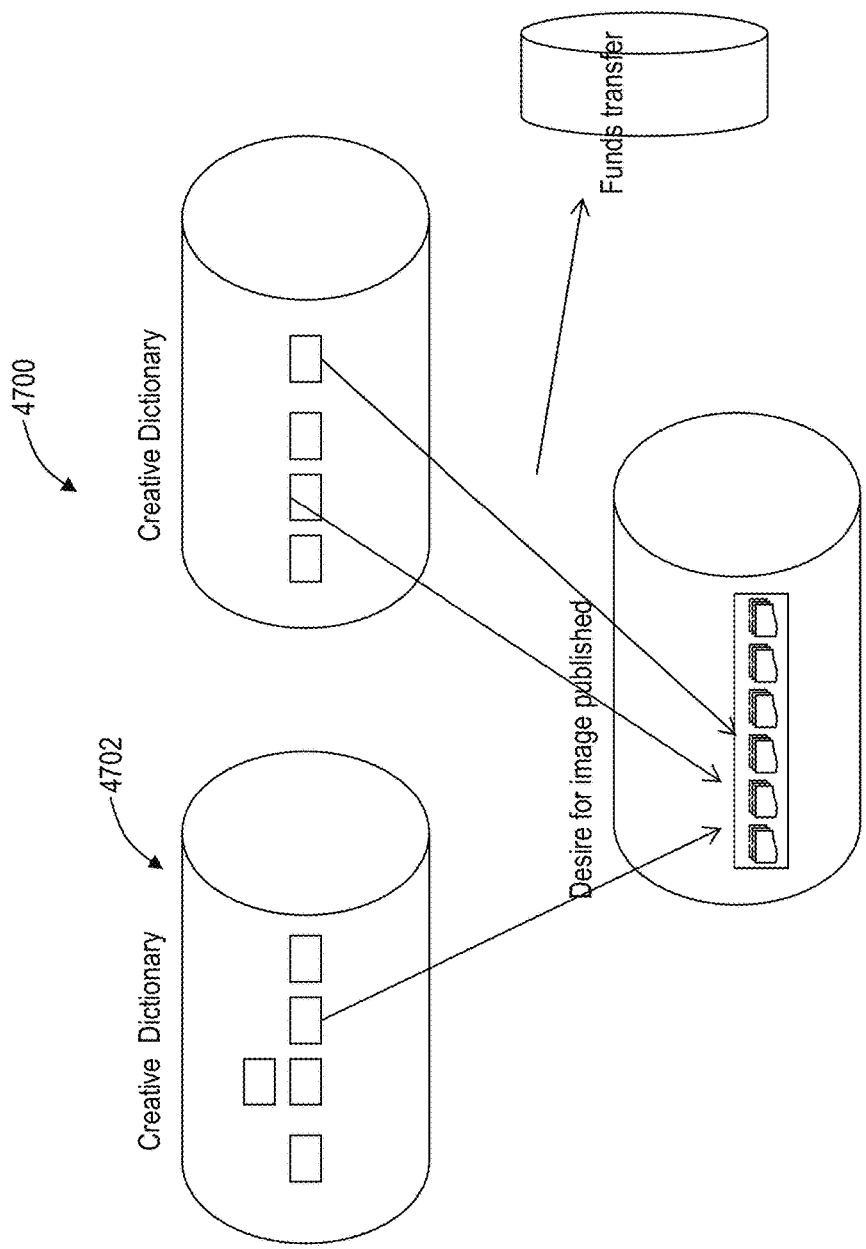
FIG. 47 is a block diagram of a third exemplary scenario of the content and advertising insertion method of FIG. 43.

FIG. 47 is a block diagram of a third exemplary scenario 4700 of the content and advertising insertion method 4300. Here, creative dictionaries 4702 are published with various images by vendors for users to take the images and store in their associated image dictionaries. In this manner, vendor images are published as creative content stored by the users and later inserted into visual talking messages from the user's image dictionary. Funds can be transferred when a user selects an image from the creative dictionaries 4702 and/or when an image from the creative dictionaries 4702 is used in a visual talking message.

Figure 48:
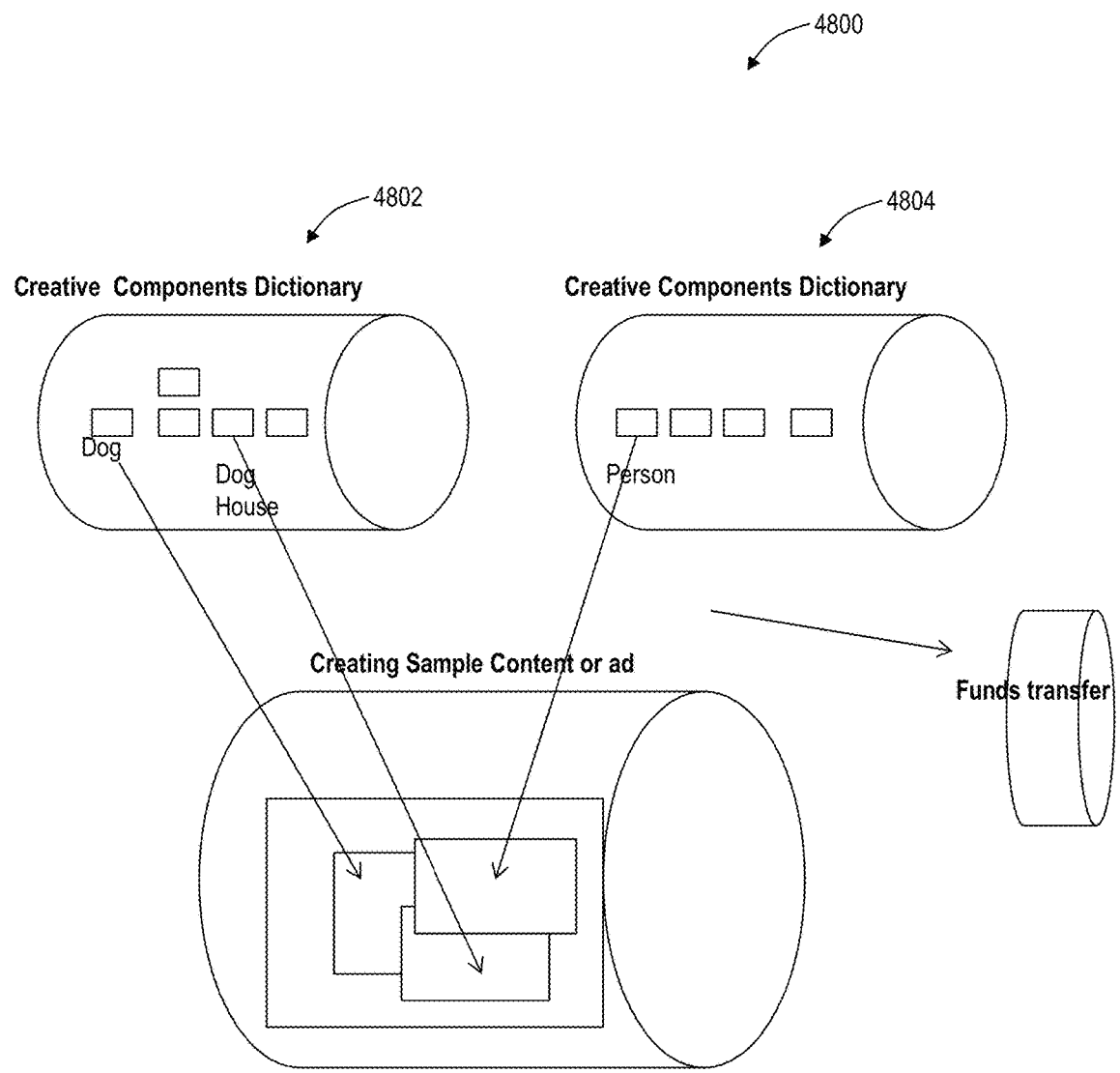
FIG. 48 is a block diagram of another exemplary scenario of selecting fragments and components to make real-time content or ads.

Referring to FIG. 48, in an exemplary embodiment, a block diagram illustrates another exemplary scenario 4800 of selecting fragments and components to make real-time content or ads. In the exemplary scenario 4800, various component or fragment dictionaries 4802, 4804 exits to build up content quickly (in seconds or fraction of seconds). The intent is to assemble content from the various component or fragment dictionaries 4802, 4804 that add to a "blue/green" screen like background so they all blend in and look natural. For example, an image of a person is taken from a component library 4804 and from another component library 4802, an image of a pet, then an image of a dog house (and a pet retailer is attempting to sell the dog house and the pet), etc. This can also include the additional ability to add freehand drawing to this or "markup" as well as the ability to add 1) video fragments and 2) sound fragments. Individual images in the visual talking message can be created from different images in the component or fragment dictionaries 4802, 4804.

Performance Comparisons Utilizing an Infinite Cylinder User Interface

In an exemplary embodiment, the present disclosure relates to systems and methods to improve performance or occurrences based on comparing actual collected data versus a "best" target(s) and using the comparison variances to focus attention and decide to change and then assign responsibility to change and track success, and redo again and again to reach best.

In various exemplary embodiments, the present disclosure relates to systems and methods to improve performance or occurrences based on comparing actual collected data versus a "best" target(s) and using the comparison variances to focus attention and decide to change and then assign responsibility to change and track success, and redo again and again to reach best. Unlike the past closed systems, these systems and methods unite parallel systems of data collection, target comparison, responsibility assignment and effectiveness to display for adaptive attainment of best. Comparisons versus 10 to 50 or more best targets is easily done.

The systems and methods enhance activity/systems/etc. performance by comparing collected actual data (from real time sensor inputs, social media digital, manual forms, existing databases, etc.) and automatically comparing it with target "best data" (many different targets at same time) and having the resultant variations displayed in a format to allow human focus, with assignment of responsibility to improve, and automatic tracking of improvement, and all improvements made as part of base system, and then the process repeats itself over and over again.

With the various exemplary embodiments described herein, data is presented to users for conveying information thereto. As visual communicators grow both with the various exemplary embodiments described herein and the like, more efficient systems and methods are needed for viewing, selecting, adding, editing, and reading data, especially complex comparison data versus plural targets. Conventional user interfaces include flat spaces in all directions that are too slow, cumbersome, difficult to manage, etc. Thus, systems and methods are described presenting data and comparisons utilizing an infinite cylinder user interface. The infinite cylinder user interface contemplates use on a computer monitor, television, mobile device screen, projector, etc. as an efficient mechanism to present images to comparisons, variances, and related actions to a user such that they can easily track the current day or any day or any trend and the relationships between raw data, targets, variances, action steps, and changes based on action steps, etc.

In an exemplary embodiment, a computer-implemented method includes providing one or more data streams; providing one or more target groups for comparison with the one or more data streams; providing a focus format for improving the one or more data streams relative to the one or more target groups; and providing an infinite cylinder user interface for display of data associated with the one or more data streams, the one or more target groups, and the focus format.

In another exemplary embodiment, a system utilizing an infinite cylinder user interface includes a data store for one or more data streams; a network interface communicatively coupled to a network; a processor communicatively coupled to the data store and the network interface; and instructions executable by the processor, and in response to such execution causes the processor to: receive the one or more data streams; provide one or more target groups for comparison with the one or more data streams; provide a focus format for improving variances associated with the one or more data streams relative to the one or more target groups; and provide an infinite cylinder user interface for display of data associated with the one or more data streams, the one or more target groups, and the focus format.

In yet another exemplary embodiment, software stored in a non-transitory computer readable medium and comprising instructions executable by a system, and in response to such execution causes the system to perform operations comprising: providing one or more data streams; providing one or more target groups for comparison with the one or more data streams; providing a focus format for improving the one or more data streams relative to the one or more target groups; and providing an infinite cylinder user interface for display of data associated with the one or more data streams, the one or more target groups, and the focus format.

Figure 49:
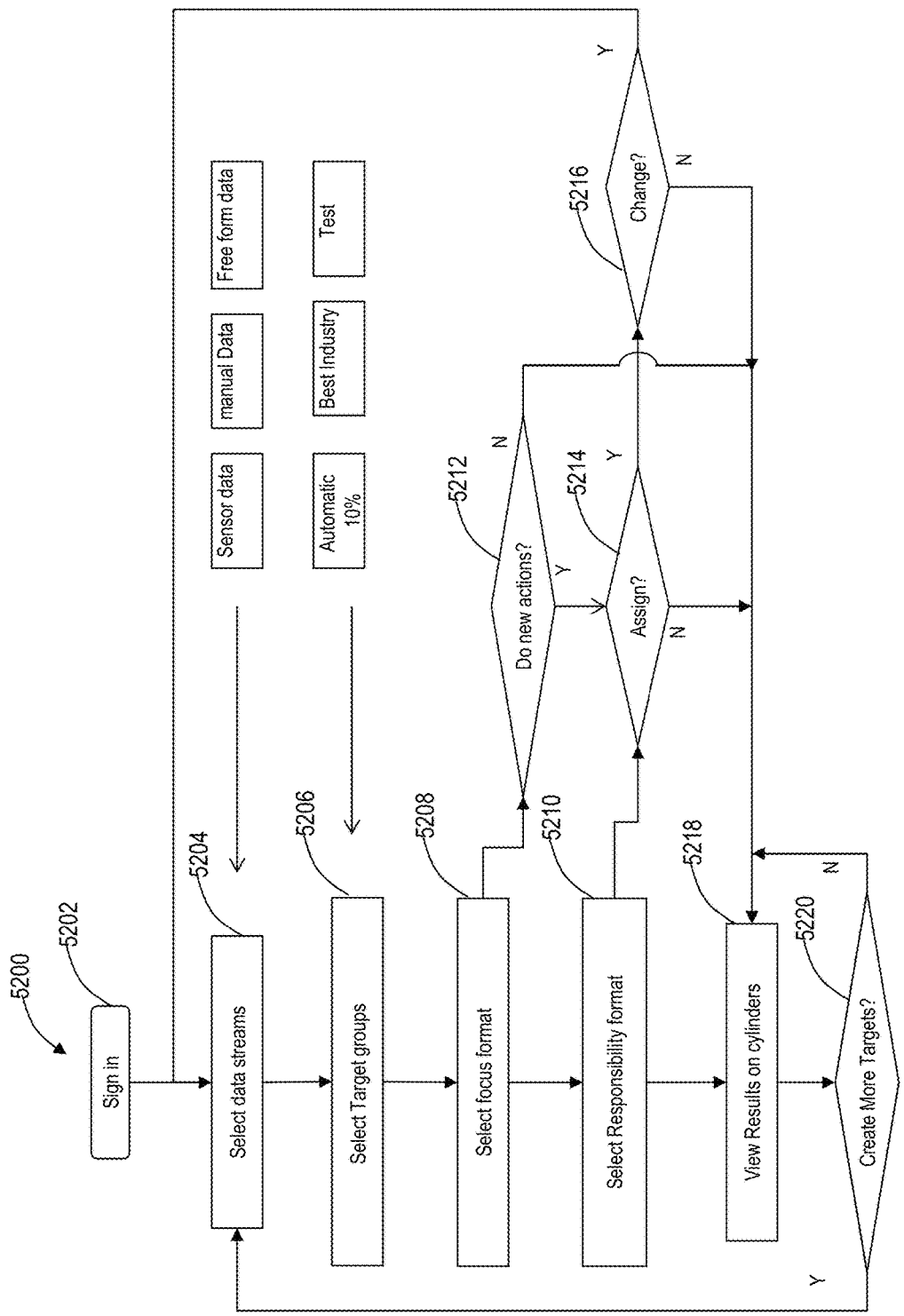
FIG. 49 is a flowchart of a computer-implemented method to improve performance or occurrences based on comparing actual collected data versus a "best" target(s).

Referring to FIG. 49, in an exemplary embodiment, a flowchart illustrates a computer-implemented method 5200 to improve performance or occurrences based on comparing actual collected data versus a "best" target(s) and using the comparison variances to focus attention and decide to change and then assign responsibility to change and track success, and redo again and again to reach best. The computer-implemented method 5200 includes signing in (step 5202). The computer-implemented method 5200 can be implemented in a portal, database, on a device, etc. which can be communicatively coupled to one or more data stores. The computer-implemented method 5200 can include a multi-user sign in which assigns what areas to view and be responsible for. That is, the computer-implemented method 5200 can be operated by a plurality of users via local devices communicatively coupled via a network to a central data store or the like.

The computer-implemented method 5200 allows each user to select data streams (step 5204). This includes selecting, adding, or viewing data inputs for a variety of activities, areas, functions, etc. In various exemplary embodiments, the computer-implemented method 5200 contemplates data from any source such as, without limitation, sensor data, manual data, free form data, etc. The data streams represent the data for comparisons in the computer-implemented method 5200. The data streams can relate to financial and accounting data, business analytics, health related information, etc. That is, the data streams can relate to any data that is sought for comparisons and optimization with the computer-implemented method 5200. Next, the computer-implemented method 5200 selects target groups (step 5206). The target groups represent the optimized goal for the data streams and can include, without limitation, a predefined better amount (e.g., +/-10%), a best based on a survey (e.g., best in class, industry, etc.), manually-defined targets, etc. Additionally, a unique aspect of the computer-implemented method 5200 is the ease at which plural targets can be selected and viewed in an understanding format with the infinite cylinder user interface 3700. As such, the selection of target groups can include multiple targets.

The computer-implemented method 5200 includes selecting comparison formats to see the variance and focus (step 5208). This step includes configuring the infinite cylinder user interface 3700 for display at present as well as over periods of time for running optimizations with the computer-implemented method 5200. For example, the step 5208 can include all variances on one view to allow focus on most important (e.g., on scalar, dollars & value), a summary of totals, price, and/or volume variances, and the like. The computer-implemented method 5200 includes selecting a responsibility format (step 5210). This includes assigning principals' responsibility for improvement actions as well as how it is displayed. For example, the computer-implemented method 5200 can include, after the step 5208, determining new actions to perform for improvements (step 5212) as well as assigning responsibility for the improvements (step 5214) or changing responsibilities/data streams (step 5216). Finally, the computer-implemented method 200 includes viewing results on the infinite cylinder user interface 3700 (step 5218), and optionally updating (step 5220).

Figure 50:
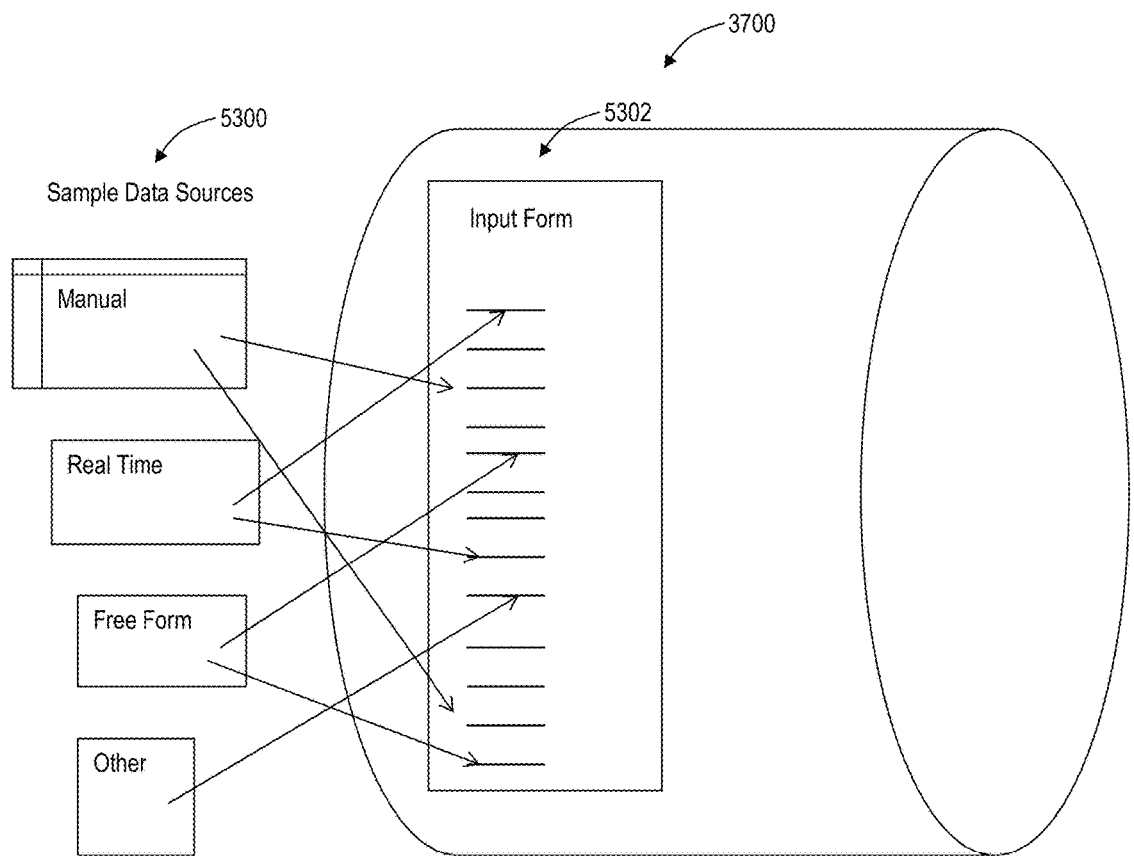
FIG. 50 is a logical diagram of selecting data streams on the infinite cylinder user interface of FIGS. 37A-37C and the computer-implemented method of FIG. 49.

Referring to FIG. 50, in an exemplary embodiment, a logical diagram illustrates selecting data streams on the infinite cylinder user interface 3700 with the computer-implemented method 5200. Specifically, multiple data sources 5300 can be selected and input into the infinite cylinder user interface 3700. In an exemplary embodiment, the sample data sources 5300 can be combined, selected individually or in combination, etc. and they can be placed in an input form 5302 in the infinite cylinder user interface 3700. In an exemplary embodiment, the input form 5302 is displayed in a list or the like about a cylinder in the infinite cylinder user interface 3700 such that a user can scroll, infinitely or the like, about the cylinder have plural data sources.

Figure 51:
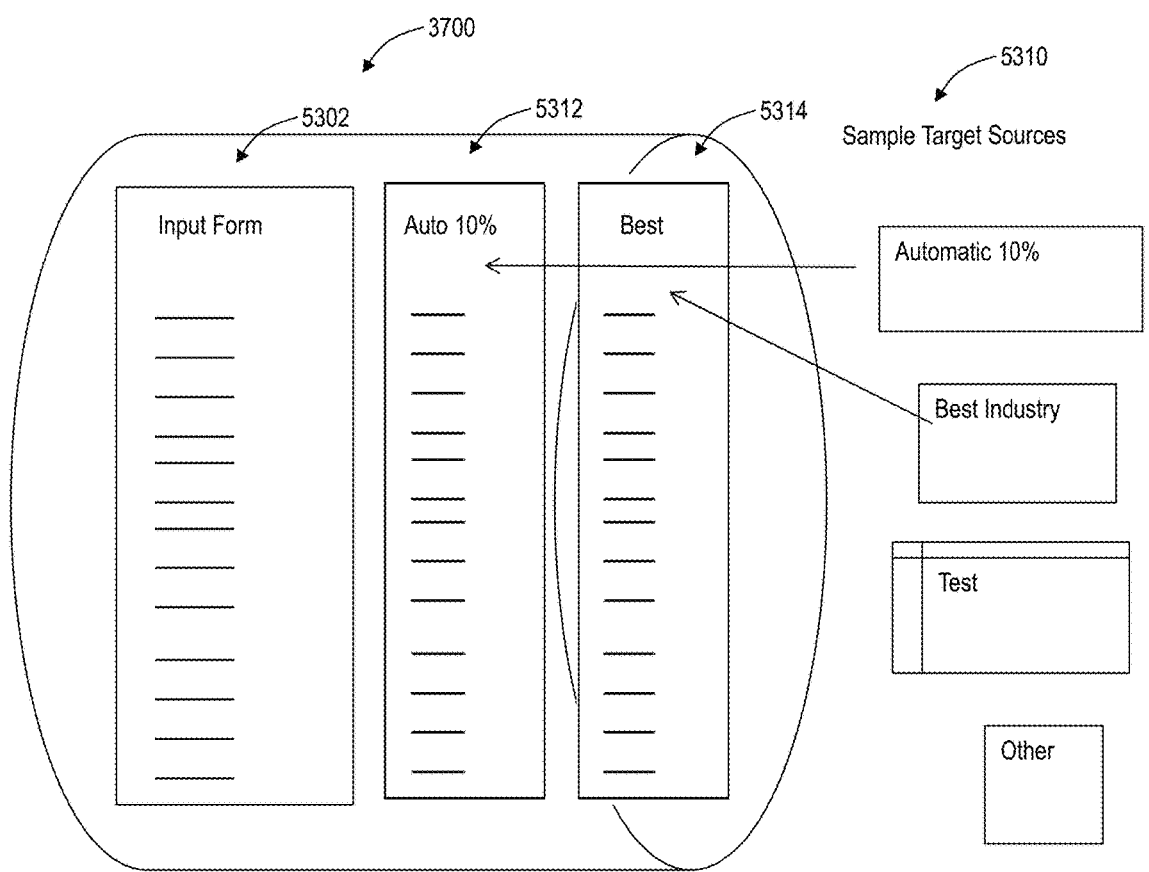
FIG. 51 is a logical diagram of selecting target groups on the infinite cylinder user interface of FIGS. 37A-37C and the computer-implemented method of FIG. 49.

Referring to FIG. 51, in an exemplary embodiment, a logical diagram illustrates selecting target groups on the infinite cylinder user interface 3700 with the computer-implemented method 5200. The infinite cylinder user interface 3700 includes the input form 5302 from FIG. 50, and includes selected target sources 5310 which are displayed adjacent in exemplary forms 5312, 5314 adjacent to the input form 5302 such that each row displays the target source 5310 for a corresponding input form 5302. In FIG. 51, the infinite cylinder user interface 3700 shows taking many different targets and comparing them versus the actual inputs to create variances. One advantage of the infinite cylinder user interface 3700 is the ability to display plural target sources 5310 next to the input form 5302 based on the accessibility of the infinite cylinder user interface 3700. For example, FIG. 51 illustrates an automatic 10% improvement target source 5312 and a best target source 5314 together next to the input form 5302.

Figure 52:
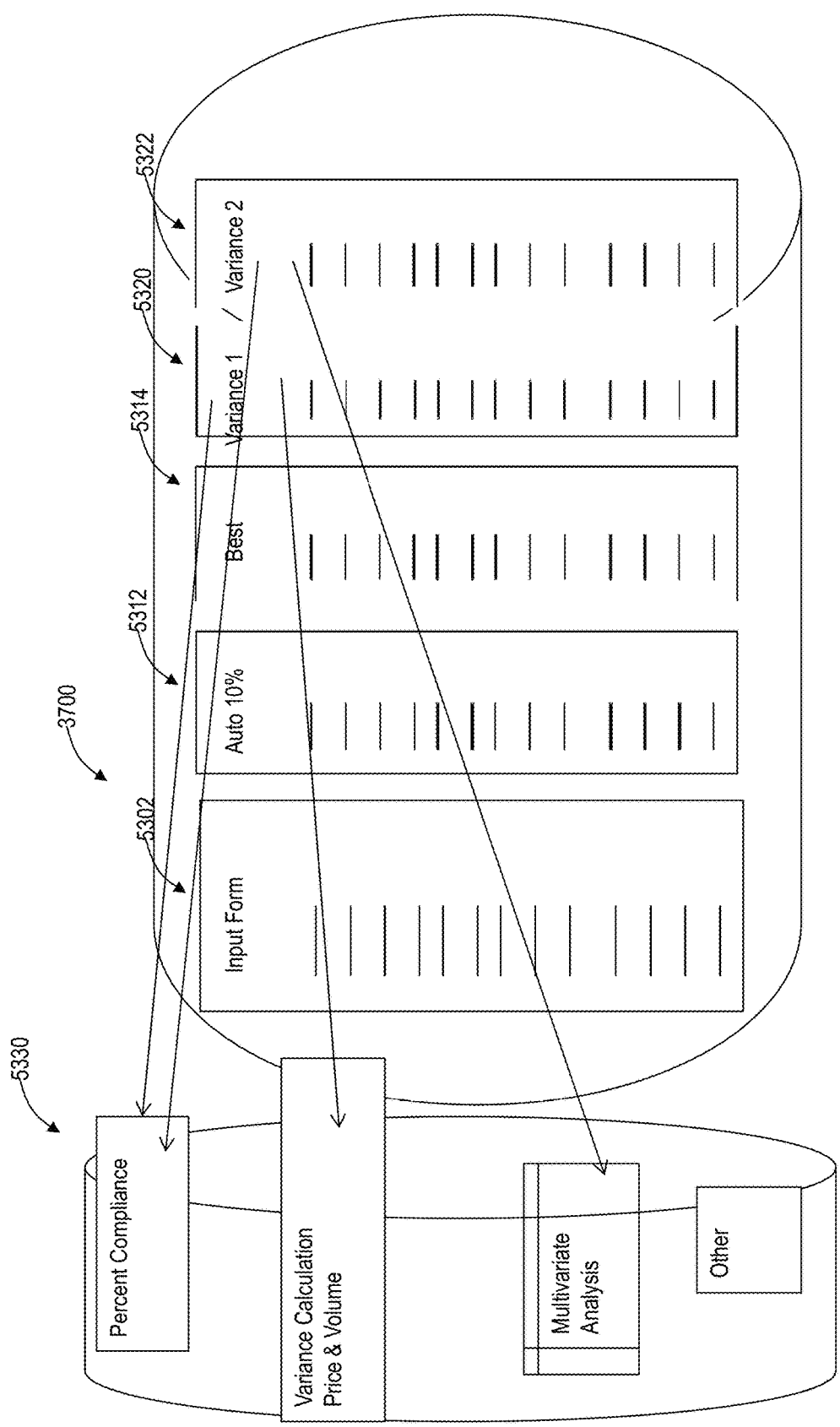
FIG. 52 is a logical diagram of selecting focus formats on the infinite cylinder user interface of FIGS. 37A-37C and the computer-implemented method of FIG. 49.

Referring to FIG. 52, in an exemplary embodiment, a logical diagram illustrates selecting focus formats on the infinite cylinder user interface 3700 with the computer-implemented method 5200. The infinite cylinder user interface 3700 includes the input form 5302 from FIG. 50 and the target sources 5312, 5314 from FIG. 51. The infinite cylinder user interface 3700 further includes variances 5320, 5322 which are also displayed adjacent to the input form 5302 and the target sources 5312, 5314. The variances 5320, 5322 can include any of various variance types 5330 such as percent compliance, a variance calculation of price and volume, a multivariate analysis, and the like. Again, one advantage of the infinite cylinder user interface 3700 is the ability to display plural target sources 5310 and plural variance types 5320 next to the input form 5302 based on the accessibility of the infinite cylinder user interface 3700. Due to the infinite and multi-dimensional scrolling aspects of the infinite cylinder user interface 3700, users may easily access large amounts of information.

Figure 53:
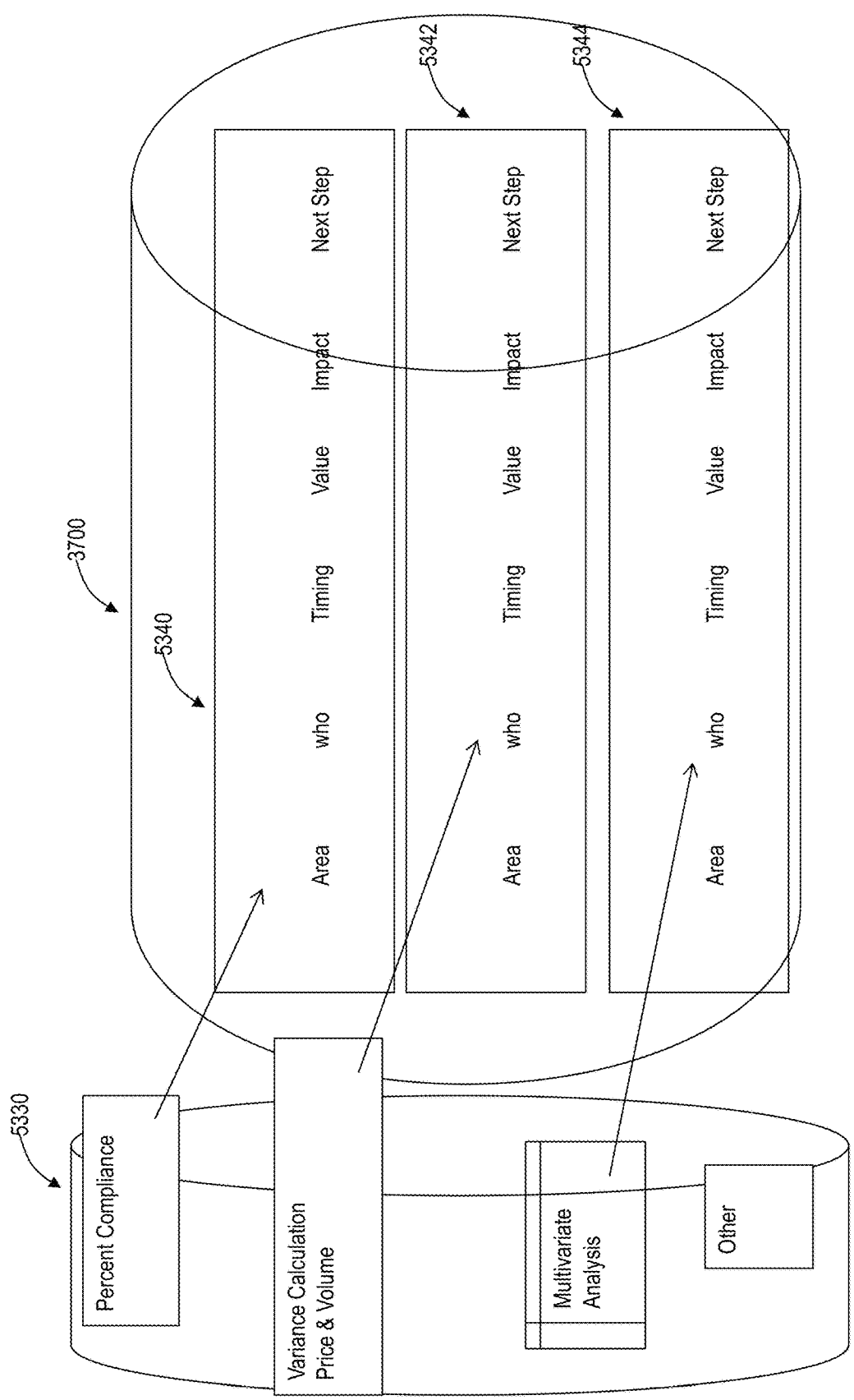
FIG. 53 is a logical diagram of selecting responsibility focus on the infinite cylinder user interface of FIGS. 37A-37C and the computer-implemented method of FIG. 49.

Referring to FIG. 53, in an exemplary embodiment, a logical diagram illustrates selecting responsibility focus on the infinite cylinder user interface 3700 with the computer-implemented method 5200. This includes taking specific areas to improve, and assigning them to someone and then tracking the progress on the infinite cylinder user interface 3700. That is, one can assign any of the variances 5320, 5322 to someone and the focus is displayed on another cylinder separate from the main cylinder in FIGS. 50-52 to show the responsibility focus. In FIG. 52, any of the variances 5320, 5322 can be selected (i.e., "drilled-down") and shown as responsibility trackers 5340, 5342, 5344 in FIG. 53. Each of the trackers 5340, 5342, 5344 can include various information for tracking progress.

Figure 54:
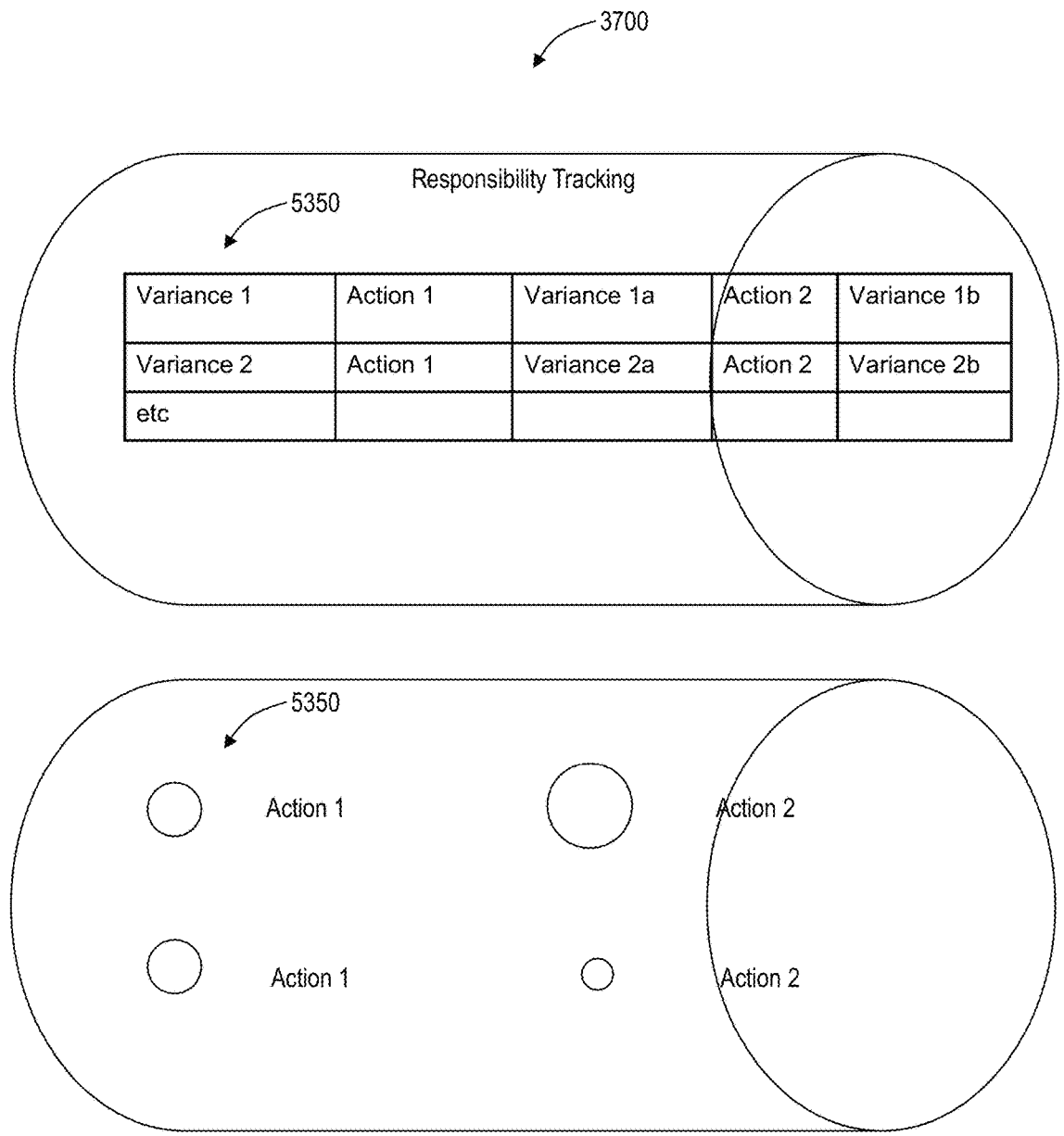
FIG. 54 is a logical diagram of tracking variances through time on the infinite cylinder user interface of FIGS. 37A-37C and the computer-implemented method of FIG. 49.

Referring to FIG. 54, in an exemplary embodiment, a logical diagram illustrates tracking variances through time on the infinite cylinder user interface 3700 with the computer-implemented method 5200. Again, the infinite cylinder user interface 3700 conveniently enables an accessible display of information to track responsibilities and progress. For example, the various variances 5320, 5322 can be displayed over time in tracking progress 5350. This can be text, but also can display graphics such as displaying the variances 5320, 5322 pictorially over time by circles with corresponding magnitudes based on values.

Figure 55:
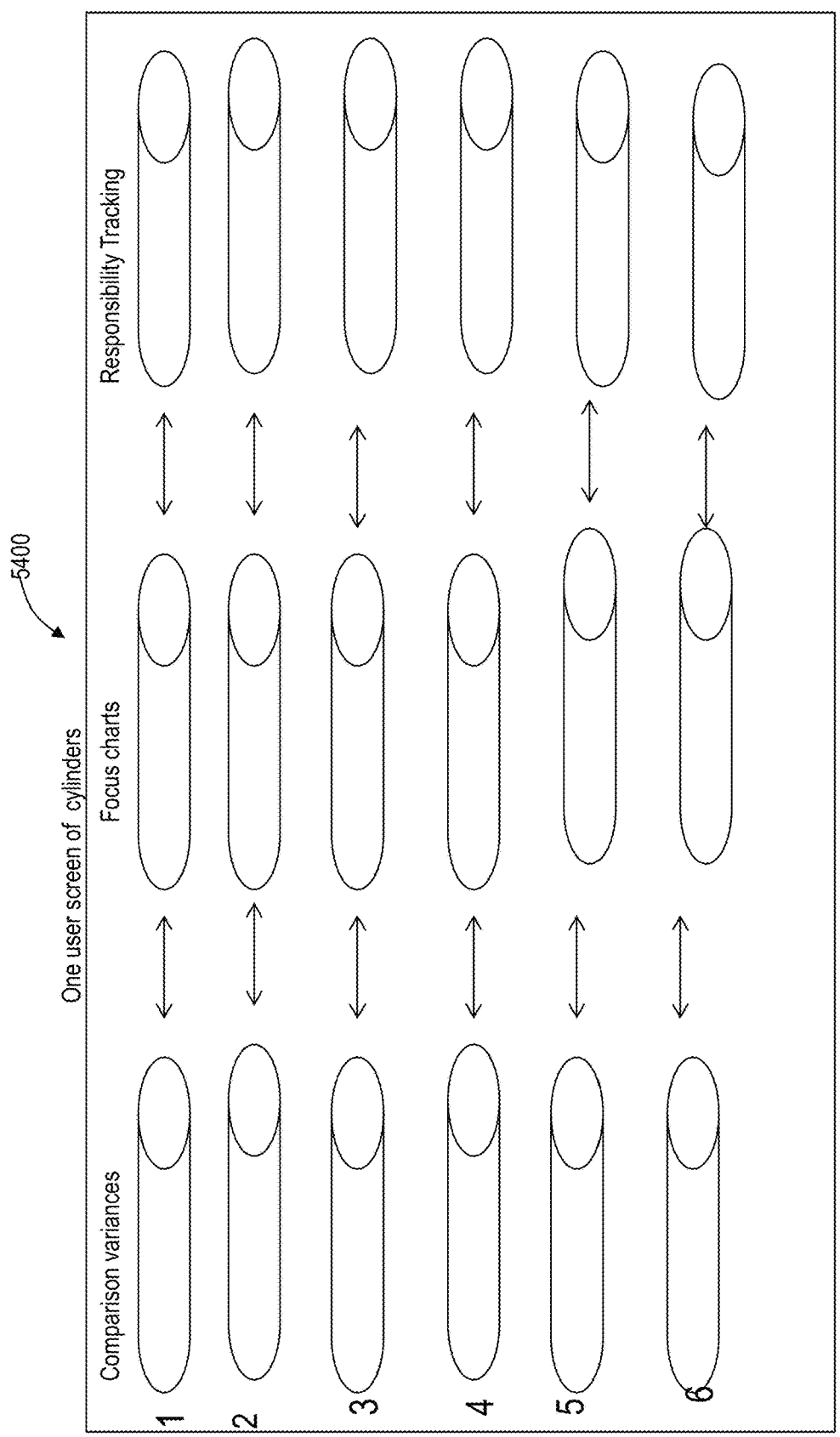
FIG. 55 is a screen diagram of a home screen for a user displaying various infinite cylinder user interfaces of FIGS. 37A-37C.

Referring to FIG. 55, in an exemplary embodiment, a screen diagram illustrates a home screen 5400 for a user displaying various infinite cylinder user interfaces 3700. Here, for example, six sets of performance comparisons are shown (of course this could be any number), and a user can utilize the home screen 5400 to navigate to a particular infinite cylinder user interface 3700.

Figure 56:
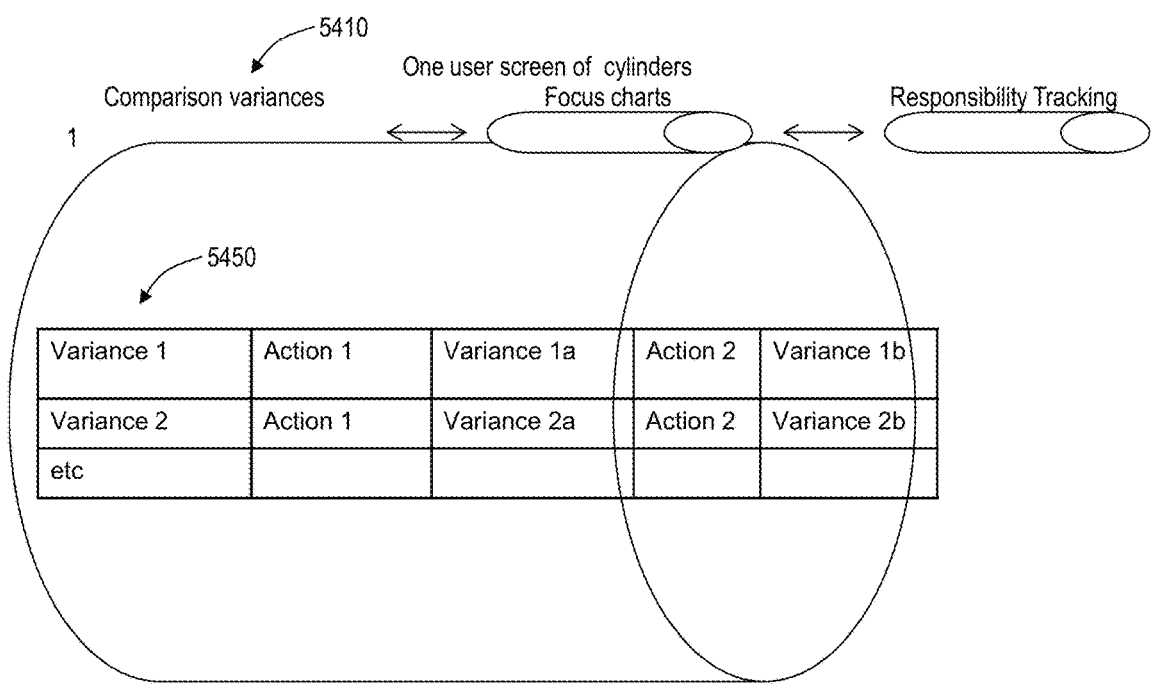
FIGS. 56-58 are logical diagrams illustrate an exemplary flow through one of the sets of data in the home screen of FIG. 55.
Figure 57:
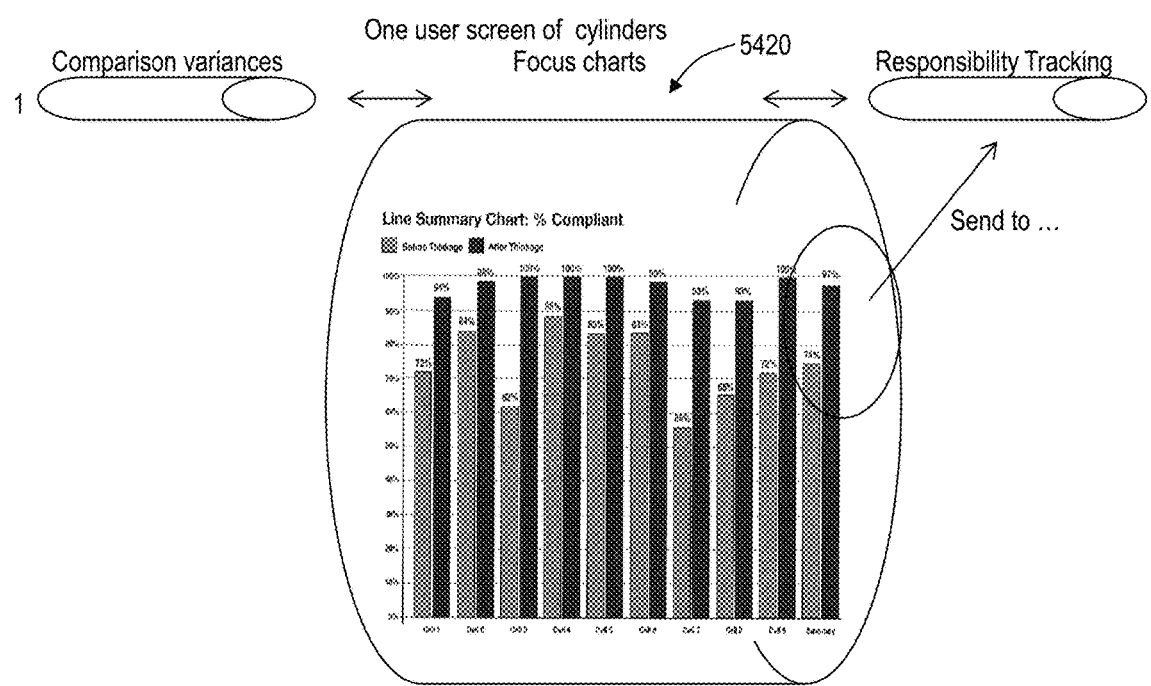
Figure 58:
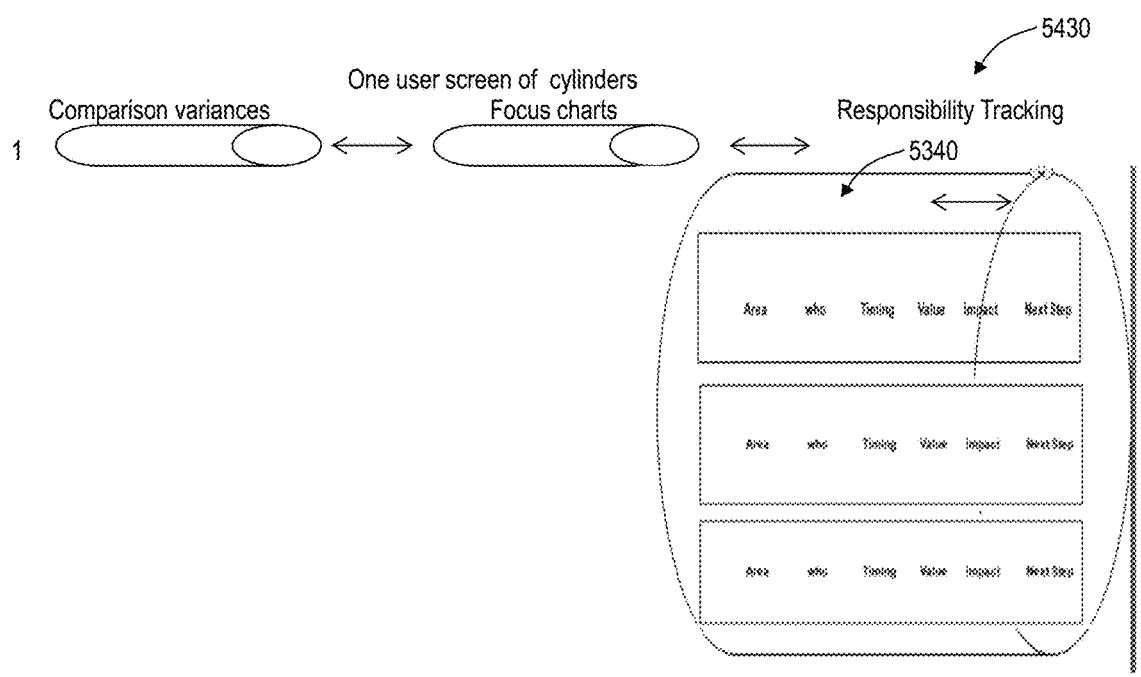

Referring to FIGS. 56-58, in exemplary embodiments, logical diagrams illustrate an exemplary flow through one of the sets of data in the home screen 5400. First, in FIG. 56, a cylinder 5410 is selected displaying the tracking progress 5450. Next, in FIG. 57, one of the tracking progress points is selected bringing up a sample focus chart 5420. Finally, in FIG. 58, a point in the focus chart 5430 is sent to a responsibility tracker 5340 for processing thereof. Again, all of the activity is performed in the infinite cylinder user interface 3700.

The infinite cylinder user interface 3700 with the computer-implemented method 5200 contemplates various areas of use. For example, in business, uses can include operating a plant versus the world wide best target in the "ocean", creating the perfect city and comparing to that, measuring all aspects of the supply chain logistics vs. theoretical best, comparing customer behavior—best buyer, etc. For example, in personal areas, uses can include monitoring health real time vs. perfect male, best friend, your targets, etc., comparing your driving experience real time, connecting to house and making it operate perfectly for temperature, light, smell, etc., shopping versus best dressed in vogue magazine, eating habits, exercise habits, and other habits (programmed best life). For example, in nonprofits, a use could include showing a population vs. the ideal population. In an exemplary operation, the infinite cylinder user interface 3700 with the computer-implemented method 5200 can be used operating a manufacturing plant compared to best scenarios and improving. For example, a manufacturing plant wants to compare their performance versus several different targets (FIG. 49, step 5202 and FIG. 52) ranging from their best performance ever, to the best in the industry, to the best in a similar industry, and based on the real time (hourly, daily, weekly, monthly, yearly) comparisons they focus on deviations (FIG. 49, step 5204 and FIG. 53) where they can do better, so they assign (FIG. 49 step 2510 and FIG. 54) these deviations to people/groups to improve these deviations. The system tracks (FIG. 54) their success in managing these deviations noting how their actions impact the deviations in the future.

In another example, a company wants to improve its' labor productivity. Traditionally, they would use their accounting data and prepare a special study or report which can require many hours of data collection and analysis by specially trained experts. With this invention, the plant just selects the key variables (FIG. 50) they feel impact productivity, like labor hours, labor rate, and quantity made (and many more financial and operating variables), and they input those the easiest way into the system to compare versus the selected targets. Referring to FIG. 51, they pick their production data best day ever for each variable and call this target one. In addition, they pick what they feel is the best competitor from their industry, and they enter that as target two. Then they pick the best from a different industry and input this as target three. Now, with the targets picked, they can compare the real time data streams (FIG. 50) with all three targets and focus on the variations they see by looking at the various focus formats (FIG. 53). For example, one focus format shows how close they are to always being within plus or minus 5% of the target value, and if they are not at that level 95% of the time, the system automatically sends the deviations to be tracked in FIG. 54, with the belief to assign responsibility to get them to improve beyond the 95%. Similarly, another focus chart shows traditional price and volume deviations and any deviation above a predetermined value are sent to responsibility charting (FIG. 54). Similarly, another focus chart (i.e. multivariate analysis) shows the relationship between variables to discover if variations can trend together or apart. In addition, some variations can send alarms to the responsibility charting system.

As described, key variations are assigned to people who prepare actions steps to improve the variations and these are tracked in the system (FIGS. 54 and 55) to directly relate the time and the new actions to its' impact on the variance. The best way to display all the relationships is to show them on cylinders (FIG. 56) and see how they all relate together now, and through time. Similar to how a tree tells a story with its rings, each cylinder ring represents a different time and can compare rings of the same time or different times. Cylinder rings may be sorted on variables besides time, such as customer, product code, employee, etc. In this way, the manufacturing plant can push to be the best always, improving beyond the current targets and adding even higher targets whenever they want, just be adding to the process of the computer-implemented method 5200.

In another example, to create a perfect city, as population grows in cities, city planning is becoming even more important. To relate all the best variables, such as efficient power, clean water and air, trash pickup, etc., requires a system to collect the variables and compare them to best targets, and assign people to have responsibility to improve the actual to target. So a city may want to improve versus several targets, such as its' best performance from the previous year with 3% better, or to a city twice the size, or to another "perfect" city that a consultant survey devised for their size city. The system here operates just as it did for the manufacturing plant.

In yet another example, for matching to customer profiles, an organization, business or nonprofit, wants to match all of their customers and potential customers to a specific profile as they can serve them better or create better profiles if need be to better serve. So, according to the computer-implemented method 5200, the organization selects variables for 15 separate profiles (i.e. targets) and sets values for each variable in the profile, such that each profile is a different target (FIG. 51). As the real data enters the system in FIG. 50, the focus charts (FIG. 52) show how similar the customers are to the various profiles, and by seeing how similar they are to each profile (low variance), they are assigned (FIG. 53) the responsibility as a service person to better serve the customer.

In still yet another example, the computer-implemented method 5200 can be for personal use to improve health (or anything else one owns). For example, a person wants to improve their health, so they select the variables they want to improve (FIG. 50) such as weight, heart rate, blood pressure etc. and they enter the data for several targets (FIG. 51). The first target is the data supplied by their doctor. The second target is the data for an athlete in their field taken from published on line search. The third target is from a survey in Men's Health magazine. As with all examples, the actual versus targets send variance information to a responsibility tracking system where the person puts in activities and times for what they want to improve and they see if it is improved or not and they keep making changes to their behavior to get the desired variances.

In a similar example to improving personal health is to improve their personal driving experience when the target is a combination of data about the person and data about the car engine and physical driving performance. Still another example is comparing to the perfect house, by using utilities in the best targeted way and having the perfect livable environment versus target. Another example is to have the best personal style, and compare your look versus other best looks like in Vogue Magazine. This requires the use of a visual system. Obviously, this system can be easily used whenever a user wants to compare actual activity with a target or several target activities.

Design and Build an Entire Experience all-at-Once

In an exemplary embodiment, systems and methods for visual communications are described to design and build entire experiences at once, using "visual talking" images and the like as described herein. The systems and methods provide a multi-product experience, using the various techniques described herein for visual talking. The distinct approach provides an experience, where customers can easily visualize their perfect "day in the life" living with all their products and services working together. Growth opportunities are significant, as sales can double or even triple, and customers will live happily in their "Pointing After" heaven. The "Pointing After" approach utilizes several visual approaches to enable customers to see and immerse themselves in a company's multi products and services, managing customer selections to point to the best customer "after" experience possible. Once the "Pointing After" is established, consulting can insert specialized logistics and marshalling to support the transactional customer journey. This visual know how creates customer Maps and Flows, organizing the customer treasure hunt to the pot of gold sensation of joy. Customer joy extends past the original purchase with each new purchase to refresh the customers' changing day in the life.

Conventionally, customers buy products and services from different manufactures (e.g., P&G, J&J, etc.) and suppliers (e.g., Amazon, Walmart, etc.). Customers expend energy and thought to integrate or fit these products into their daily life. Many times these products and services are so generic they do not fit in the customer's life without significant redesign. Further, customers do not have the knowledge or the time or the resources to fit these independent products into their lives. So, they use unfriendly components that make their life an inefficient daily grab bag of unneeded surprises and failures. There are no conventional techniques to visualize what an integrated life can look like and build it so that customers have choices. With the systems and methods, customers can make choices and then monitor how well those choices were and them improve on those choices in the future. The systems and methods provide process that customers and businesses can use that allows to design their experiences and order the components and ensure they are the best, and if not, use the same process to keep getting better, continual improvement. The current invention describes this process improvement over the simple buy a product approach.

Figure 59:
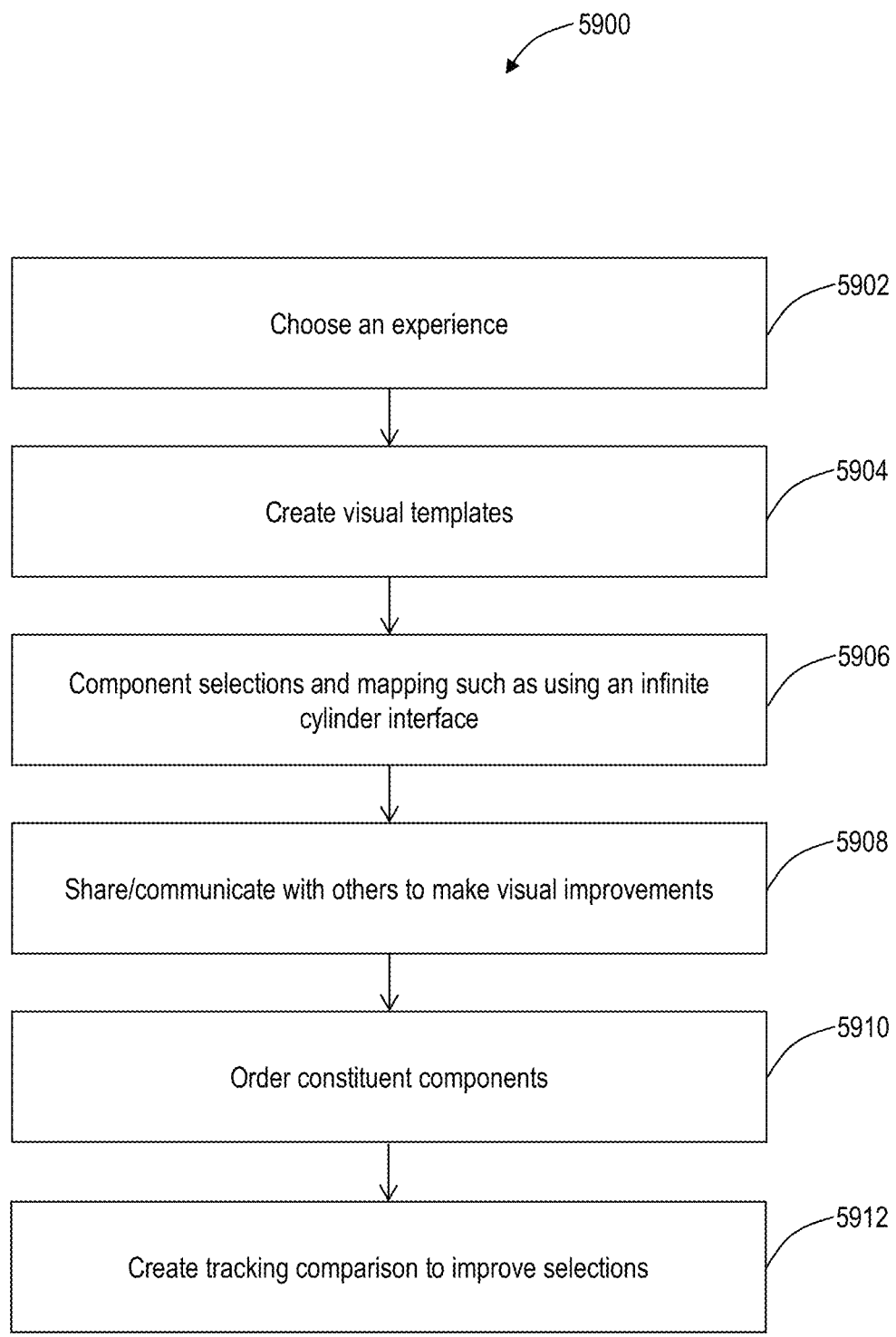
FIG. 59 is a flowchart of a design and build process for a complete customer experience, complete with all the elements that are perfectly designed and coordinated for their unique customer experience, using the visual talking techniques described herein.

Referring to FIG. 59, in an exemplary embodiment, a flowchart illustrates a design and build process 5900 for a complete customer experience, complete with all the elements that are perfectly designed and coordinated for their unique customer experience, using the visual talking techniques described herein. The design and build process 5900 implements the various techniques described herein in FIGS. 1-58 and the parent applications incorporated herein. The design and build process 5900 can be a computer-implemented method such as through a web portal, a mobile application, or a combination thereof. Specifically, the design and build process 5900 can be implemented through a Graphical User Interface (GUI) on the various servers, mobile devices, etc. described herein.

The design and build process 5900 includes choosing an experience (step 5902), creating visual templates (step 5904), performing component selections and mappings for the experience and the visual templates such as using the infinite cylinder interface (step 5906), sharing/communicating with others to make visual improvements (step 5908), ordering constituent components (step 5910), and creating a tracking comparison to improve selections (step 5912). Step 5912 can be used to restart the flow for continuous improvement.

For step 5902 to choose the experience, an experience is defined as a part of a day of a person (or of year or some other time period) and that time period can be visualized and products and actions can be designed for the experience. All the parts or components of the experience can be part of selections options that a customer makes and coordinate them on a theme for color, tone, etc. One example experience is a "morning bathroom experience" where the actions of prepping, showering/cleaning, and finishing are all selected. So the prepping includes what toothpaste, toothbrush, face wash, and cleaning includes soap, shampoo, conditioner, wash clothes, etc. Finishing can include makeup, hair products, etc. This entire experience can be defined online and purchased by the customer with the design and build process 5900. Another experience is eating, and all the food, all the cooking requirements, and all the serving options, and all the cleaning options are defined and selected. Another experience is a child play experience with what chooses for what toys work together, how to organize the time, etc. Another experience is treating a disease or ailment. Another experience is buying an entire room, designing all the walls, floors, doors and furniture. Those of ordinary skill in the art will recognize any type of experience is contemplated where a customer has product and/or service needs. In step 5902, the customer selects various experiences that they want to focus on and design. It can be single experience or many experiences.

For step 5904 to create visual templates, based on the selected user experience, the customer then selects templates from visual talking templates (e.g., the templates in FIG. 3) and uses these to build a visual picture of the experience, both as a blowup skeleton and a selection map—the purpose is to show how all the components are related and what selections may be possible. For example, the customer selects a "people" template that allows them to put clothes on and other items, and they superimpose this people template in a space/place template and this space can have selections. And add physical action on top of the other templates. Collectively, the experience and the templates are used to establish a visualization of the visual experience template.

For step 5906 for component selects and mappings, using a visual talking (VT) dictionary of selections and the infinite cylinder user interface, the user scans through purchase options and selects components to add to the visual experience templates they selected in step two above, and in this sequential way they choose all the components needed, from a few items to a thousand or a million. And these components are displayed in a coordinated way. The selections include options for various vendors, like for shampoo from P&G and J&J and Clairol, and independent brands. The components can be managed by businesses, including various different businesses, as well as by the customers themselves, such as using the infinite cylinder user interface 3700. Of note, each component is a product or service and the element can have metadata which can be used for ordering the element.

For step 5908 to communicate with others, to understand what others think of a customer's selections, or that to include them with the customer when making selections step 5908 uses visual talking to communicate all the selections in a visual way, allowing all participates to make selections and show the selections to others. Also, using the advertising techniques described herein, ads can be inserted into the selections or they can add their design services (e.g., from a special app section of website) and participate with the user(s) to make the designs and selections, and in this way they can all participate together and make real time selections from best experts around the world. This all can happen very quickly at low or no cost. In the end, all selections are made and they are ready to order.

For step 5910 to order components, the design and build process 5900 includes software extension such as Application Programming Interfaces (APIs) to handle the ordering and billing to all manufactures (product) and distributors (e.g., Amazon), and service partners (e.g., world class designers). The software can have project manager features for the user to schedule the details and sequences of deliveries. In an exemplary embodiment, the design and build process 5900 can be offered by an online retailer or the like as a virtual storefront.

For step 5912 to create tracking comparisons, since the template is selected, the customer can have options to create tracking comparisons along the lines of the comparison techniques described herein including corrective improvement actions. The customer can go back to step one and quickly redesign the experience or add another experience on top of it.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. A computer-implemented method comprising:
in a server comprising a processor configured to execute software instructions and a network interface communicatively coupled to a user, receiving, from the user via the network interface, a selection of an experience for the user to design, build, and order a complete customer experience;
receiving, from the user via the network interface, one or more selections from presented visual templates based on the experience;
receiving, from the user via the network interface, selections and mappings of components in the experience, wherein the components are images which make up the experience;
embedding skins in the images of the components for tracking thereof;
sharing the experience with the components to one or more additional users via the network interface;
responsive to the user wanting to buy the experience, causing ordering of one or more products and services associated with the components which are identified via metadata in the components, via one or more Application Programming Interfaces (APIs) between the server and one or more manufacturers, distributors, or service partners associated with the one or more products and services and
tracking the one or more products and services in the experience which are ordered based on associated skins in the components.

2. The computer-implemented method of claim 1, wherein the experience comprises a visualization of a time period and location in a user's life.

3. The computer-implemented method of claim 1, wherein the one or more visual templates are utilized to enable a visualization of a time period and location in a user's life based on the selected experience.

4. The computer-implemented method of claim 1, wherein the one or more visual templates are presented to a user via an infinite cylinder user interface.

5. The computer-implemented method of claim 4, wherein the infinite cylinder user interface comprises a plurality of images and has infinite movement longitudinally about an x-axis and infinite rotational movement about the x-axis, and a plurality of movement modes comprising drill-down and drill-up movement between a plurality of cylinders, and wherein the drill-down from an image of the plurality of images brings up a second plurality of images correlated with the image.

6. The computer-implemented method of claim 1, wherein the components each comprise the one or more products and services and are visually placed in the experience with the one or more visual templates enabling a user to visualize the one or more products and services.

7. The computer-implemented method of claim 1, wherein the components each comprise the one or more products and services and the ordering is performed automatically based on a selection by a user.

8. The computer-implemented method of claim 7, further comprising:
managing the ordering to schedule details and sequences of deliveries of the one or more products and services.

9. The computer-implemented method of claim 1, wherein the components and the one or more visual templates comprise visual talking images.

10. The computer-implemented method of claim 1, wherein the sharing comprises advertisements embedded in the experience.

11. A system comprising:
a data store for one or more data streams;
a network interface communicatively coupled to a plurality of users via a network;
a processor communicatively coupled to the data store and the network interface; and
instructions executable by the processor, and in response to such execution causes the processor to:
receive, from a user via the network experience, a selection of an experience for the user to design, build, and order a complete customer experience;
receive, from the user via the network interface, one or more selections from presented visual templates based on the experience;
receive, from the user via the network interface, selections and mappings of components in the experience, wherein the components are images which make up the experience;
embed skins in the images of the components for tracking thereof;
share the experience with the components to one or more additional users via the network interface;
responsive to the user wanting to buy the experience, cause ordering of one or more products and services associated with the components which are identified via metadata in the components, via one or more Application Programming Interfaces (APIs) between the server and one or more manufacturers, distributors, or service partners associated with the one or more products and services; and
track the one or more products and services in the experience which are ordered based on associated skins in the components.

12. The system of claim 11, wherein the experience comprises a visualization of a time period and location in a user's life.

13. The system of claim 11, wherein the one or more visual templates are utilized to enable a visualization of a time period and location in a user's life based on the selected experience.

14. The system of claim 11, wherein the one or more visual templates are presented to a user via an infinite cylinder user interface.

15. The system of claim 14, wherein the infinite cylinder user interface comprises a plurality of images and has infinite movement longitudinally about an x-axis and infinite rotational movement about the x-axis, and a plurality of movement modes comprising drill-down and drill-up movement between a plurality of cylinders, and wherein the drill-down from an image of the plurality of images brings up a second plurality of images correlated with the image.

16. The system of claim 11, wherein the components each comprise the one or more products and services and are visually placed in the experience with the one or more visual templates enabling a user to visualize the one or more products and services.

17. The system of claim 11, wherein the components each comprise the one or more products and services and the ordering is performed automatically based on a selection by a user.

18. The system of claim 17, wherein the instructions executable by the processor, and in response to such execution further cause the processor to
manage the ordering to schedule details and sequences of deliveries of the one or more products and services.

19. The system of claim 11, wherein the sharing comprises advertisements embedded in the experience.

20. A non-transitory computer readable medium comprising instructions executable by a processor, and in response to such execution causes the processor to perform operations comprising:
receiving, from the user via a network interface communicatively coupled to the processor, a selection of an experience for the user to design, build, and order a complete customer experience;
receiving, from the user via the network interface, one or more selections from presented visual templates based on the experience;
receiving, from the user via the network interface, selections and mappings of components in the experience, wherein the components are images which make up the experience;
embedding skins in the images of the components for tracking thereof;
sharing the experience with the components to one or more additional users via the network interface;
responsive to the user wanting to buy the experience, causing ordering of one or more products and services associated with the components which are identified via metadata in the components, via one or more Application Programming Interfaces (APIs) between the server and one or more manufacturers, distributors, or service partners associated with the one or more products and services; and
tracking the one or more products and services in the experience which are ordered based on associated skins in the components.

* * * * *